US006417828B1

(12) United States Patent
Sato et al.

(10) Patent No.: US 6,417,828 B1
(45) Date of Patent: Jul. 9, 2002

(54) LIQUID CRYSTAL COMPOSITION, LIQUID CRYSTAL DEVICE, DRIVING METHOD THEREOF AND LIQUID CRYSTAL APPARATUS

(75) Inventors: Koichi Sato, Atsugi; Mineto Yagyu, Sagamihara; Yukio Hanyu, Isehara; Masahiro Terada, Hadano; Koji Noguchi, Sagamihara; Kouki Nukanobu, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/505,838

(22) Filed: Feb. 17, 2000

(30) Foreign Application Priority Data

Feb. 18, 1999 (JP) .......................................... 11-039346
Mar. 25, 1999 (JP) .......................................... 11-082440
May 20, 1999 (JP) .......................................... 11-139390

(51) Int. Cl.[7] .................................................. G09G 3/36
(52) U.S. Cl. ............................ 345/89; 345/97; 345/88; 349/172; 349/174; 349/175
(58) Field of Search ............................ 345/50, 87, 88, 345/89, 90, 92, 97; 349/127, 128, 129, 132, 133, 172–175, 177, 179

(56) References Cited

U.S. PATENT DOCUMENTS

| | | | | |
|---|---|---|---|---|
| 4,367,924 | A | 1/1983 | Clark et al. | 350/334 |
| 5,082,587 | A | 1/1992 | Janulis | 252/299.01 |
| 5,328,639 | A | 7/1994 | Nohira et al. | 252/299.61 |
| 5,458,804 | A | 10/1995 | Yamada et al. | 252/299.01 |
| 5,482,650 | A | 1/1996 | Janulis et al. | 252/299.01 |
| 5,629,788 | A | 5/1997 | Mori et al. | 349/172 |
| 5,641,427 | A | 6/1997 | Shinjo et al. | 252/299.01 |
| B15,347,381 | A | 7/1997 | Shinomiya et al. | 349/134 |
| 5,657,141 | A | 8/1997 | Terada et al. | 349/184 |
| 5,847,799 | A | 12/1998 | Tanaka et al. | 349/174 |

FOREIGN PATENT DOCUMENTS

| | | |
|---|---|---|
| JP | 56-107216 | 8/1981 |
| JP | 2-142753 | 5/1990 |
| JP | 9-50049 | 2/1997 |
| JP | 2692815 | 9/1997 |
| WO | WO93/22396 | 11/1993 |
| WO | WO96/33251 | 10/1996 |

OTHER PUBLICATIONS

SID '96 Digest (1996), p. 699–702.
Journal of Applied Physics, vol. 61, Mar. 1987, No. 6, pp. 2400–2403.
Japanese Journal of Applied Physics,vol. 36, No. 6A, Jun. 1997, pp. 3586–3590.
Applied Physics Letters, vol. 19, No. 4, Feb. 1971, pp. 127–128.
Japanese Journal of Applied Physics, vol.10, Oct. 193, pp. L661–L663.
Japanese Journal of Applied Physics, vol. 27, No. 5, May 1988, pp. L729–L732.

*Primary Examiner*—Dennis-Doon Chow
*Assistant Examiner*—Alecia Nelson
(74) *Attorney, Agent, or Firm*—Fitzpatrick, Cella, Harper & Scinto

(57) ABSTRACT

An active matrix-type liquid crystal device is constituted by a pair of substrates, a chiral smectic liquid crystal composition disposed between the pair of substrates so as to form a plurality of pixels, and a plurality of active elements provided to the pixels, respectively, for driving the liquid crystal device in a matrix driving scheme. The chiral smectic liquid crystal composition may preferably comprise at least two specific fluorine-containing mesomorphic compounds and assume two stable states between which a threshold voltage for switching from one of the two stable states to the other stable state is different from a threshold voltage for switching from the other stable state to said one of the two stable states and liquid crystal molecules of the liquid crystal composition change their alignment states so as to provide a halftone state depending on a voltage applied to the chiral smectic liquid crystal.

3 Claims, 6 Drawing Sheets

LIQUID CRYSTAL COMPOSITION, LIQUID CRYSTAL DEVICE, DRIVING METHOD THEREOF AND LIQUID CRYSTAL APPARATUS

FIELD OF THE INVENTION AND RELATED ART

The present invention relates to a liquid crystal composition for use in a flat panel display, a projection display, a printer, etc., a liquid crystal device and a method for driving the device, and a liquid crystal apparatus.

As a display (apparatus) most extensively used heretofore, CRTs (cathode ray tubes) have been known and have been widely used as monitors for displaying motion pictures for television sets and VTRs (video tape recorders) and as monitors for personal computers. However, because of its operation principle, a CRT is accompanied with various difficulties for static picture display, such as flickering, a low picture recognizability due to scanning fringes caused by insufficient resolution, and deterioration of the fluorescent screen due to sticking or burning. Further, it has been recently found that electromagnetic wave generated from CRTs can adversely affect the human body and health of VDT operators. Moreover, a CRT necessarily requires a structure including a large volume behind the screen and is inconvenient from the viewpoints of effective utilization of data processing apparatus and space economization in offices and at home. A liquid crystal display device is known to solve these difficulties of CRTs. For example, there has been known a type of liquid crystal device using a twisted nematic (TN)-type liquid crystal disclosed by M. Schadt and W. Helfrich, Applied Physics Letters, Vol. 18, No. 4 (Feb. 15, 1971), pp. 127–128. In recent years, a device using this type of liquid crystal and driven by TFTs (thin film transistors) as active devices or elements has been extensively developed and commercialized. This type of device (TFT-type liquid crystal device) uses a transistor for each pixel, is free from crosstalk problem and is being produced at a fairly good productivity for display sizes of 10–12 inches owing to rapid progress in semiconductor production technology. However, in order to provide a frame frequency of at least 60 Hz in view of a larger display size or motion picture display with no problem, the TFT-type device still leaves some difficulties, such as productivity, response speed of a liquid crystal material and a viewing angle.

On the other hand, a liquid crystal device of the type utilizing spontaneous polarization of liquid crystal molecules as a switching torque and having a high-speed switching characteristic and a memory characteristic has been proposed by Clark and Lagerwall (U.S. Pat. No. 4,367,924; Japanese Laid-Open Patent Application (JP-A) 56-107216). The liquid crystal used is a ferroelectric liquid crystal (FLC) generally in chiral smectic C phase or chiral smectic H phase. The ferroelectric liquid crystal (FLC) has a very quick response speed because of inversion switching based on its spontaneous polarization and also an excellent viewing angle characteristic, so that it is believed to suitably provide a simple matrix-type display device or light valve of a high speed, a high resolution and a large area. Further, a chiral smectic anti-ferroelectric liquid crystal device has been proposed recently by Chandani, Takezoe, et al. (Japanese Journal of Applied Physics. Vol. 27 (1988), L729-). In this regard, it has been quite recently discovered that a specific anti-ferroelectric liquid crystal material provides a V (character)-shaped response characteristic (voltage-transmittance (V-T) characteristic), free from a threshold and with little hysteresis property, advantageous to gradational display (Japanese Journal of Applied Physics, vol. 36 (1997), P.3586-). Further, as a liquid crystal material utilizing spontaneous polarization as a switching torque and providing a V-shaped response (switching) characteristic, several liquid crystals including surface-monostabilized FLC (e.g., Journal of Applied Physics, vol. 61 (1987), p.2400-), deformed helix FLC (e.g., Ferroelectronics, vol. 85 (1988), p. 173-), twisted-smectic FLC (e.g., Applied Physics Letter, vol. 60 (1992), p. 280-), threshold-less anti-ferroelectric liquid crystal, and polymer-dispersed stabilized FLC (e.g., SID '96 Digest (1996), p. 699-) have been known.

Active matrix-type liquid crystal devices using the above liquid crystal materials for realizing high-speed display have recently been extensively proposed (e.g., as described in JP-A 9-50049).

Such active matrix-type liquid crystal devices using a chiral smectic liquid crystal having (anti-)ferroelectricity has still left problems in terms of afterimage due to hysteresis phenomenon, deterioration in alignment characteristic with time and a reliability such as burning phenomenon. Accordingly, it is strongly desired to solve such problems.

SUMMARY OF THE INVENTION

A principal object of the present invention is to provide a liquid crystal material and a liquid crystal device having solved the above-mentioned problems.

A specific object of the present invention is to provide a liquid crystal composition and a liquid crystal device which provide a high-speed responsiveness, a high image quality and a high reliability.

According to the present invention, there is provided an active matrix-type liquid crystal device, comprising:

a pair of substrates, a chiral smectic liquid crystal disposed between the pair of substrates so as to form a plurality of pixels, and a plurality of active elements provided to the pixels, respectively, for driving the liquid crystal device in a matrix driving scheme, wherein the chiral smectic liquid crystal assumes two stable states between which a threshold voltage for switching from one of the two stable states to the other stable state is different from a threshold voltage for switching from the other stable state to said one of the two stable states and liquid crystal molecules change their alignment states so as to provide a halftone state depending on a voltage applied to the chiral smectic liquid crystal.

According to the present invention, there is also provided a method of driving the above liquid crystal device, comprising:

resetting the chiral smectic liquid crystal at an entire area of each pixel in a stabler state of the two stable states, and applying a voltage depending on a display state to the chiral smectic liquid crystal at the pixel to effect writing for the display state.

According to the present invention, there is further provided a liquid crystal apparatus including the above-mentioned liquid crystal device, wherein a drive of the liquid crystal device is stopped after switching of the chiral smectic liquid crystal into the stabler state or interrupted in the stabler state of the chiral smectic liquid crystal.

The present invention provides a liquid crystal device, comprising: a pair of substrate each provided with an electrode, a liquid crystal disposed between the substrates so as to form a plurality of pixels, and a plurality of active elements provided to the pixels, respectively, for driving the liquid crystal device in a matrix driving scheme, wherein the liquid crystal is a chiral smectic liquid crystal composition comprising at least two compounds including at least one species of fluorine-containing mesomorphic compound which has smectic phase or latent smectic phase and a structure including: (a) a chiral or achiral fluorochemical terminal portion capable of containing at least one catenary ether oxygen atom, (b1) a chiral or achiral hydrocarbon terminal portion, and (c) a central core connecting the fluorochemical terminal portion and the hydrocarbon terminal portion; the liquid crystal composition comprising at least 10 wt. % in total of at least one species of fluorine-containing mesomorphic compound having a fluorochemical terminal portion free from a catenary ether oxygen atom.

The present invention also provides a method of driving the above liquid crystal device, comprising:

alternately applying a reset signal of a polarity and a writing signal of a polarity opposite to the polarity of the reset signal to effect a gradational display depending on the writing signal.

The present invention further provides a liquid crystal composition comprising at least two species of fluorine-containing mesomorphic compounds each of which has smectic phase or latent smectic phase and a structure including: (a) a chiral or achiral fluorochemical terminal portion capable of containing at least one catenary ether oxygen atom, (b2) a non-racemic achiral hydrocarbon terminal portion, and (c) a central core connecting the fluorochemical terminal portion and the hydrocarbon terminal portion; said at least two species of fluorine-containing mesomorphic compounds including at least two species of chiral fluorine-containing mesomorphic compounds which have mutually different absolute configurations or mutually different signs of spontaneous polarizations and occupy at least 30 wt. % in total of the liquid crystal composition.

The present invention further provides a liquid crystal device, comprising: a pair of substrate each provided with an electrode, a liquid crystal disposed between the substrates so as to form a plurality of pixels, and a plurality of active elements provided to the pixels, respectively, for driving the liquid crystal device in a matrix driving scheme, wherein the liquid crystal assumes at least two stable states and is the above-mentioned liquid crystal composition.

The present invention further provides a method of driving the above liquid crystal device, comprising:

alternately applying a reset signal of a polarity and a writing signal of a polarity opposite to the polarity of the reset signal to effect a gradational display depending on the writing signal.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the present invention will be described specifically based on preferred embodiments with reference to the drawings.

First Embodiment

Figure 1:
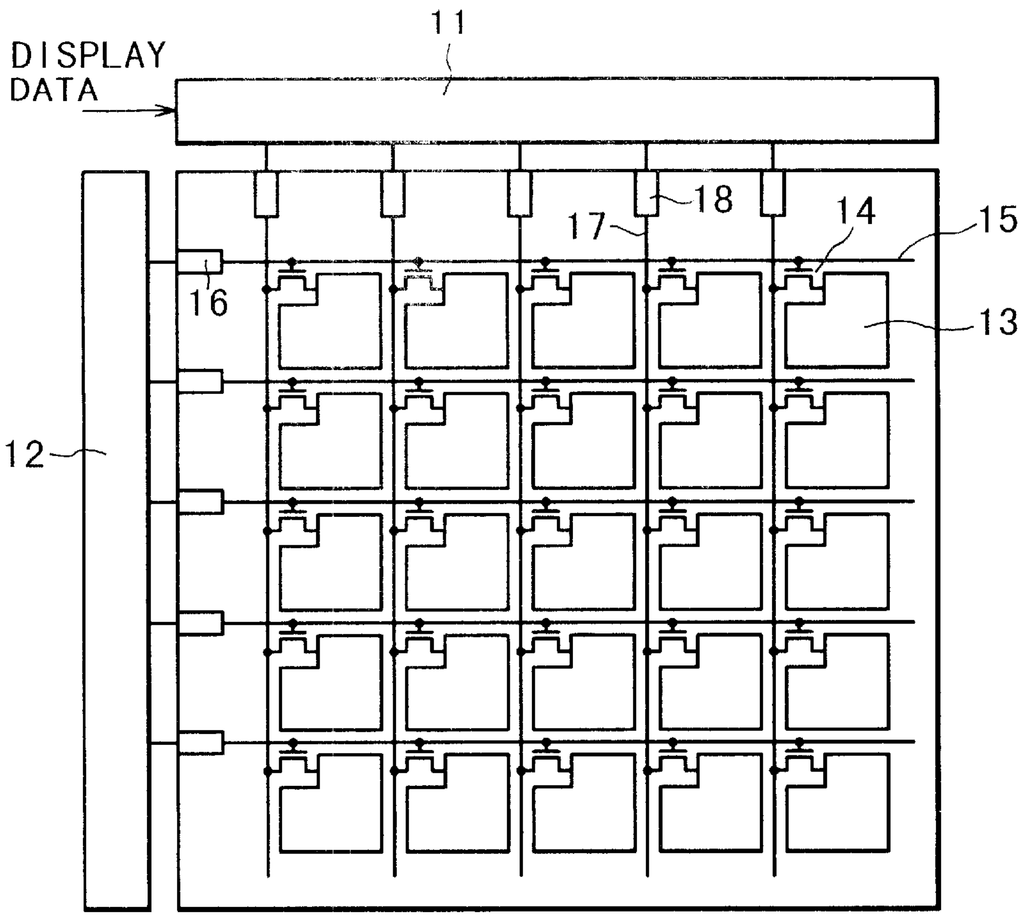
FIG. 1 is a schematic plan view of an embodiment of the liquid crystal device of the present invention.
Figure 2:
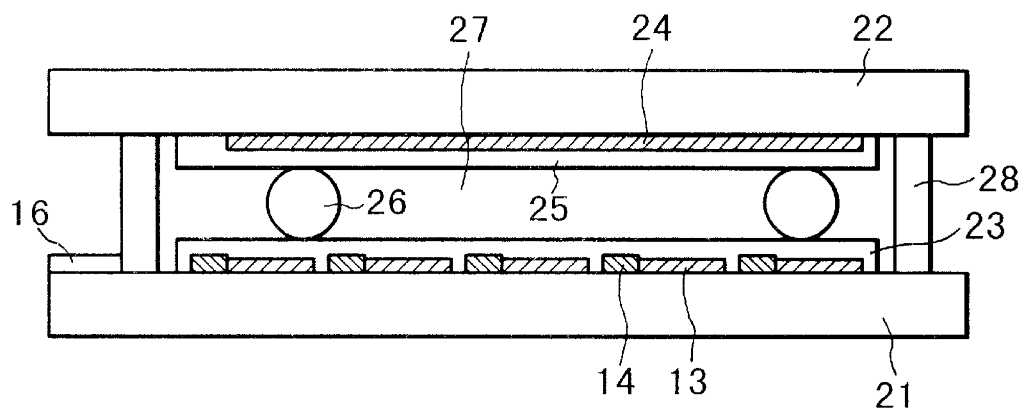
FIG. 2 is a schematic sectional view of an embodiment of the liquid crystal device of the present invention.

FIG. 1 shows a schematic plan view of an embodiment of an active-matrix type liquid crystal device of the present invention and FIG. 2 shows a corresponding sectional view thereof.

Referring to FIG. 1, the liquid crystal device includes a plurality of scanning signal lines (gate lines) 15 and a plurality of data signal lines (source lines) 17 intersecting the scanning signal lines 15 to form a plurality of pixels each at an intersection of these signal lines 15 and 17. Each pixel is provided with a TFT (thin film transistor) 14 as an active device or element and a pixel electrode 13. The scanning signal line 15 are supplied with gate signals from a gate line driver (row driver) 12 via scanning signal line terminals, and the data signal lines are supplied with data signals corresponding to display data from a data line driver (column driver) 11.

The liquid crystal device of the active matrix-type, as shown in FIG. 2, has a cell structure including a pair of transparent substrates 21 and 22 and a liquid crystal layer 27 disposed therebetween together with spacer beads 26 while being sealed up with a sealing agent 28. On the transparent 21, the plurality of pixel electrodes 13 each connected with the TFT are disposed, and thereon, an alignment film 23 is disposed. On the other transparent substrate 22, a common electrode 24 and an alignment film 25 are successively disposed.

The transparent electrodes 21 and 22 may generally comprise glass or plastics. The electrodes 13 and 24 may generally be formed of a transparent conductive material such as ITO (indium tin oxide).

In this embodiment, the liquid crystal device of the present invention may preferably have a difference in threshold voltage in terms of 50% inversion between different two stable states of at least 100 mV, thus showing an asymmetric threshold characteristic. Such an asymmetric threshold characteristic may, e.g., be found in the case where a ferroelectric liquid crystal causes sticking or burning in either one of two stable states. In order to realize the asymmetric threshold characteristic without causing the burning, the liquid crystal device of the present invention may preferably include a pair of different alignment films 23 and 25 disposed on the substrates 21 and 22, respectively. One of the alignment films 23 and 25 may more preferably be subjected to a uniaxial aligning treatment.

Such a uniaxial aligning control layer may be formed in the following manner.

On the substrate, a layer (film) of an inorganic substance, such as silicon monoxide, silicon dioxide, aluminum oxide, zirconia, magnesium fluoride, cerium oxide, cerium fluoride, silicon nitride, silicon carbide or boron nitride or of an organic substance, such as polyvinyl alcohol, polyimide, polyamide-imide, polyester, polyamide, polyesterimide, polyparaxyrene, polycarbonate, polyvinylacetal, polyvinyl chloride, polystyrene, polysiloxane, cellulose resin, melamine resin, urea resin or acrylic resin is formed by solution coating, vapor deposition or sputtering, followed by surface-rubbing with a fibrous material, such as velvet, cloth or paper. It is also possible to employ oblique vapor deposition wherein an oxide (e.g., SiO) or an nitride is vapor-deposited on the substrate from an oblique direction.

Particularly, in order to provide a better uniaxial aligning characteristic, a polyimide alignment film comprising a polyimide having a recurring unit represented by the following formula (P):

(P)

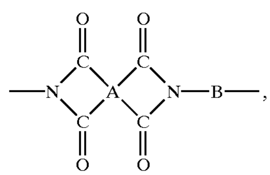

in which A represents a tetravalent group comprising an aromatic ring, an aromatic polycyclic ring, a heterocyclic ring or a condensed polycyclic ring; and B represents a divalent aliphatic group optionally comprising an alicyclic ring or represents $—(Ph)_a—(O)_c—(CH2)_x—(D)_e—(CH_2)_y—(O)_d—(Ph)_b—$ where Ph represents a phenylene group; D represents

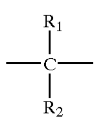

in which $R_1$ and $R_2$ independently denote hydrogen or methyl group; a and b are 0 or 1 at the same time; c and d are 0 at the same time when a=b=0 or are 0 or 1 at the same time when a=b=1; e is 0 or 1; and x and y are independently an integer of at least 1 but satisfy x+y+e=2–10.

The polyimide alignment film may ordinarily be formed by applying a polyamic acid solution, followed by curing. The polyamic acid is readily soluble in a solvent, thus being excellent in productivity. In recent years, a solvent-soluble polyimide is also commercially available, so that the resultant polyimide film may preferably be used as an alignment film for the liquid crystal device because of its excellent uniaxial aligning characteristic and a good productivity. The polyimide alignment film may preferably be formed in a smaller thickness in view of suppression of an adverse influence of a reverse electric field. Specifically, the polyimide alignment film may preferably have a thickness of at most 200 Å.

The spacer 26 is disposed between the pair of oppositely disposed substrates 21 and 22 to determine a gap between the substrates (cell gap) and may generally comprise, e.g., silica beads. The cell gap of the resultant liquid crystal device may be changed in its suitable range and/or upper limit value depending on a liquid crystal material used. In a preferred embodiment, the cell gap may desirably be set in a range of 0.3–10 μm in order to realize a uniform uniaxial aligning characteristic and an alignment state such that an average molecular axis direction of liquid crystal molecules under no electric field application is substantially identical to an (average) axis direction of alignment control axis (or axes).

As mentioned above, the polyimide alignment film having been subjected to uniaxial aligning treatment (rubbing treatment) has a smaller thickness (at most 200 Å) in order to suppress the adverse influence of the reverse electric field. For the same reason, the liquid crystal material used may preferably has a smaller stapontaneous polarization (Ps) of at most 10 $nC/cm^2$.

In this embodiment, as described above, the liquid crystal device is designed so as to have the asymmetric threshold characteristic (a larger threshold voltage and a smaller threshold voltage for 50%-inversion) between two stable states of the liquid crystal material used. As a result, one of the two stable states (i.e., the state providing the smaller threshold voltage) becomes unstabler than the other stable state. In order to provide the two stable states of the liquid crystal material with different stable degrees, the liquid crystal device may preferably include a pair of alignment control films largely different in charging characteristic.

Such different alignment control films may, e.g., include a combination of the uniaxial aligning control film and non-uniaxial aligning control film (which has not been subjected to the uniaxial aligning (rubbing) treatment or has no uniaxial aligning characteristic) as described above.

Examples of the non-uniaxial aligning control film may include those for the uniaxial aligning control film which has not been subjected to the uniaxial aligning treatment, various polymeric materials and an electroconductive film for suppressing the adverse influence of the reverse electric field. The electroconductive film may be comprised of a film containing electroconductive particles dispersed in a binder material (e.g., binder resin). The electroconductive film may advantageously be used in combination with the above-mentioned uniaxially-aligned polyimide alignment film since the electroconductive film and the polyimide alignment film can readily provide a difference in charging characteristic therebetween.

It is also possible to control the asymmetric threshold characteristic by charging an application solvent or using a particular driving method. In the latter case, the liquid crystal material is subjected to a DC voltage application for a prescribed period to place it in a monostabilized state (i.e., an excessively burned (stuck) state), thus resulting in the asymmetric threshold characteristic of the liquid crystal device.

On the substrates 21 and 22, it is possible to form insulating film(s) in addition to the alignment (control) films 23 and 25.

The liquid crystal material for the liquid crystal layer 27 may be a chiral smectic liquid crystal such as a ferroelectric liquid crystal or an anti-ferroelectric liquid crystal, preferably a surface-stabilized ferroelectric liquid crystal. These liquid crystals utilize spontaneous polarization of liquid crystal molecules as a switching torque, thus realizing a high-speed liquid crystal device. Specifically, the resultant response time (response speed) may be decreased to at most 1 msec, preferably at most 500 μsec, most preferably at most 100 μsec.

In this embodiment, the liquid crystal device of the present invention is characterized by having at least two (optically) stable states, preferably two (optically) stable states, although the (at least) two stable states provide a difference in threshold voltage (in terms of 50%-inversion voltage) from one stable state to the other stable state of at least 100 mV. Generally, when the liquid crystal device has such an asymmetric threshold characteristic, the liquid crystal used in placed in a monostabilized state even under no electric field application. As described above, in the present invention, the ferroelectric liquid crystal showing bistability may preferably be used as the liquid crystal material for the liquid crystal layer 27. In order to realize bistability even in the above-mentioned asymmetric threshold condition, an activation energy for transition between the two stable states is required to be larger.

Such a larger activation energy may preferably be provided by using a liquid crystal providing a tilt angle of at least 15 degrees or a bistable liquid crystal exhibiting two uniform states without including twisted state. In this regard, in order to suppress an occurrence of the twisted state, the bistable liquid crystal may desirably contain less or no impurity ions. Further, it is also possible to preferably use a chiral smectic liquid crystal having a smaller spontaneous polarization (Ps), preferably of at most 10 nC/cm$^2$. The smaller spontaneous polarization is also advantageous to suppression of an occurrence of hysteresis phenomenon in response (voltage-transmittance) characteristic.

The tilt angle θ and spontaneous polarization Ps referred to herein may be based on values measured according to the following methods.

Measurement of Tilt Angle θ

A liquid crystal device is sandwiched between right angle-cross nicol polarizers and rotated horizontally relative to the polarizers under application of an AC voltage of ±30 V to ±50 V and 1 to 100 Hz between a pair of substrates of the device while measuring a transmittance through the device by a photomultiplier (available from Hamamatsu Photonics K.K.) to find a first extinct position (a position providing the lowest transmittance) and a second extinct position. A tilt angle θ is measured as a half of the angle between the first and second extinct positions.

Measurement of Spontaneous Polarization Ps

The spontaneous polarization Ps is measured according to "Direct Method with Triangular Waves for Measuring Spontaneous Polarization in Ferroelectric Liquid Crystal", as described by K. Miyasato et al (Japanese J. Appl. Phys. 22, No. 10 (1983), L661-).

The chiral smectic liquid crystal used in this embodiment may preferably be a liquid crystal composition comprising at least two compounds including at least one species of a fluorine-containing mesomorphic which has a structure including a chiral or achiral fluorochemical terminal portion capable of containing at least one methylene group and at least one catenary ether oxygen atom, and a chiral or achiral saturated hydrocarbon terminal portion connected by a central core and has smectic phase or latent smectic phase. Herein, the term "latent smectic phase" refers to a property of a compound concerned that the compound alone does not exhibit smectic phase but can be a component compatibly contained in smectic phase of a liquid crystal composition.

The liquid crystal composition used as the chiral smectic liquid crystal may preferably be composed only of two or more species of the above-mentioned fluorine-containing mesomorphic compounds.

The liquid crystal composition comprising the fluorine-containing mesomorphic compound(s) is advantageously used in view of less ion content by an increase in its purity, a good uniform alignment characteristic and its smectic layer structure, such as a bookshelf (layer) structure or a structure having a smaller layer inclination angle, capable of suppressing an occurrence of zig-zag alignment defects.

It is particularly preferred to use a fluorine-containing mesomorphic compound of the following general formulas (I), (II) or (III):

Formula (I)

$$R^1—\underset{\substack{|\\X^1_{ja}}}{(A^1)_{ga}}—L^1—\underset{\substack{|\\Y^1_{ma}}}{(A^2)_{ha}}—L^2—\underset{\substack{|\\Z^1_{na}}}{(A^3)_{ia}}—J^1—R^2,$$

wherein $A^1$, $A^2$ and $A^3$ are each independently

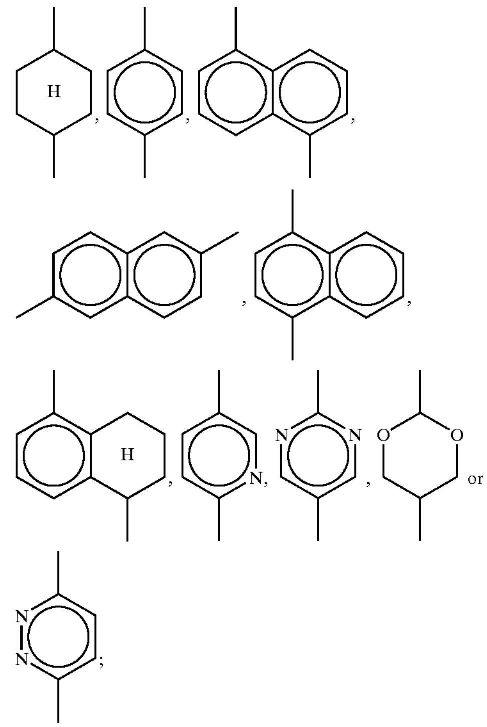

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —$CH_2CH_2$—, —CH═CH—, —C≡C—, —CH═N—, —N═CH—, —$CH_2$—O—, —O—$CH_2$—, —CO— or —O—;

$X^1$, $Y^1$ and $Z^1$ are each a substituent of $A^1$, $A^2$ and $A^3$, respectively, and each $X^1$, $Y^1$ and $Z^1$ are independently —H, —Cl, —F, —Br, —I, —OH, —$OCH_3$, —$CH_3$, —CN or —$NO_2$;

each ja, ma and na are independently an integer of 0–4;

$J^1$ is —CO—O—$(CH_2)_{ra}$—, —O—$(CH_2)_{ra}$—, —$(CH_2)_{ra}$—, —O—$SO_2$—, —$SO_2$—, —$SO_2$—$(CH_2)_{ra}$—, —O—$(CH_2)_{ra}$—O—$(CH_2)_{rb}$—, —$(CH_2)_{ra}$—N$(C_{pa}H_{2pa+1})$—$SO_2$— or —$(CH_2)_{ra}$—N$(C_{pa}H_{2pa+1})$—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{21qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II)

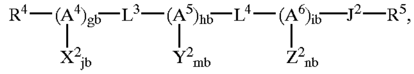

wherein $A^4$, $A^5$ and $A^6$ are each independently

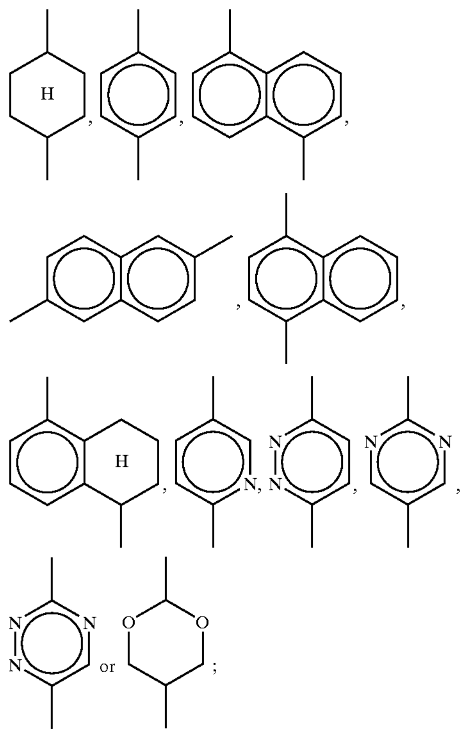

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, $—(CH_2CH_2)_{ka}—$ (ka is 1–4), —CH═CH—, —C≡C—, —CH═N—, —N═CH—, $—CH_2—O—$, $—O—CH_2—$, —CO— or —O—;

$X^2$, Y2 and $Z^2$ are each a substituent of $A^4$, $A^5$ and $A^6$, respectively, and each X2, Y2 and $Z_2$ are independently —H, —Cl, —F, —Br, —I, —OH, $—OCH_3$, $—CH_3$, $—CF_3$, $—O—CF_3$, —CN or $—NO_2$; each jb, mb and nb are independently an integer of 0–4;

$J^2$ is $—CO—O—C_{rc}H_{2rc}—$, $—O—C_{rc}H_{2rc}—$, $—C_{rc}H_{2rc}—$, $—O—(C_{sa}H_{2sa}—O)_{ta}—C_{rd}H_{2rd}—$, $—O—SO_2—$, $—SO_2—$, $—SO_2—C_{rc}H_{2rc}—$, $—C_{rc}H_{2rc}—N(C_{pb}H_{2pb+1})—SO_2—$ or $—C_{rc}H_{2rc}—N(C_{pb}H_{2pb+1})—CO—$; rc and rd are independently 1–20; sa is independently 1–10 for each $(C_{sa}H_{2sa}—O)$, ta is 1–6; pb is 0–4;

$R^4$ is $—O—(C_{qc}H_{2qc}—O)_{wa}—C_{qd}H_{2qd+1}$, $—(C_{qc}H_{2qc}—O)_{wa}C_{qd}H_{2qd+1}$, $—C_{qc}H_{2qc}—R^6$, $—O—C_{qc}H_{2qc}—R^6$, $—CO—O—C_{qc}H_{2qc}—R^6$, or $—O—CO—C_{qc}H_{2qc}—R^6$ which may be either straight chain or branched; $R^6$ is $—O—CO—C_{qd}H_{2qd+1}$; $—CO—O—C_{qd}H_{2qd+1}$, —Cl, —F, $—CF_3$, $—NO_2$, —CN or —H; qc and qd are independently an integer of 1–20; wa is an integer of 1–10;

$R^5$ is $(C_{xb}F_{2xb}—O)_{za}—C_{ya}F_{2ya+1}$, wherein xb is independently 1–10 for each $(C_{xb}F_{2xb}—O)$; ya is 1–10; and za is 1–10.

Formula III

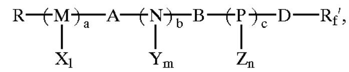

where M, N and P are each independently selected from the group consisting of

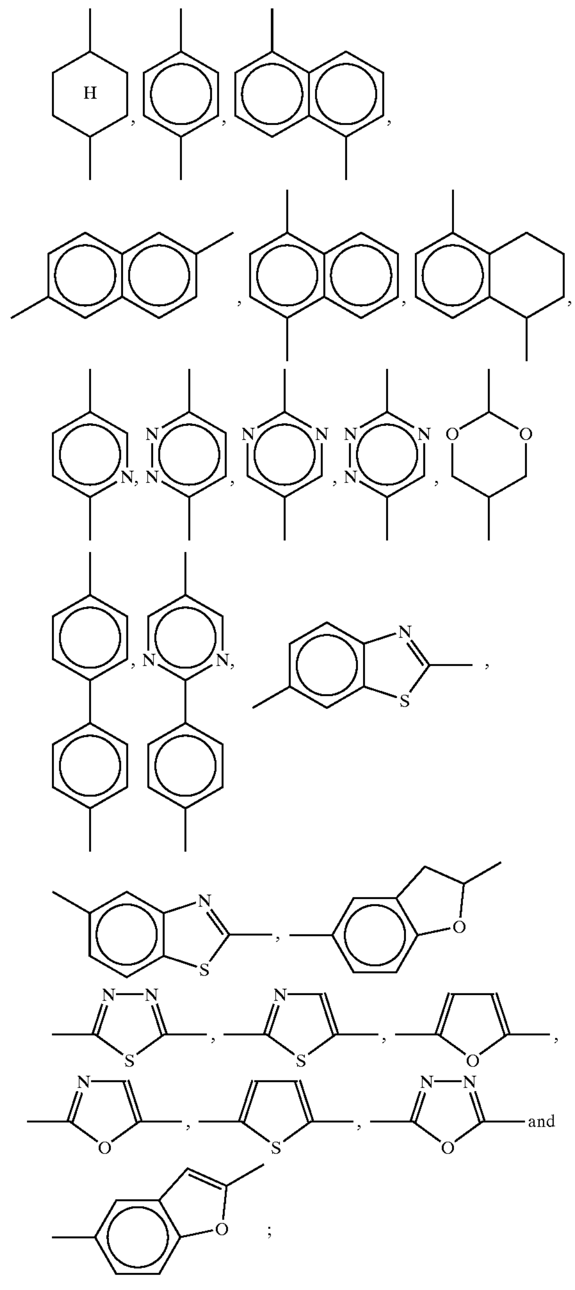

a, b and c are each independently zero or an integer of from 1 to 3, with the proviso that the sum of a+b+c be at least 1;

each A and B are non-directionally and independently selected from the group consisting of a covalent bond, —C(═O)—O—, —C(═O)—S—, —C(═O)—Se—, —C(═O)—Te—, $—(CH_2CH_2)_k—$ where k is 1 to 4, —CH═CH—, —C≡C—, —CH═N—, —$CH_2$—O—, —C(═O)— and —O—;

each X, Y and Z are independently selected from the group consisting of —H, —Cl, —F, —Br, —I, —OH, —$OCH_3$, —$CH_3$, —$CF_3$, —$OCF_3$, —CN and —$NO_2$;

each l, m and n are independently zero or an integer of 1 to 4;

D is non-directionally selected from the group consisting of a covalent bond, —C(═O)—O—$C_rH_{2r}$—, —O—$C_rH_{2r}$—, —O—(O═)C—$C_rH_{2r}$—, —C≡C—, —CH═CH—, —C(═O)—, —O—($C_sH_{2s}$O)$_t$$C_{r'}H_{2r'}$—, —$C_rH_{2r}$—, —($C_sH_{2s}$O)$_t$$C_{r'}H_{2r'}$—, —O—, —S—, —$OSO_2$—, —$SO_2$—, —$SO_2$—$C_rH_{2r}$—, —$C_rH_{2r}$—N($C_pH_{2p+1}$)—$SO_2$—, —N($C_pH_{2p+1}$)—, —$C_rH_{2r}$—N($C_pH_{2p+1}$)—C(═O)—,

—CH═N—, and combinations thereof, where r and r' are independently integers of 0 to 20, s is independently an integer of 1 to 10 for each ($C_sH_{2s}$O), t is an integer of 1 to 6, and p is an integer of 0 to 4;

R is selected from the group consisting of —O—(($C_{q'}H_{2q'-v'}$—(R')$_{v'}$)—O)$_w$—$C_qH_{2q+1-v}$—(R')$_v$, —(($C_{q'}H_{2q'-v'}$—(R')$_{v'}$)—O)$_w$—$C_qH_{2q+1-v}$—(R')$_v$, —(═O)—O—$C_qH_{2q+1-v}$—(R')$_v$, —O—(O═)C—$C_qH_{2q+1-v}$—(R')$_v$,

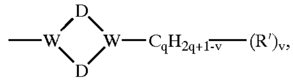

and —CR'H—(D)$_g$—CR'H—$C_qH_{2q+1-v}$—(R')$_v$, where each R' is independently selected from the group consisting of —Cl, —F, —$CF_3$, —$NO_2$, —CN —H, —$C_qH_{2q+1}$, —O—(O═)C—$C_qH_{2q+1}$, —C(═O)—O—$C_qH_{2q+1}$, —Br, —OH and —O$C_qH_{2q+1}$; q' is independently an integer of 1 to 20 for each ($C_qH_{2q'}$—O); q is an integer of 1 to 20; w is an integer of 0 to 10; v is an integer of 0 to 6; each v' is independently an integer of 0 to 6; g is an integer of 1 to 3; each D is independently and non-directionally selected from the group set forth for D above, with the proviso that the ring containing D has from 3 to about 10 ring atoms; each W is independently selected from the group consisting of N, CR' and SiR'; and R is chiral or achiral; and $R_f'$ is is —R*—D—(O)$_x$—$CH_2$—D'—$R_f$, where R* is a cyclic or acyclic chiral moiety; D and D' are each independently and non-directionally selected from the group set forth for D above; x is an integer of 0 or 1; and $R_f$ is fluoroalkyl, perfluoroalkyl, fluoroether, or perfluoroether.

The compounds represented by the general formula (I) may be obtained through a process described in U.S. Pat. No. 5,082,587 (corr. to JP-A 2-142753). Specific examples thereof are enumerated below.

I-1

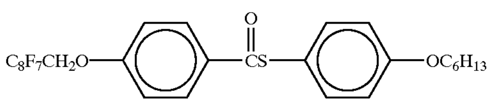

I-2

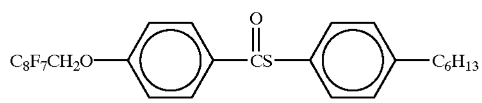

I-3

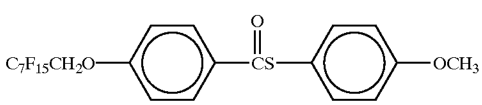

I-4

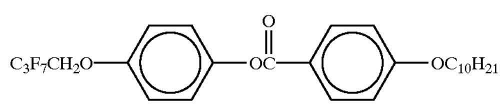

I-5

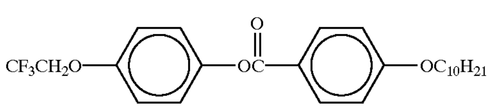

I-6

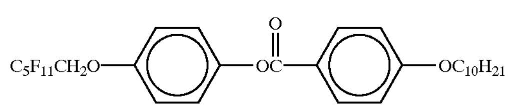

I-7

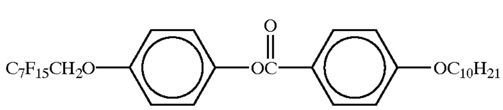

I-8

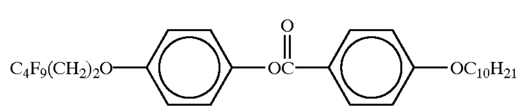

I-9

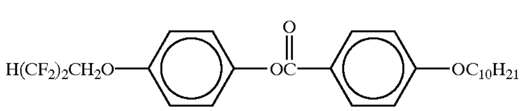

I-10

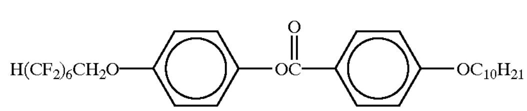

I-11

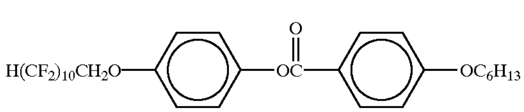

I-12

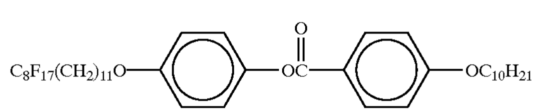

-continued
I-13
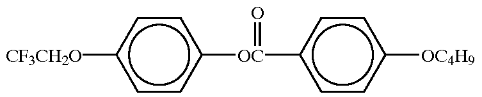
I-14
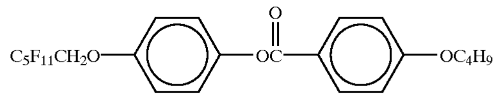
I-15
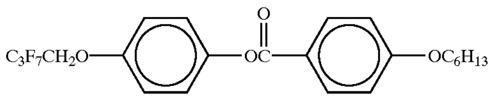
I-16
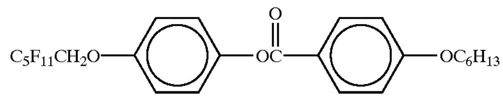
I-17
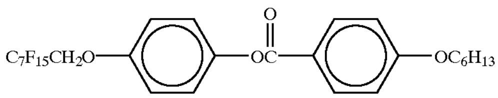
I-18
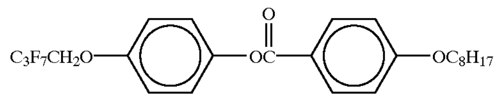
I-19
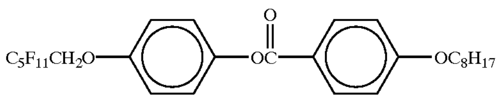
I-20
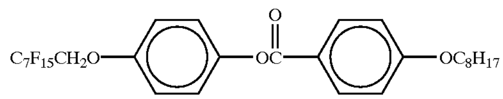
I-21
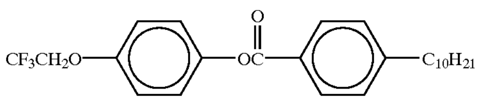
I-22
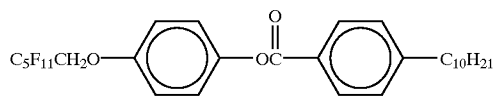
I-23
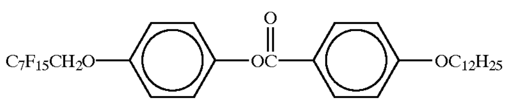
I-24
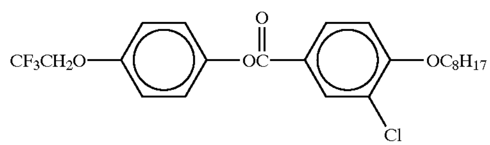
I-25
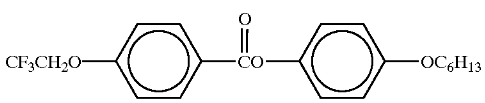
I-26
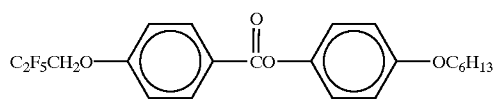
I-27
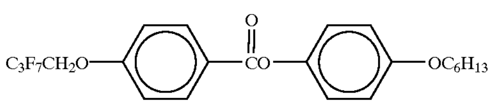
I-28
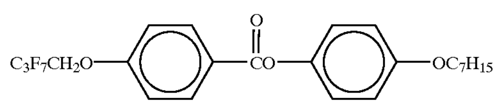
I-29
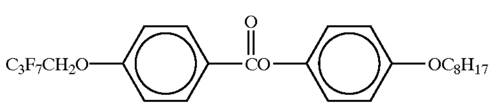
I-30
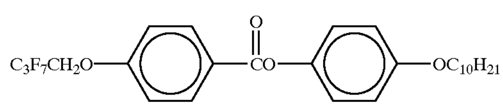
I-31
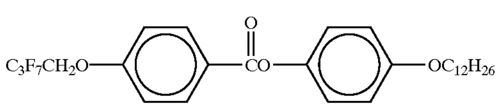
I-32
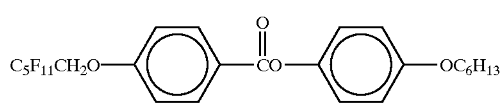
I-33
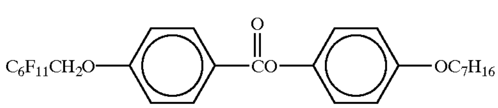
I-34
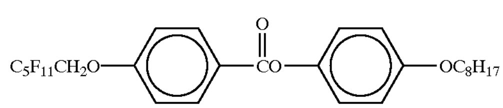
I-35
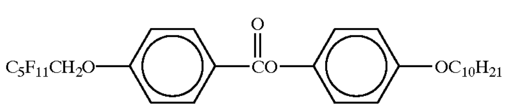
I-36
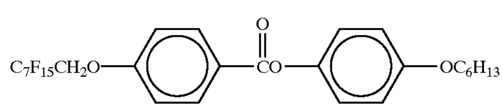
I-37
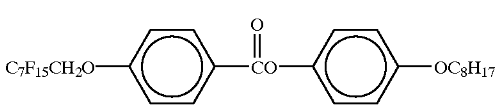
I-38
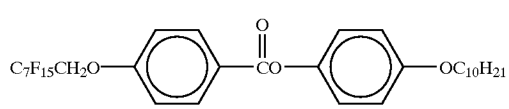
I-39
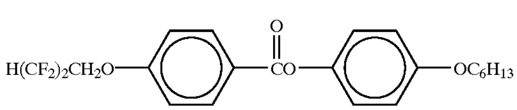
I-40
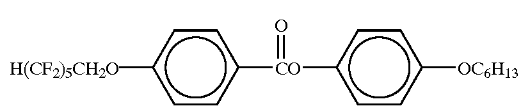

-continued
I-41
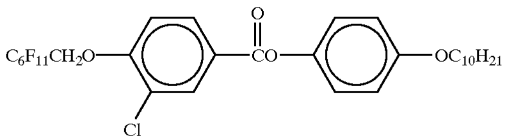
I-42
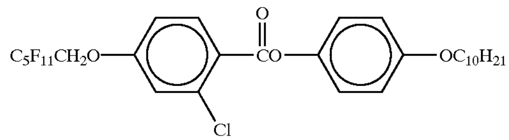
I-43
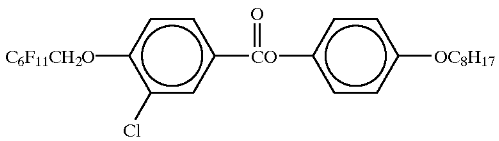
I-44
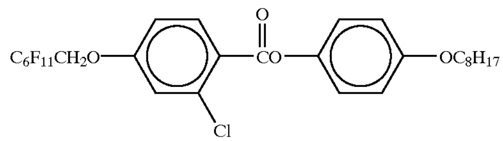
I-45
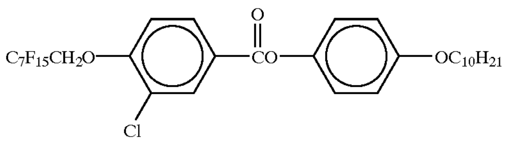
I-46
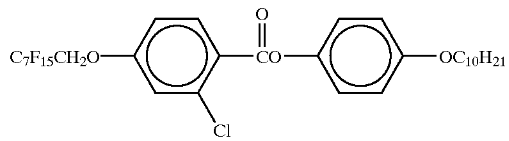
I-47
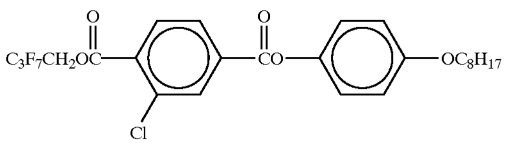
I-48
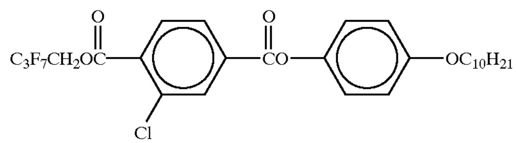
I-49
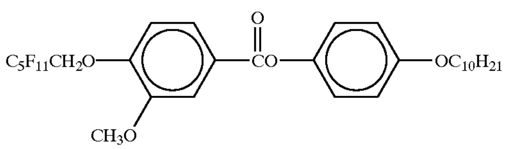
I-50
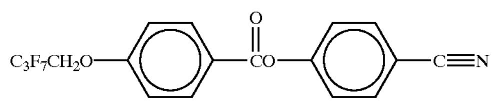
I-51
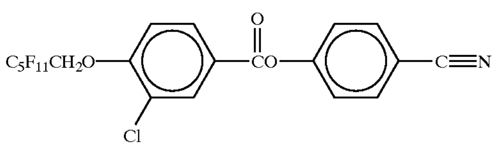
I-52
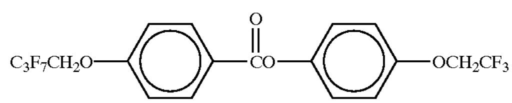
I-53
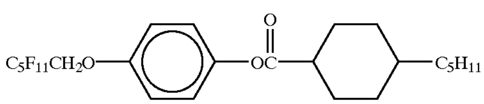
I-54
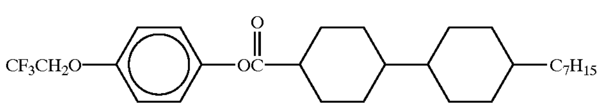
I-55
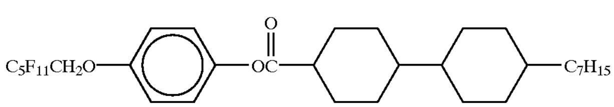
I-56
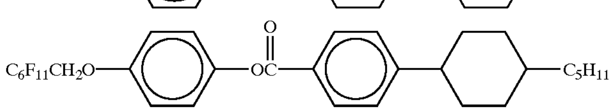
I-57
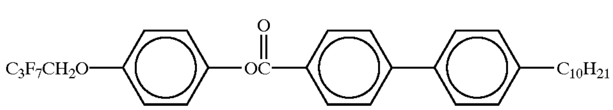
I-58
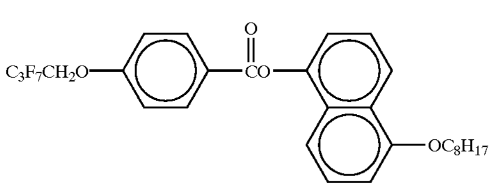
I-59
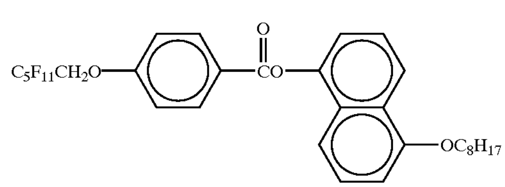

-continued
I-60
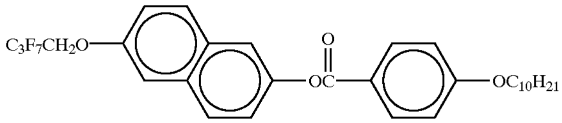
I-61
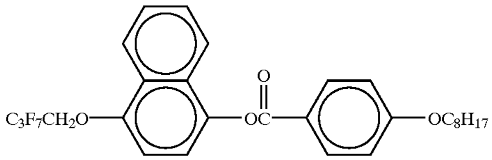
I-62
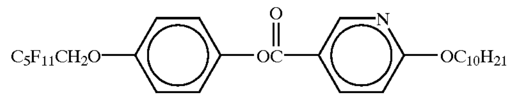
I-63
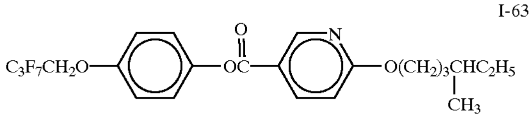
I-64
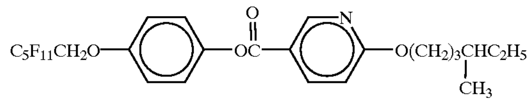
I-65
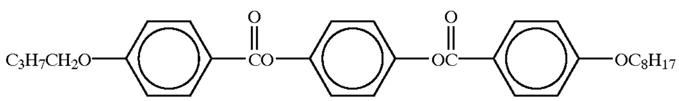
I-66
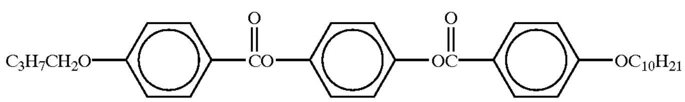
I-67
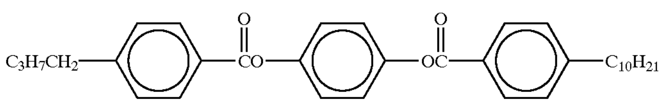
I-68
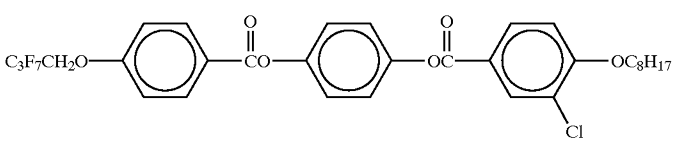
I-69
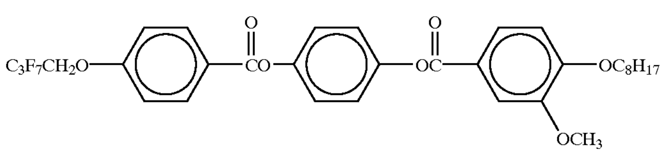
I-70
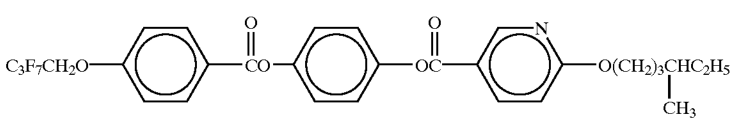
I-71
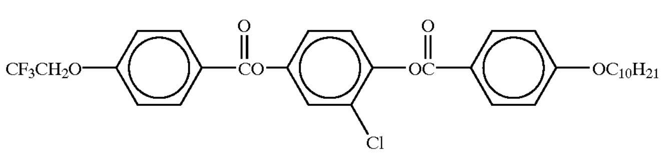
I-72
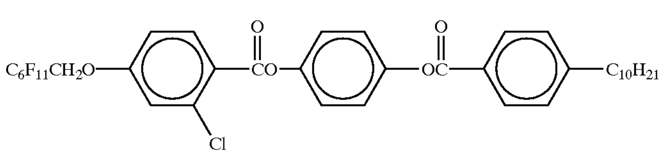

-continued
I-73
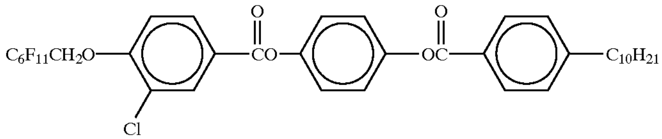
I-74
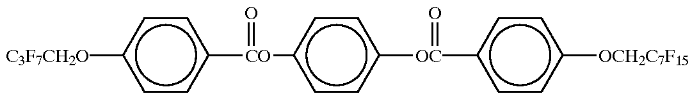
I-75
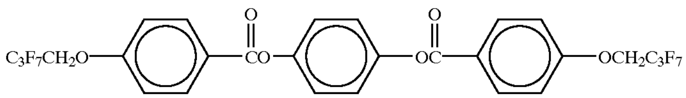
I-76
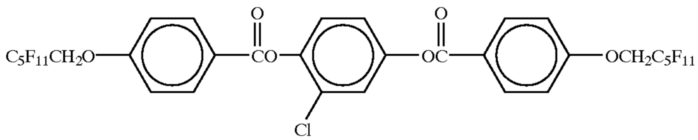
I-77
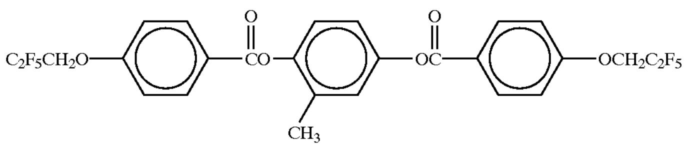
I-78
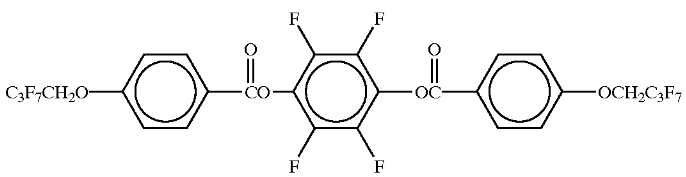
I-79
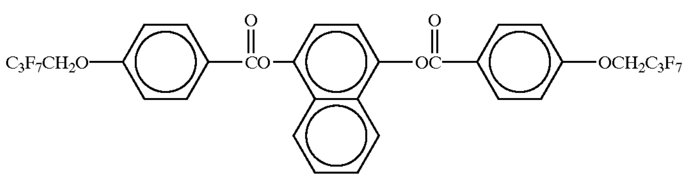
I-80
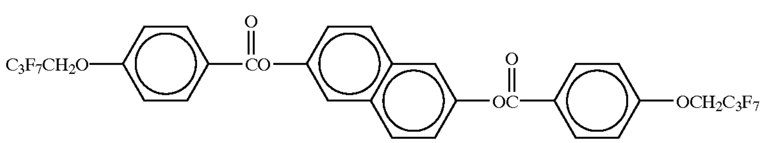
I-81
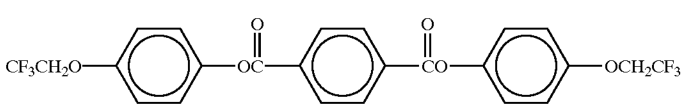
I-82
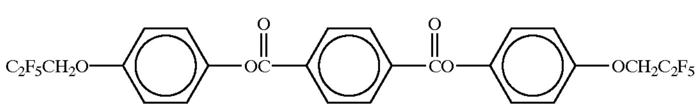
I-83
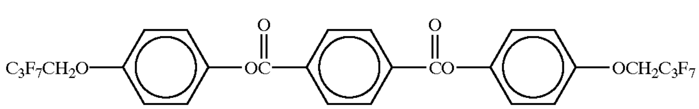
I-84
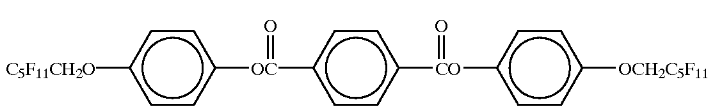

-continued
I-85
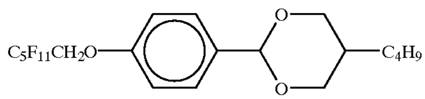
I-86
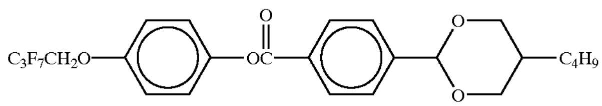
I-87
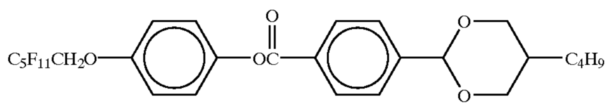
I-88
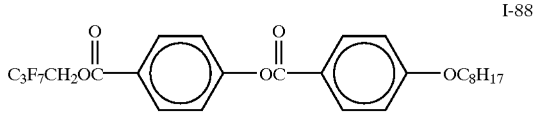
I-89
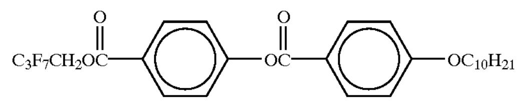
I-90
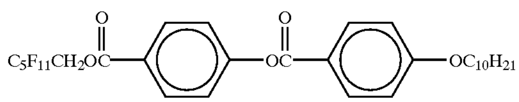
I-91
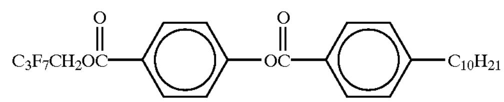
I-92
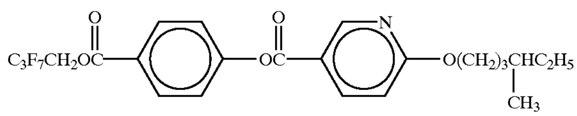
I-93
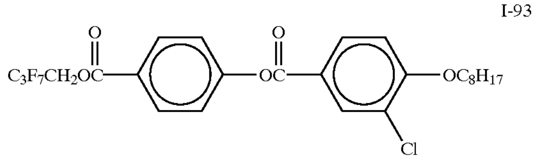
I-94
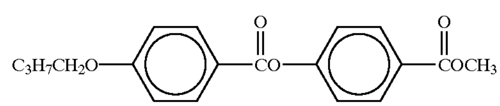
I-95
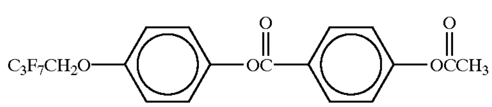
I-96
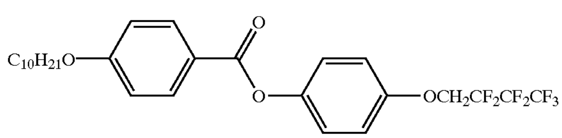
I-97
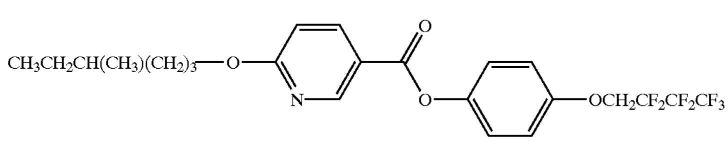
I-98
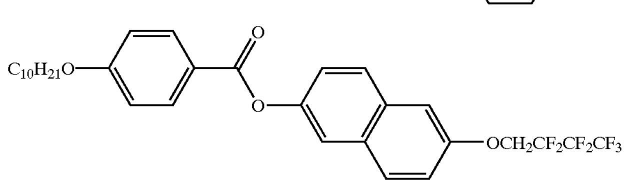
I-99
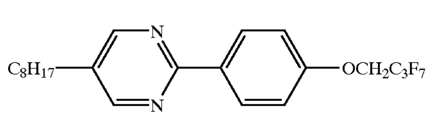
I-100
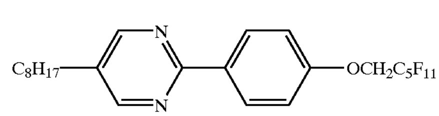

-continued
I-101
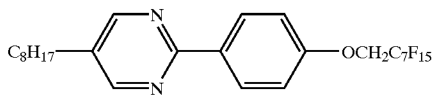
I-102
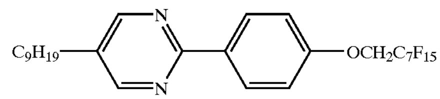
I-103
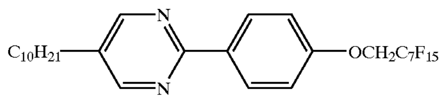
The compounds represented by the general formula (II) may be obtained though a process described in PCT Publication WO93/22396 (corr. to JP (Tokuhyo) 7-506368). Specific examples thereof are enumerated below.
II-1
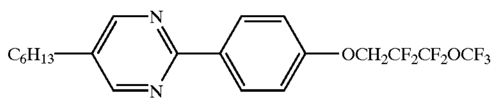
II-2
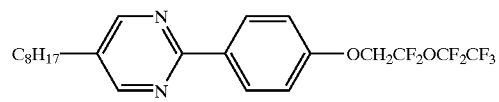
II-3
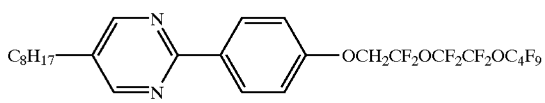
II-4
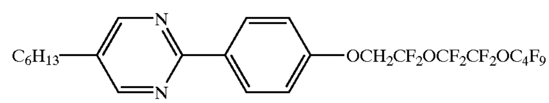
II-5
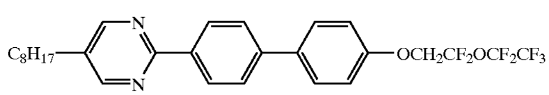
II-6
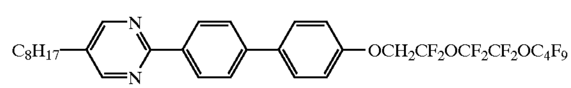
II-7
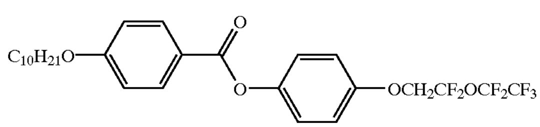
II-8
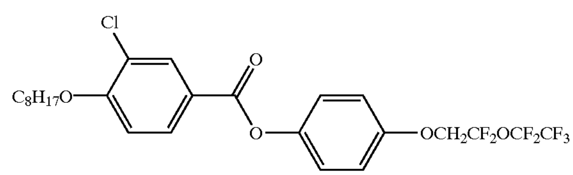
II-9
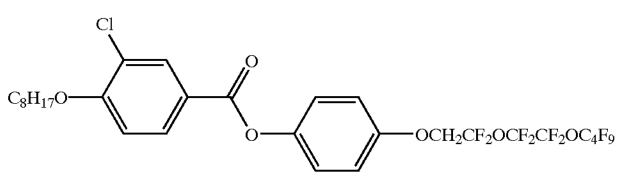
II-10
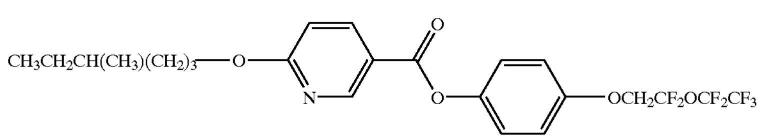
II-11
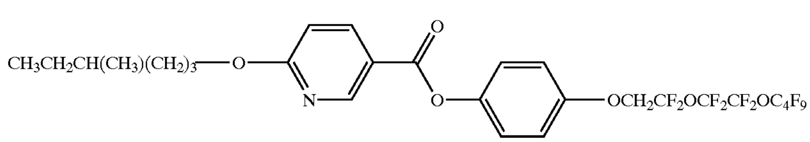
II-12
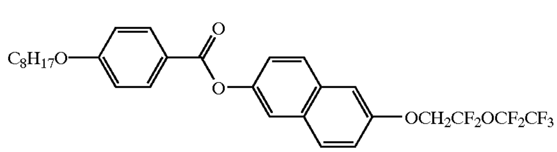
II-13
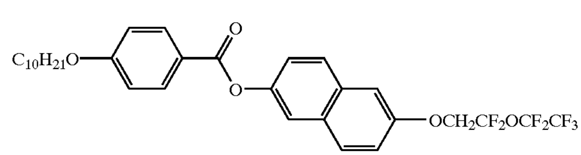

-continued
II-14
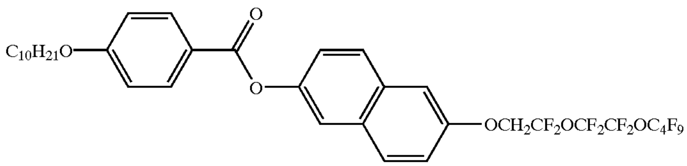
II-15
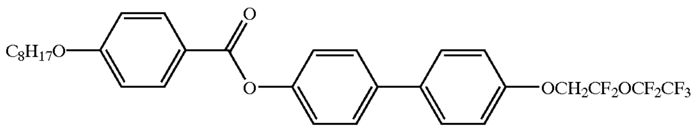
II-16
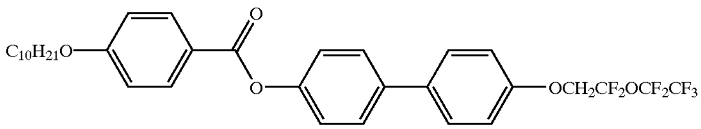
II-17
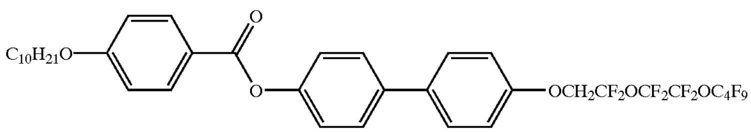
II-18
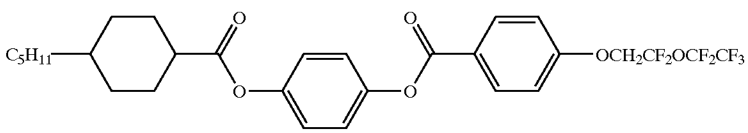
II-19
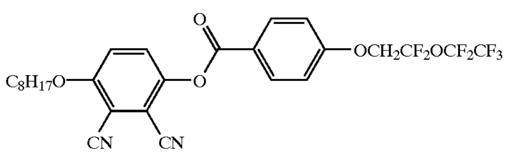
II-20
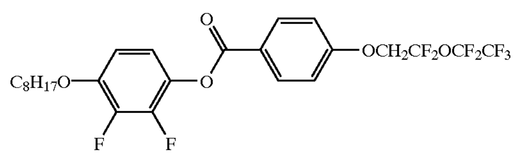
II-21
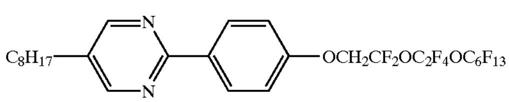
II-22
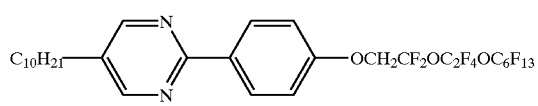
II-23
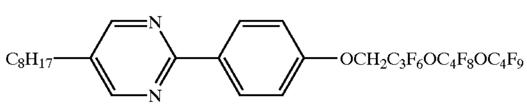
II-24
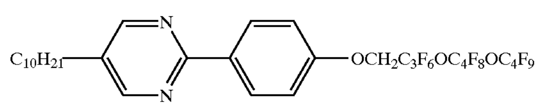
II-25
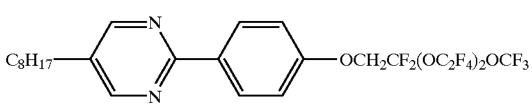
II-26
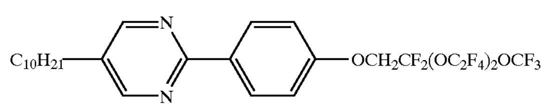
II-27
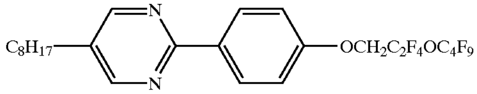
II-28
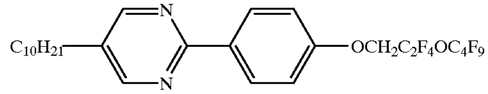
II-29
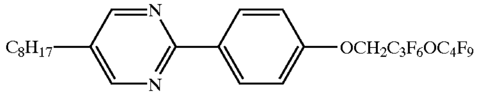
II-30
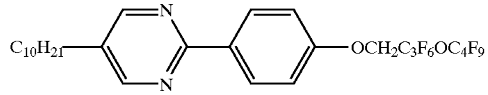
II-31
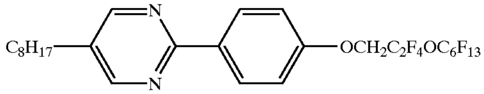
II-32
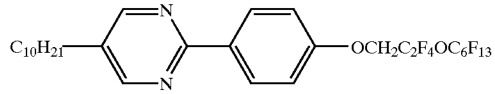

-continued
II-33
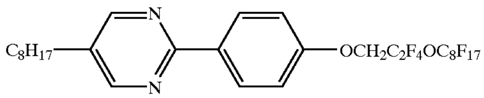
II-34
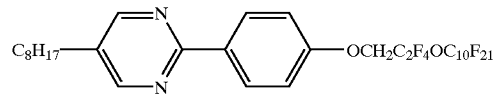
II-35
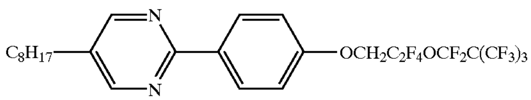
II-36
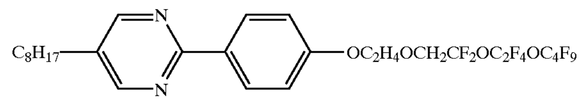
II-37
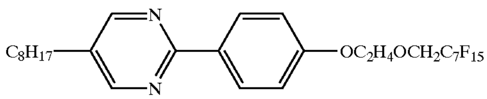
II-38
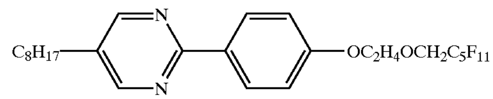
II-39
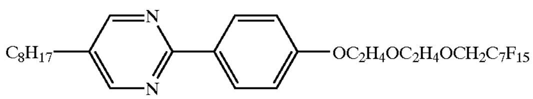
II-40
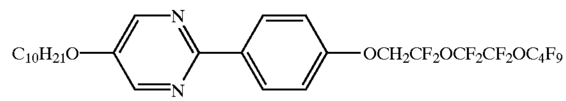
II-41
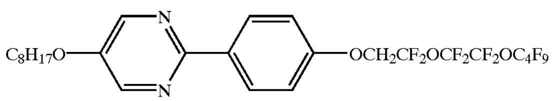
II-42
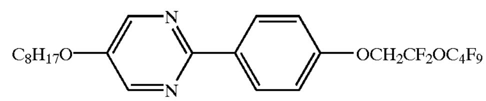
II-43
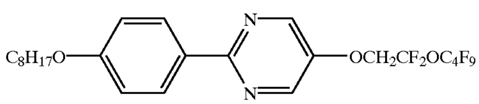
II-44
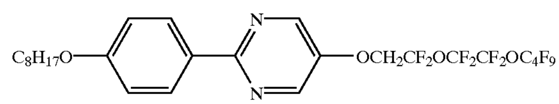
II-45
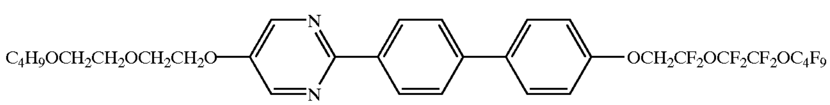
The compounds represented by the general formula (III) may be obtained though a process described in PCT Publication WO96/33251. Specific examples thereof are enumerated below.
III-1
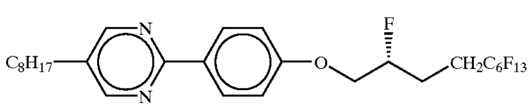
III-2
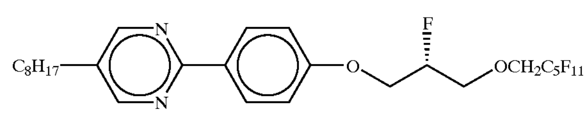
III-3
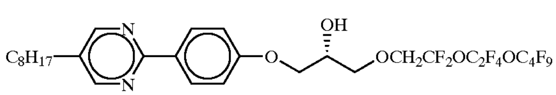
III-4
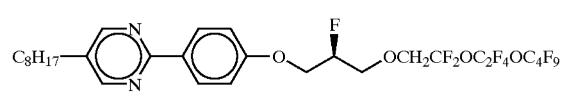
III-5
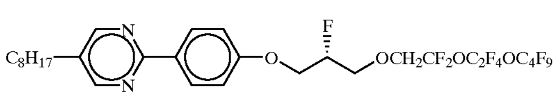
III-6
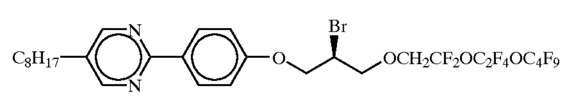
III-7
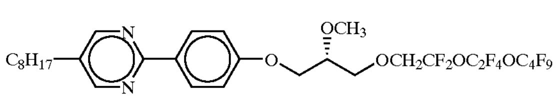
III-8
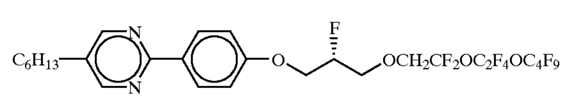
III-9
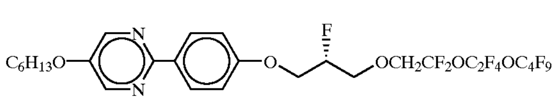
III-10
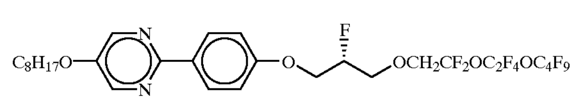

-continued
III-11
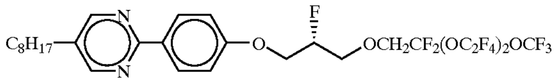
III-12
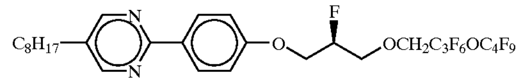
III-13
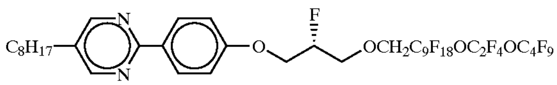
III-14
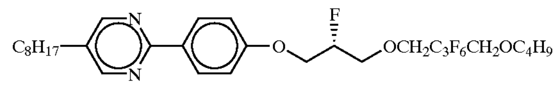
III-15
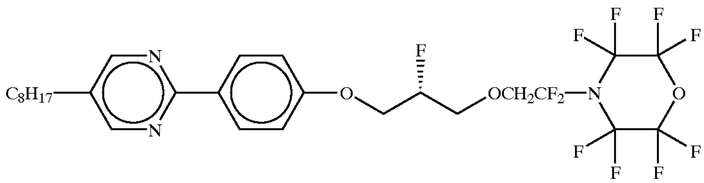
III-16
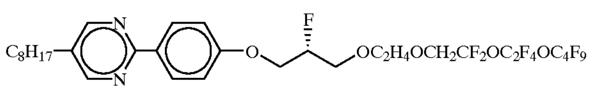
III-17
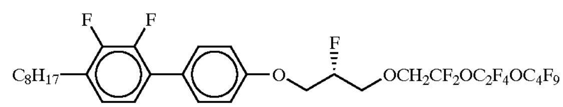
III-18
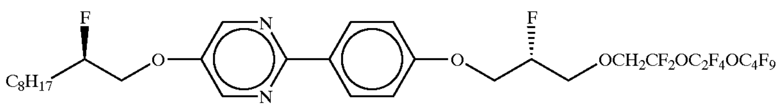
III-19
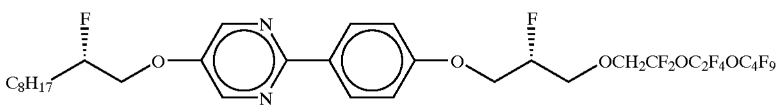
III-20
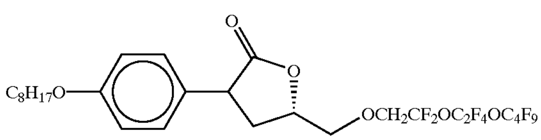
III-21
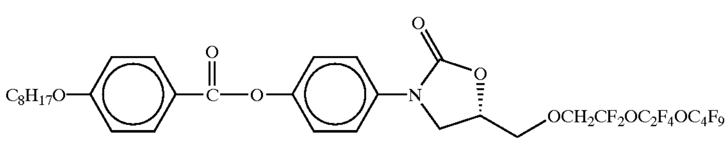
III-22
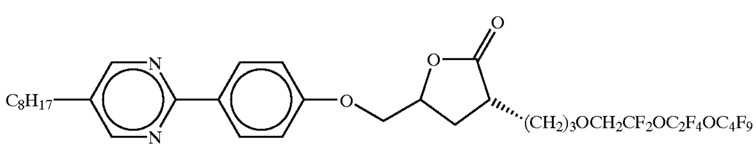
III-22
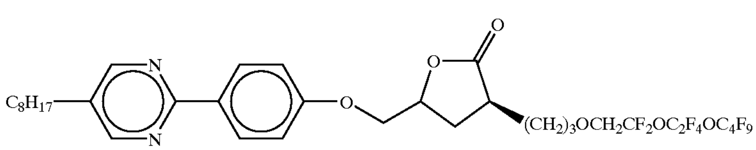
CIS
III-22
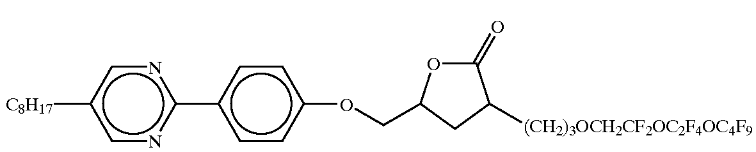
TRANS -continued

III-23

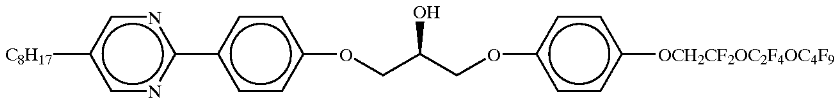

III-24

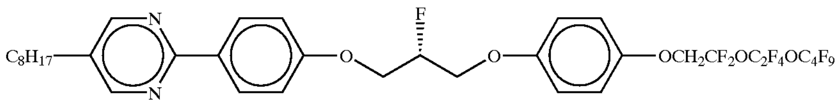

III-25

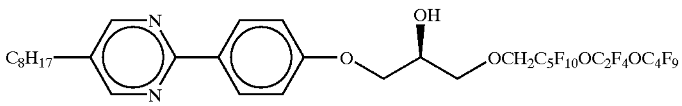

III-26

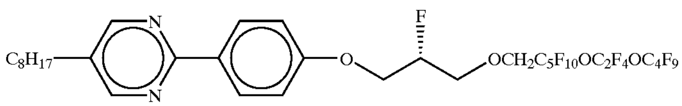

III-27

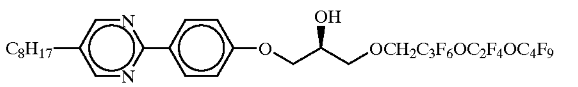

III-28

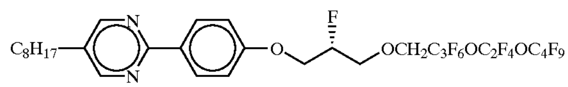

III-29

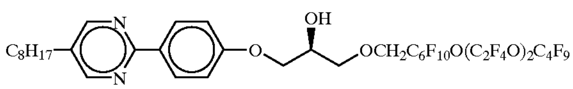

III-30

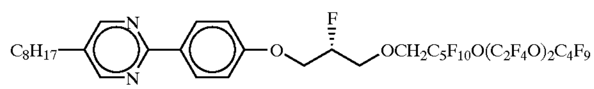

III-31

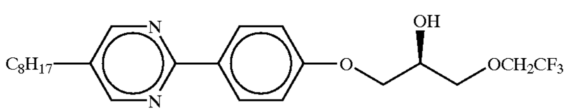

III-32

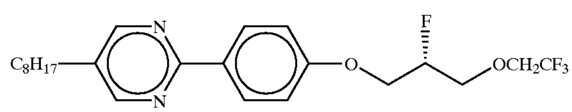

III-33

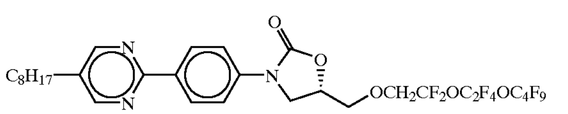

III-34

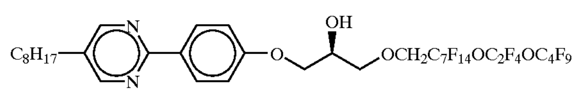

III-35

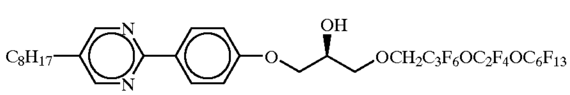

III-36

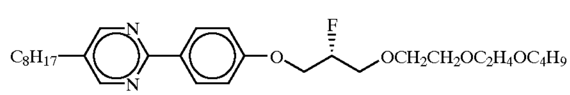

Referring again to FIGS. 1 and 2, the liquid crystal device according to the present invention may generally be sandwiched between a pair of polarizers (not shown) and driven by applying a voltage to the liquid crystal layer 27 for each pixel, thus changing a transmittance or a light quantity of a transmitted light incident from the substrate 21 side to effect display. The structure shown in FIGS. 1 and 2 is an example of a transmission-type liquid crystal device. It is possible to modify the device into that of a reflection-type by changing the substrate 21 or the pixel electrode into a reflection member or additionally forming a reflection member on the substrate 21, thus constituting a reflection-type liquid crystal device wherein an incident light from the substrate 22 side is reflected by the reflection member.

On the substrate 21, as mentioned above, the plurality of pixel electrodes 13 and corresponding active devices 14 connected with the pixel electrodes, respectively, are disposed in a matrix form. The active devices 14 may preferably be TFTs (as shown in FIG. 2) each comprising a semiconductor of amorphous silicon, polycrystalline silicon, microcrystalline silicon or single-crystalline silicon. Each of the TFTs 14 may ordinarily be comprised of, a gate electrode disposed on the substrate 21, a gate insulating film covering the gate electrode, a semiconductor layer formed on the gate insulating film, and a source electrode and a drain electrode formed on the semiconductor layer.

On the substrate 21, as shown in FIG. 1, the scanning signal (gate) lines 15 are disposed in the row direction of the pixel electrodes 13 and the data signal (source) lines 17 are disposed in the column direction of the pixel electrodes 13. Each of the TFTs 14 is electrically connected with a corresponding scanning signal line 15 via its gate electrode and with a corresponding data signal line 17 via its source electrode, respectively. The scanning signal lines 15 are connected via their terminal portions 16 to the gate line (row) driver 12. The data signal lines 17 are connected via their terminal portions 18 to the data line (column) driver 11. The gate line driver 12 supplies gate signals to the scanning signal lines 12 by successively selecting the scanning signal lines 12. In synchronism with the respective gate signals, the data line driver 11 supplies data signals corresponding to display data to the data signal lines 17, respectively.

The scanning signal lines 15 are coated with the gate insulating film except for the terminal portions 16, and the data signal line is 17 are formed on the gate insulating film. The pixel electrodes 13 are also formed on the gate insulating film and partially connected with corresponding drain electrodes of the TFTs 14, respectively.

On the other substrate 22, as shown in FIG. 2, the common electrode 14 disposed opposite to the pixel electrode 13 (on the substrate 21) are formed. The common electrode 14 is formed of a single electrode having an area over the entire display region and supplies a referential voltage. Further, each of the pixels may be provided with a capacitor as an auxiliary capacitance.

In the thus-constructed active matrix-type liquid crystal device, charges are injected into pixels along a scanning signal line in a gate-on period. After lapse of a short period, the gates are placed in an "OFF" state and data are written in pixels along a subsequent scanning signal line. As described above, the chiral smectic liquid crystal (composition) used in this embodiment has a spontaneous polarization (Ps), thus causing a voltage decrease in the gate-off period due to inversion of the spontaneous polarization except that switching (inversion) of liquid crystal molecules between two stage states is completed in the gate-on period. For this reason, it is preferable that the spontaneous polarization is not so large. Accordingly, as mentioned above, the spontaneous polarization of the chiral smectic liquid crystal (composition) may preferably be 10 $nC/cm^2$ or below. This is also preferred from the viewpoint of suppression of an occurrence of alignment defects due to inclusion of, e.g., polar impurities.

In this embodiment, it is possible to effect a gradational display between the two stable states the chiral smectic liquid crystal by using a liquid crystal material showing at least two stable states under no electric field application and an intermediate state (or partially inverted state), i.e., a co-present state of a plurality of domains between the two stable states under application of a prescribed electric field and disposing a pair of polarizers so as to provide a black display state in one stable state and a white display state in the other stable state. The resultant liquid crystal device can also memory the intermediate state.

The liquid crystal device prepared in this embodiment may be driven in the following manner.

The two stable states of the chiral smectic liquid crystal includes a stabler state and an unstabler state.

The liquid crystal device using such a chiral smectic liquid crystal may principally be driven by once resetting liquid crystal molecules in the stabler state for each pixel of the device and then applying a prescribed voltage corresponding to a desired display state. This is because, in contrast with the case of resetting in the unstabler state, the above driving method is effective in suppressing an adverse influence of a previous display state to improve a reproducibility of gradational display level. Accordingly, the driving method may be applied to various display modes including a partial re-writing mode for each pixel wherein a part of a display region is placed in a memory state and the remaining part is placed a driven state, a static picture display mode wherein the entire display region is utilized as a memory state, and a lower power consumption mode (power saving mode).

In the driving method, each pixel may preferably be supplied with a voltage signal from the data signal line including an alternating polarity-inverted voltage waveform (i.e., a polarity-inversion driving scheme).

Specifically, first, a voltage signal of one polarity for switching an initial state (the reset state in the stabler state) to the unstabler state is applied to the liquid crystal to cause switching between the two stable states of the liquid crystal, thus being converted into an optically modulated signal which can be used for a gradation display. Then, when the liquid crystal is supplied with the other polarity-voltage signal, the liquid crystal causes switching into the stabler state. In the case where such a driving method is used in the liquid crystal device of a normally black mode wherein the stabler state is set as the darkest (black) state by aligning one of polarizing axes of a pair of polarizers with the optical axis of liquid crystal molecules in the stabler state, the state switched into the stabler state provides a black state or a state very closer thereto. When the liquid crystal device is used as a display device, the liquid crystal display device can effect a so-called non-hold type display including a display period (placed in the unstabler state (and the intermediate state)) and a non-display period (placed in the stabler state) in one frame period. The liquid crystal device can also effect high-speed switching between the stabler state and the unstable state (constituting two stable states), thus providing excellent image qualities for motion picture display.

Each frame period may preferably include the non-display period for switching liquid crystal molecules toward the stabler state and the display period for switching toward the unstable state in an appropriate time ratio. The time ratio between the non-display period and the display period may preferably be 1:9 to 9:1, more preferably 3:7 to 7:3, in order to minimize a localization of a DC component of the driving voltage thereby to suppress an occurrence of burning. It is also preferred to minimize the localization of the DC voltage component in combination with the above time ratio between the non-display and display periods with respect to a data signal voltage value for switching toward the stabler state. More specifically, e.g., the time ratio between the non-display period and the display period is set to 1:1 and a reset signal of a polarity identical to but different in absolute value from a writing signal applied in the display period is supplied to the liquid crystal device in the non-display period immediately before or after the display period.

The liquid crystal device described above may be used as a display device of a direct view-type or a projection-type or as a light valve of a printer etc.

The liquid crystal device according to the present invention can constitute liquid crystal apparatus having various functions. For example, a liquid crystal display apparatus 101 having a control system as illustrated by its block diagram shown in FIG. 3 may be constituted by using a liquid crystal device according to the present invention as a display panel 103.

Figure 3:
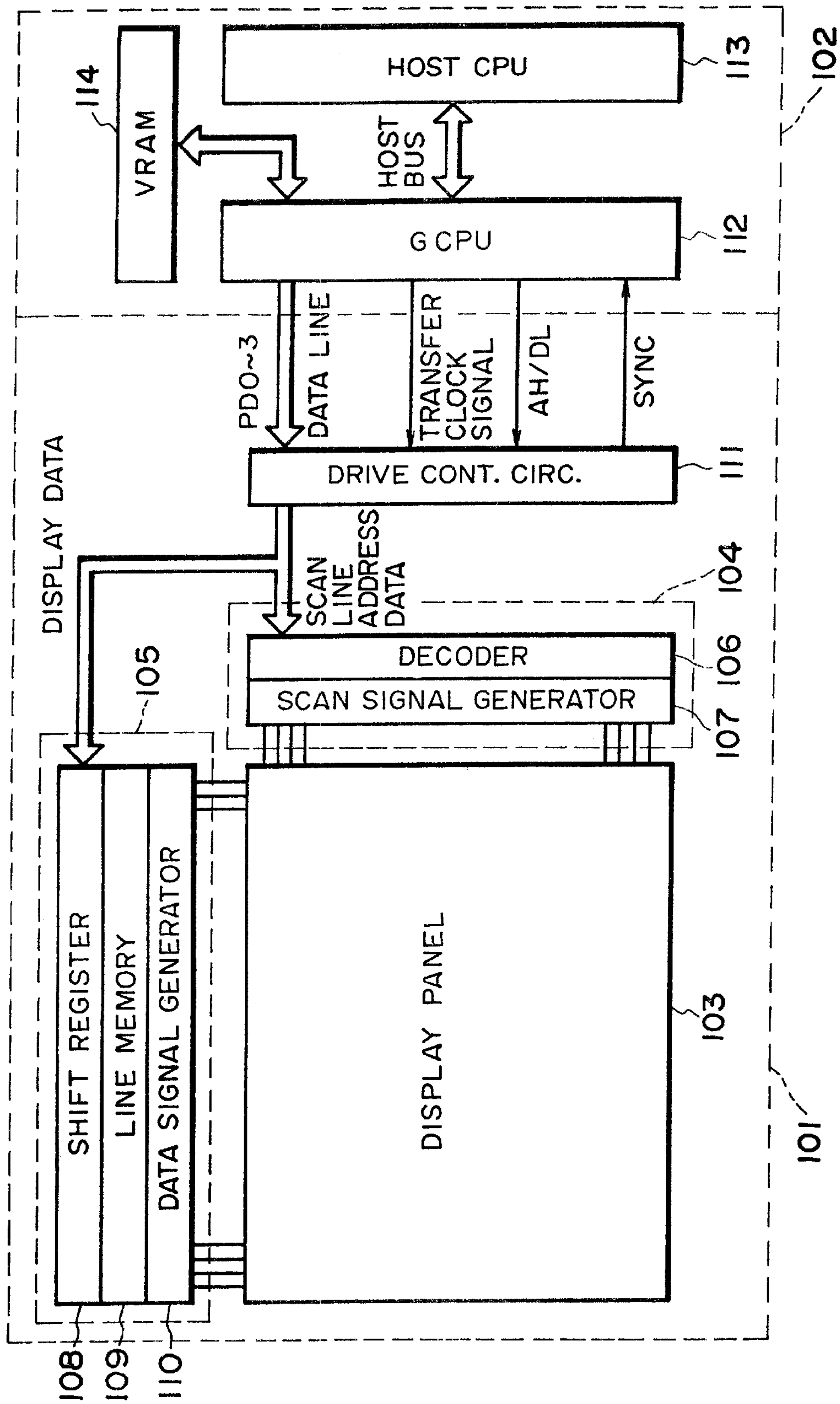
FIG. 3 is a block diagram of a liquid crystal display apparatus including the liquid crystal device according to the present invention and a graphic controller.

Referring to FIG. 3, the liquid crystal display apparatus 101 includes a graphic controller 102, a display panel 103, a gate line drive circuit 104, a data line drive circuit 105, a decoder 106, a gate line signal generator 107, a shift resistor 108, a line memory 109, a data signal generator 110, a drive control circuit 111, a graphic central processing unit (GCPU) 112, a host central processing unit (host CPU) 113, and an image data storage memory (video-RAM or VRAM) 114.

Figure 4:
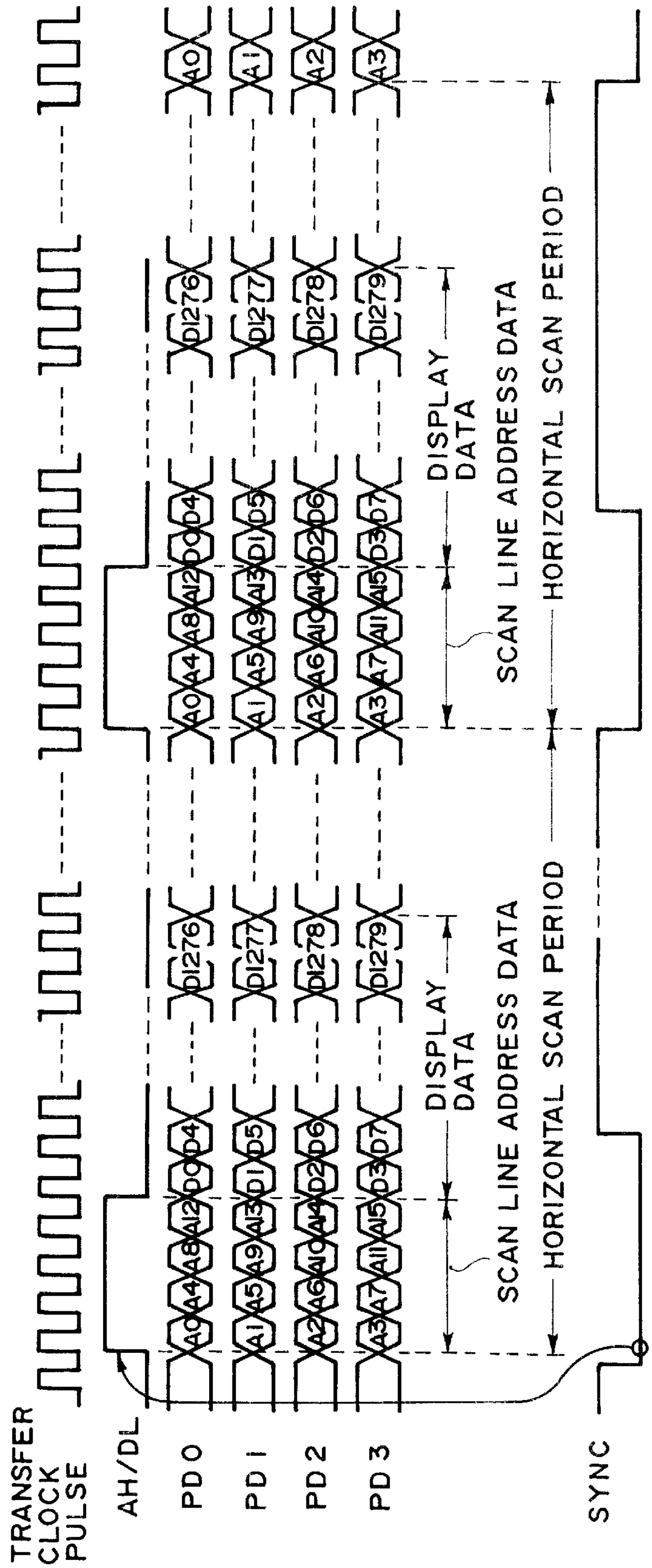
FIG. 4 is a time chart illustrating a manner of image data communication between the liquid crystal display apparatus and the graphic controller shown in FIG. 3.

FIG. 4 is a time chart illustrating a manner of data communication for transferring image data including scanning line address data and certain data format as illustrated by using a communication synchronizing means based on a SYNC signal.

More specifically, image data is generated from a graphic controller 102 in an apparatus main body and is transferred to the display panel 103 by signal transfer means as illustrated in FIGS. 3 and 4. The graphic controller 102 includes graphic central processing unit (GCPU) 112 and image data storage memory (VRAM) 114 as core units and is in charge of control and communication of image data between a host CPU 113 therein and the liquid crystal display apparatus 101. Incidentally, a light source (backlight) may be disposed, as desired, behind the display panel 103.

In case where the liquid crystal device according to the present invention is used in a liquid crystal display apparatus, the liquid crystal device shows a good switching characteristic, thus exhibiting excellent driving characteristic and reliability to achieve high-speed and large picture images.

As described above, the liquid crystal device of the present invention utilizes the stabler state of the two stable states as a black display state or an initial state. This is applicable to any driving methods.

For instance, in a driving method wherein the entire picture area is reset into an initial stage at the same time and data are written in a line-sequential manner, the reset state is set to the stabler state (of the two stable states) or the black display state by appropriately applying a driving signal or appropriately arranging the position of polarizers. In this embodiment, the stabler state may more preferably be utilized a the initial state as well as the black display state. As a result, when the chiral smectic liquid crystal is not supplied with a voltage, the chiral smectic liquid crystal is held in the black and stabler state.

Generally, under no electric field application, the chiral smectic liquid crystal having spontaneous polarization is liable to cause monostabilization leading to burning in the alignment state. However, when the chiral smectic liquid crystal is placed in the stabler state (of the two stable states) under application of no electric field as in this embodiment, the monostabilization which is ordinarily caused can effectively be suppressed, thus preventing an occurrence of burning due to the spontaneous polarization. This may be attributable to a counterbalance mechanism of electric fields such that the chiral smectic liquid crystal having spontaneous polarization forms an electric field within a liquid crystal cell (between a pair of substrates) based on the spontaneous polarization but when placed in the stabler state, a reverse electric field (an electric field of an opposite polarity to the above electric field based on the spontaneous polarization) is formed to counterbalance the electric field based on the spontaneous polarization in a static state, thus effectively suppressing the occurrence of the monostabilization.

Based on the electric field counterbalance mechanism in the static state, when the drive of the liquid crystal device is stopped or interrupted, the chiral smectic liquid crystal may preferably be placed in the stabler state of the two stable states.

Second Embodiment

In this embodiment, the liquid crystal device of the present invention is applicable to not only the case of different threshold voltages (in terms of 50% inversion) between two stable states as in First Embodiment described above but also the case of substantially same threshold voltages.

In this embodiment, the structural member and materials of the liquid crystal device are identical to those of the liquid crystal device used in First Embodiment (as shown in FIGS. 1 and 2) except for the liquid crystal material.

As the liquid crystal material used in this embodiment may comprise a chiral smectic liquid crystal composition comprising at least two compounds including at least one species of fluorine-containing mesomorphic compound which has smectic phase or latent smectic phase and a structure including: (a) a chiral or achiral fluorochemical terminal portion capable of containing at least one catenary ether oxygen atom, (b1) a chiral or achiral hydrocarbon terminal portion, and (c) a central core connecting the fluorochemical terminal portion and the hydrocarbon terminal portion; the liquid crystal composition comprising at least 10 wt. % in total of at least one species of fluorine-containing mesomorphic compound having a fluorochemical terminal portion free from a catenary ether oxygen atom (hereinbelow, this composition is referred to as "first composition") and a liquid crystal composition comprising at least two species of fluorine-containing mesomorphic compounds each of which has smectic phase or latent smectic phase and a structure including: (a) a chiral or achiral fluorochemical terminal portion capable of containing at least one catenary ether oxygen atom, (b2) a non-racemic achiral hydrocarbon terminal portion, and (c) a central core connecting the fluorochemical terminal portion and the hydrocarbon terminal portion; said at least two species of fluorine-containing mesomorphic compounds including at least two species of chiral fluorine-containing mesomorphic compounds which have mutually different absolute configurations or mutually different signs of spontaneous polarizations and occupy at least 30 wt. % in total of a plurality of chiral fluorine-containing mesomorphic compounds providing different absolute configurations or spontaneous polarizations different in sign or direction (hereinbelow, this composition is referred to as "second composition").

For the first composition, the fluorine-containing mesomorphic compound having smectic phase or latent smectic phase and the structure including the portions (a), (b1) and (c) may be obtained through processes described in, e.g., U.S. Pat. Nos. 5,082,587 and 5,482,650 and PCT Publications WO93/22396 and WO96/33251. Specifically, the fluorine-containing mesomorphic compound may preferably include those represented by the following general formulas (1), (2) and (3).

Formula (1)

$$R-\underset{X_l}{\underset{|}{(M)_a}}-A-\underset{Y_m}{\underset{|}{(N)_b}}-B-\underset{Z_n}{\underset{|}{(P)_c}}-D-R_f',$$

where M, N and P are each independently selected from the group consisting of

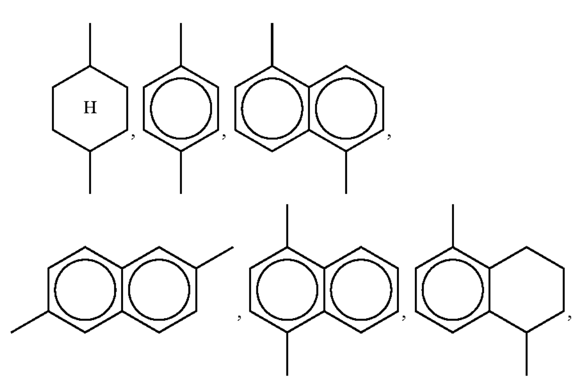

-continued

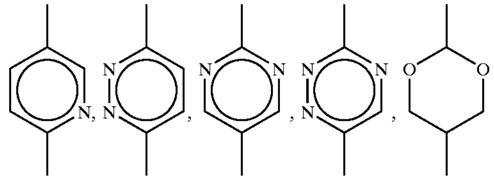

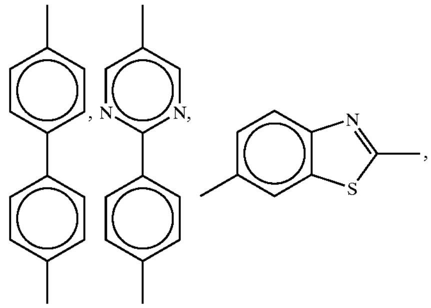

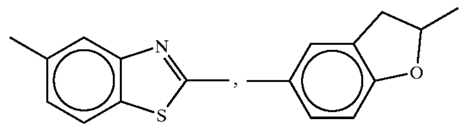

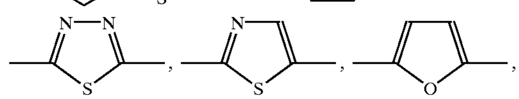

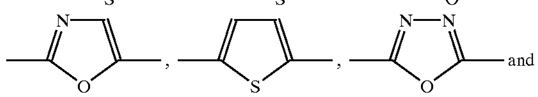

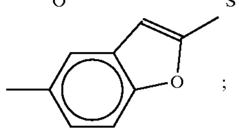

a, b and c are each independently zero or an integer of from 1 to 3, with the proviso that the sum of a+b+c be at least 1;

each A and B are non-directionally and independently selected from the group consisting of a covalent bond, —C(═O)—O—, —C(═O)—S—, —C(═O)—Se—, —C(═O)—Te—, —$(CH_2CH_2)_k$— where k is 1 to 4, —CH═CH—, —C≡C—, —CH═N—, —$CH_2$—O—, —C(═O)— and —O—;

each X, Y and Z are independently selected from the group consisting of —H, —Cl, —F, —Br, —I, —OH, —$OCH_3$, —$CH_3$, —$CF_3$, —$OCF_3$, —CN and —$NO_2$;

each l, m and n are independently zero or an integer of 1 to 4;

D is non-directionally selected from the group consisting of a covalent bond, —C(═O)—O—$C_rH_{2r}$—, —O—$C_rH_{2r}$—, —O—(O═)C—$C_rH_{2r}$—, —C≡C—, —CH═CH—, —C(═O)—, —O—$(C_sH_{2s}O)_t$$C_{r'}H_{2r'}$—, $C_rH_{2r}$—, —$(C_sH_{2s}O)_t$$C_{r'}H_{2r'}$—,

—O—, —S—, —$OSO_2$—, —$SO_2$—,

—$SO_2$—$C_rH_{2r}$—, —$C_rH_{2r}$—N($C_pH_{2p+1}$)—$SO_2$—,

—N($C_pH_{2p+1}$)—, —$C_rH_{2r}$—N($C_pH_{2p+1}$)—C(═O)—,

—CH═N—, and combinations thereof, where r and r' are independently integers of 0 to 20, s is independently an integer of 1 to 10 for each ($C_sH_{2s}O$), t is an integer of 1 to 6, and p is an integer of 0 to 4;

R is selected from the group consisting of —O—$((C_{q'}H_{2q'-v'}$—$(R')_{v'})$—O$)_w$—$C_qH_{2q+1-v}$—$(R')_v$, —$((C_{q'}H_{2q'-v'}$—$(R')_{v'})$—O$)_w$—$C_qH_{2q+1-v}$—$(R')_v$, —C(═O)—O—$C_qH_{2q+1-v}$—$(R')_v$, —O—(O═)C—$C_qH_{2q+1-v}$—$(R')_v$,

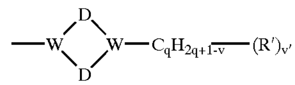

and —CR'H—$(D)_g$—CR'H—$C_qH_{2q+1-v}$—$(R')_v$, where each R[1] is independently selected from the group consisting of —Cl, —F, —$CF_3$, —$NO_2$, —CN —H, —$C_qH_{2q+1}$, —O—(O═)C—$C_qH_{2q+1}$, —C(═O)—O—$C_qH_{2q+1}$, —Br, —OH and —$OC_qH_{2q+1}$; q' is independently an integer of 1 to 20 for each ($C_{q'}H_{2q'}$—O); q is an integer of 1 to 20; w is an integer of 0 to 10; v is an integer of 0 to 6; each v' is independently an integer of 0 to 6; g is an integer of 1 to 3; each D is independently and non-directionally selected from the group set forth for D above, with the proviso that the ring containing D has from 3 to about 10 ring atoms; each W is independently selected from the group consisting of N, CR' and SiR'; and R is chiral or achiral; and $R_f'$ is is —R*—D—$(O)_x$—$CH_2$—D'—$R_f$, where R* is a cyclic or acyclic chiral moiety; D and D' are each independently and non-directionally selected from the group set forth for D above; x is an integer of 0 or 1; and $R_f$ is fluoroalkyl, perfluoroalkyl, fluoroether, or perfluoroether.

Formula (2)

$$R\text{—}\underset{X_l}{(M)_a}\text{—}A\text{—}\underset{Y_m}{(N)_b}\text{—}B\text{—}\underset{Z_n}{(P)_c}\text{—}D\text{—}R_{f1},$$

where M, N and P are each independently selected from the group consisting of

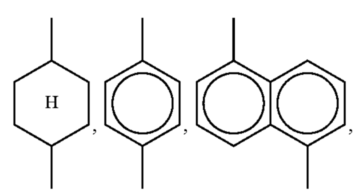

-continued

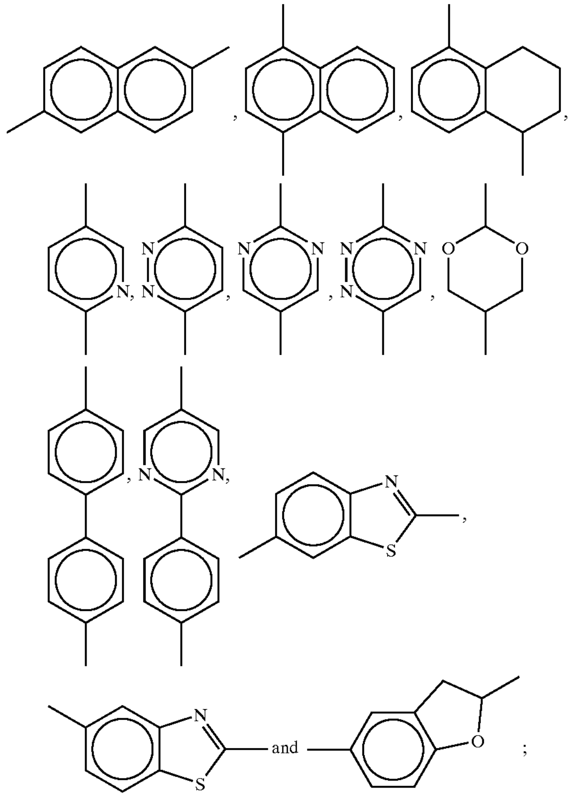

a, b and c are each independently zero or an integer of from 1 to 3, with the proviso that the sum of a+b+c be at least 1;

each A and B are non-directionally and independently selected from the group consisting of a covalent bond, —C(═O)—O—, —C(═O)—S—, —C(═O)—Se—, —C(═O)—Te—, —$(CH_2CH_2)_k$— where k is 1 to 4, —CH≡CH—, —C≡C—, —CH═N—, —$CH_2$—O—, —C(═O)— and —O—;

each X, Y and Z are independently selected from the group consisting of —H, —Cl, —F, —Br, —I, —OH, —$OCH_3$, —$CH_3$, —$CF_3$, —$OCF_3$, —CN and —$NO_2$;

each l, m and n are independently zero or an integer of 1 to 4;

D is non-directionally selected from the group consisting of a covalent bond, —C(═O)—O—$C_rH_{2r}$—, —O—$C_rH_{2r}$—, —O—$(C_sH_{2s}O)_tC_{r'}H_{2r'}$—, —$C_rH_{2r}$—, —$OSO_2$—,

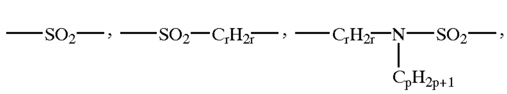

and

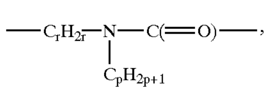

where r and r' are independently integers of 1 to 20, s is independently an integer of 1 to 10 for each $(C_sH_{2s}O)$, t is an integer of 1 to 6, and p is an integer of 0 to 4;

R is straight chain or branched and is selected from the group consisting of —O—$(C_qH_{2q}$—$O)_w$—$C_{q'}H_{2q'+1}$, —$(C_pH_{2p}$—$O)_w$—$C_{q'}H_{2q'+1}$, —$C_qH_{2q}$—R', O—$C_qH_{2q}$—R', —CO—O—$C_qH_{2q}$—R', and —O—OC—$C_qH_{2q}$—R', where each R' is independently selected from the group consisting of —Cl, —F, —$CF_3$, —$NO_2$, —CN —H, —O—(O═)C—$C_{q'}H_{2q'+1}$, and —C(═O)—O—$C_{q'}H_{2q'+1}$; q and q' are independently an integer of 1 to 20 and w is an integer of 1 to 10; and $R_{f1}$ is —$(CF_2)_{w'}$—O—$(C_xF_{2x}O)_zC_yF_{2y+1}$ where w' is an integer of 5–16; x is independently an integer of 1–10 for each $(C_xF_{2x}O)$; y is an integer of 1–10; and z is an integer of 1–10.

Formula (3)

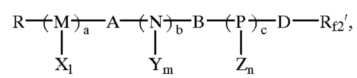

where M, N and P are each independently selected from the group consisting of

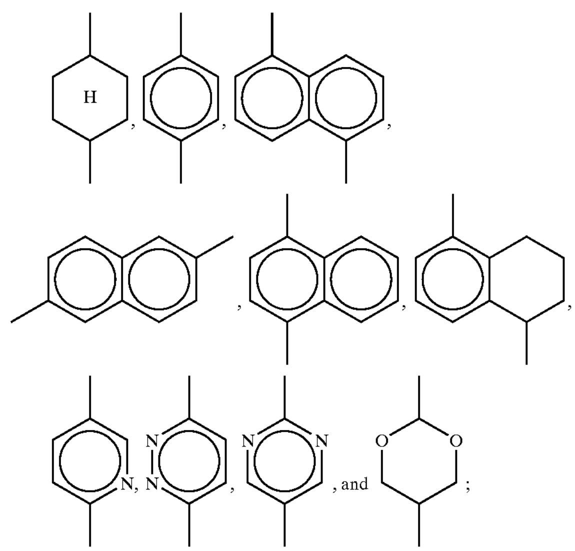

a, b and c are each independently zero or an integer of from 1 to 3, with the proviso that the sum of a+b+c be at least 1;

each A and B are non-directionally and independently selected from the group consisting of a covalent bond, —C(═O)—O—, —C(═O)—S—, —C(═O)—Se—, —C(═O)—Te—, —$CH_2CH_2$—, —CH═CH—, —C≡C—, —CH═N—, —$CH_2$—O—, —C(═O)— and —O—;

each X, Y and Z are independently selected from the group consisting of —H, —Cl, —F, —Br, —I, —OH, —$OCH_3$, —$CH_3$, —CN and —$NO_2$;

each l, m and n are independently zero or an integer of 1 to 4;

D is non-directionally selected from the group consisting of —C(═O)—O—$C_rH_{2r}$—, —O—$C_rH_{2r}$—, —$C_rH_{2r}$—, —$OSO_2$—, —$SO_2$—, —$SO_2$—$C_rH_{2r}$—, —O—$C_rH_{2r}$—O—$C_{r'}$—

$H_{2r'}$—, —$C_rH_{2r}$—N($C_pH_{2p+1}$)—$SO_2$—, and

—$C_rH_{2r}$—N($C_pH_{2p+1}$)—C(=O)—, where r and r' are independently integers of 1 to 20, and p is an integer of 0 to 4;

R is straight chain or branched and is selected from the group consisting of —O—$C_qH_{2q}$—O—$C_{q'}H_{2q'+1}$, —$C_1H_{2q}$—O—$C_{q'}H_{2q'+1}$, —$C_qH_{2q}$—R', —O—$C_qH_{2q}$—R', —CO—O—$C_qH_{2q}$—R' and —O—OC—$C_qH_{2q}$—R', where each R' is —O—(O=)C—$C_{q'}H_{2q'+1}$ or —C(=O)—O—$C_{q'}H_{2q'+1}$; q and q' are independently an integer of 1 to 20; and $R_{f2}$ is $C_qF_{2q}$—X where X is H or F; and q is independently an integer of 1–20.

Specific examples of the fluorine-containing mesomorphic compounds represented by the above general formulas (1), (2) and (3) are shown below.

1-1

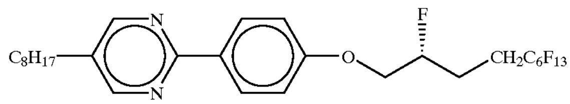

1-2

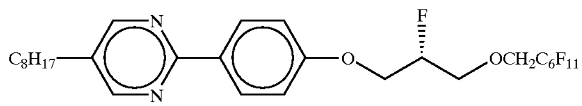

1-3

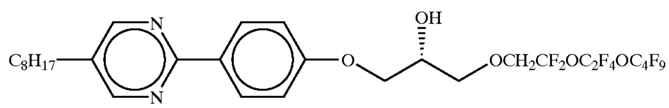

1-4

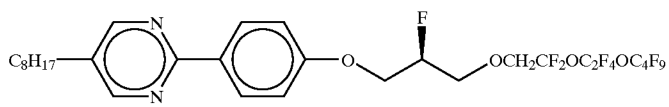

1-5

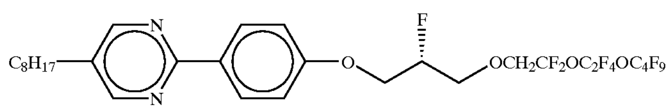

1-6

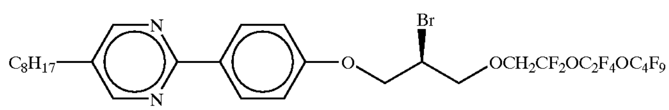

1-7

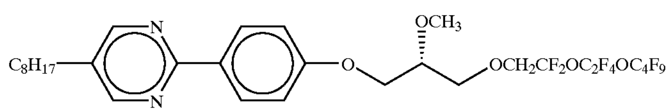

1-8

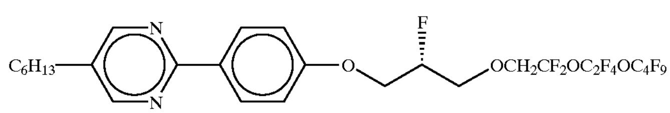

1-9

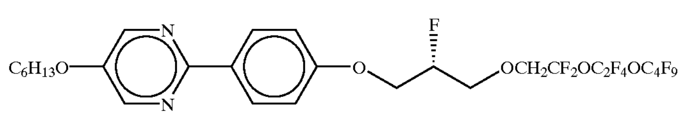

1-10

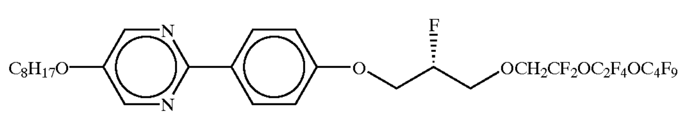

1-11

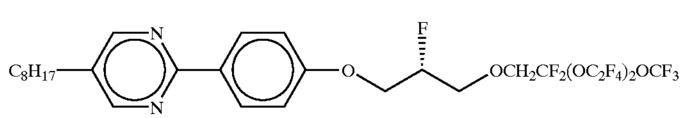

-continued
1-12
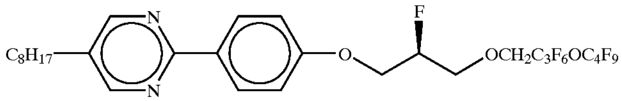
1-13
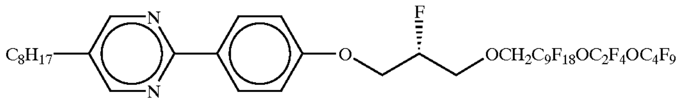
1-14
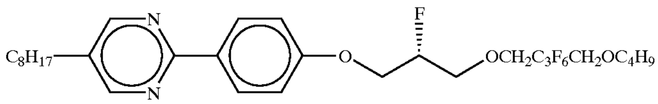
1-15
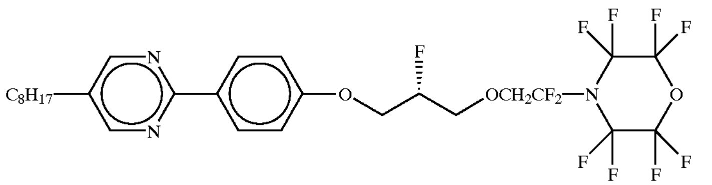
1-16
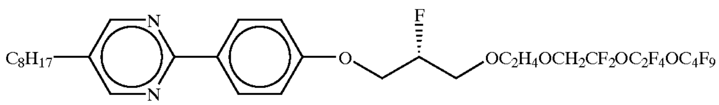
1-17
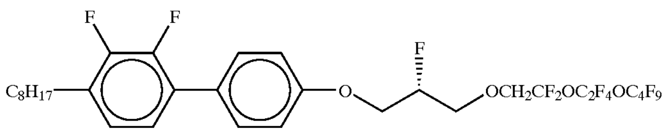
1-18
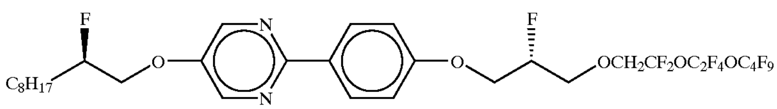
1-19
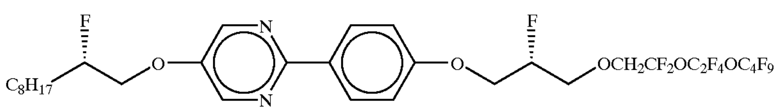
1-20
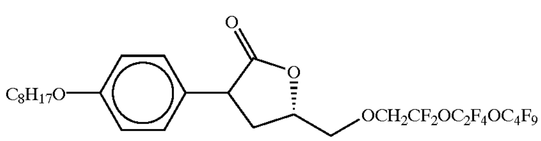
1-21
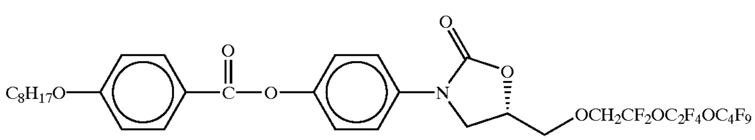
1-22 CIS
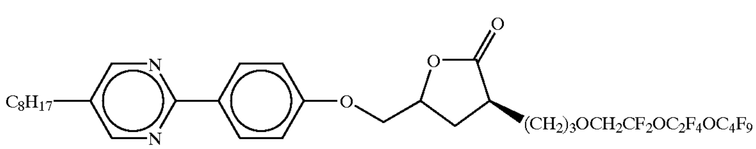
1-22 TRANS
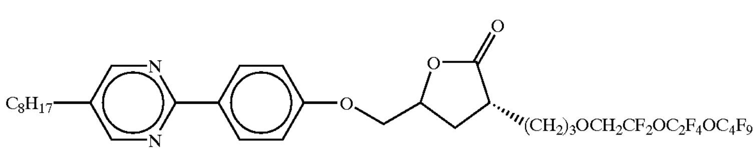

-continued
1-23
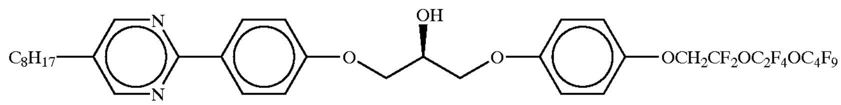
1-24
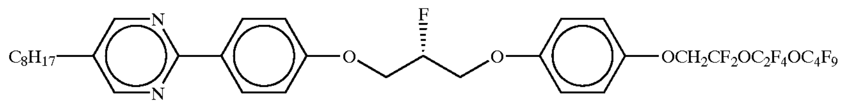
1-25
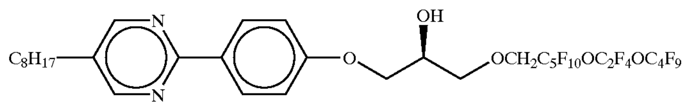
1-26
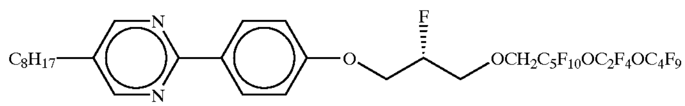
1-27
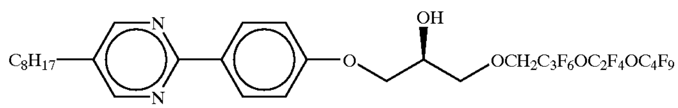
1-28
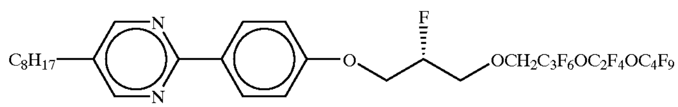
1-29
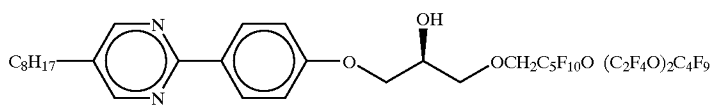
1-30
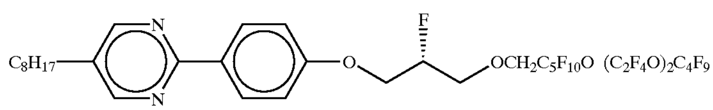
1-31
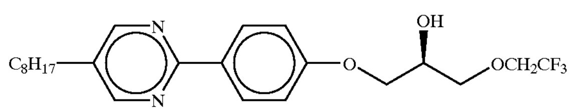
1-32
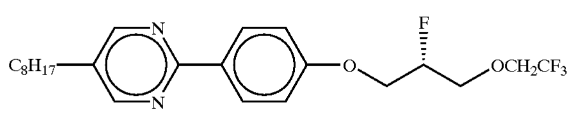
1-33
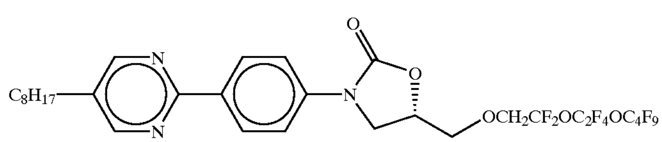
1-34
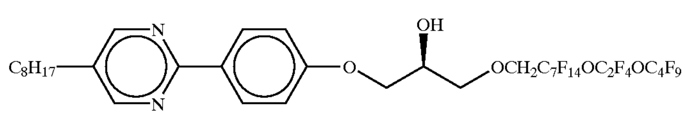
1-35
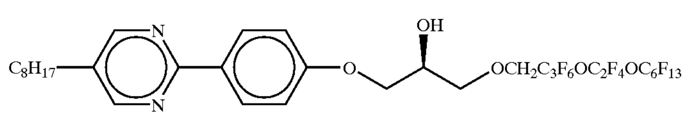
1-36
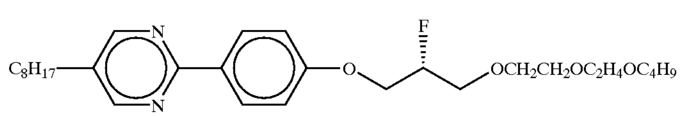

-continued
2-1
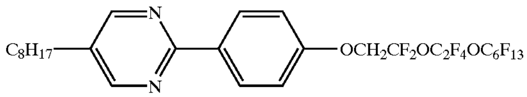
2-2
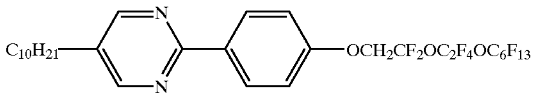
2-3
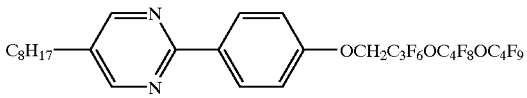
2-4
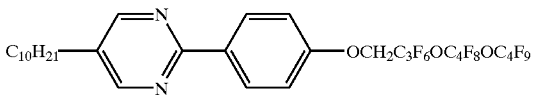
2-5
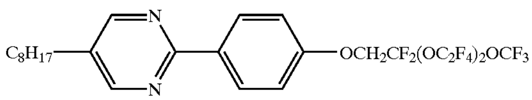
2-6
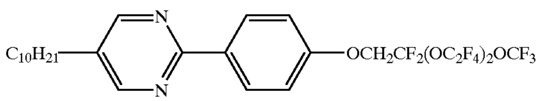
2-7
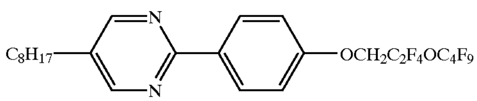
2-8
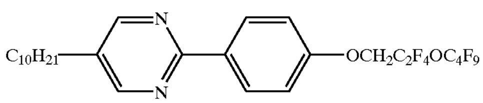
2-9
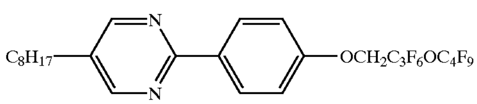
2-10
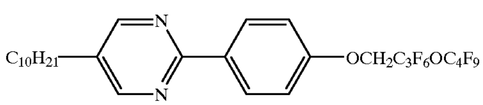
2-11
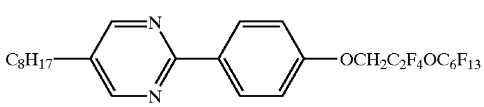
2-12
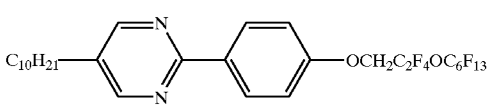
2-13
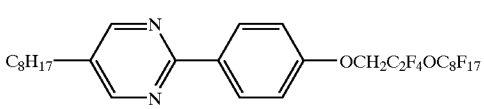
2-14
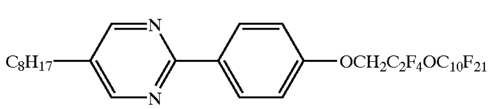
2-15
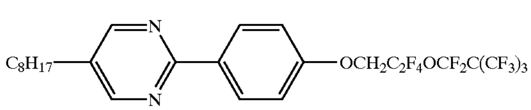

-continued
2-16
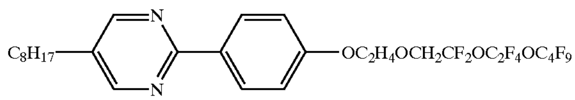
2-17
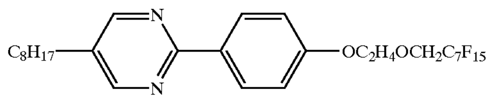
2-18
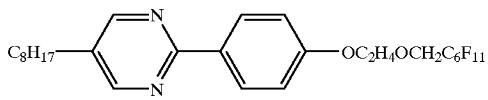
2-19
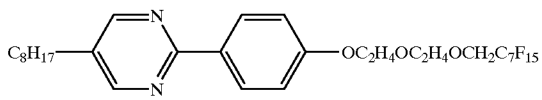
2-20
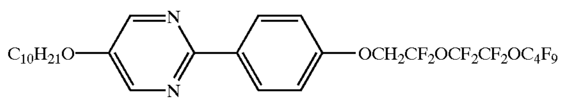
2-21
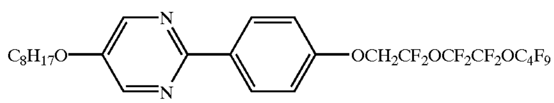
2-22
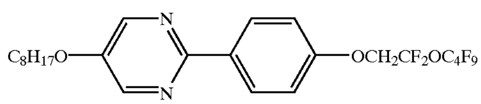
2-23
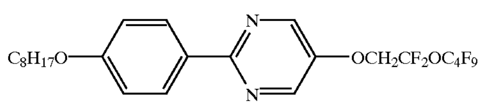
2-24
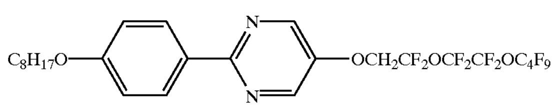
2-25
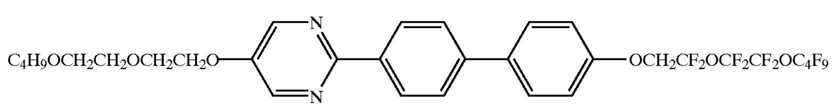
2-26
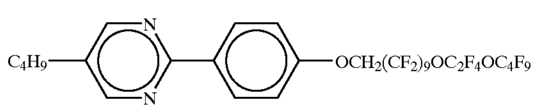
2-27
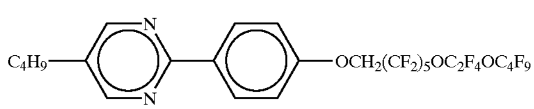
2-28
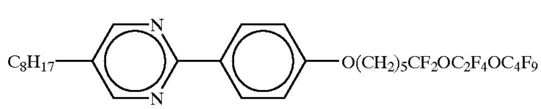
2-29
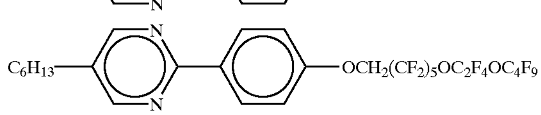
2-30
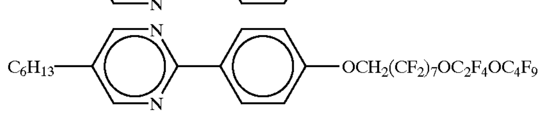

-continued
2-31
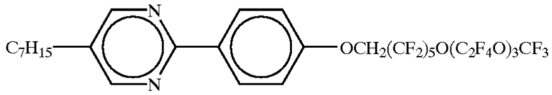
2-32
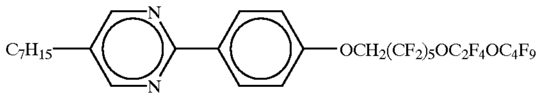
2-33
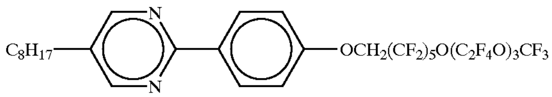
2-34
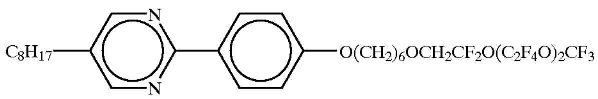
2-35
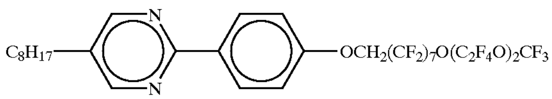
2-36
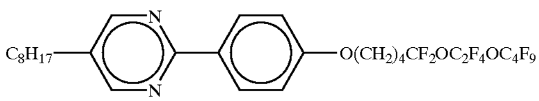
2-37
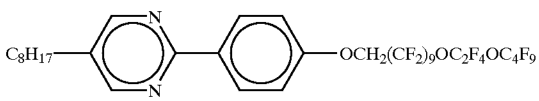
2-38
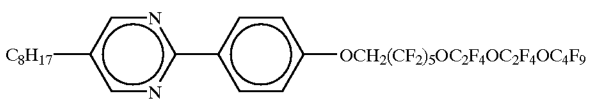
2-39
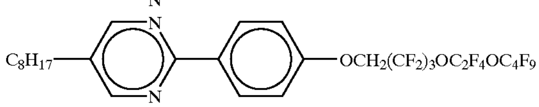
2-40
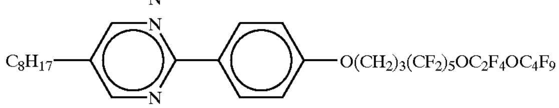
2-41
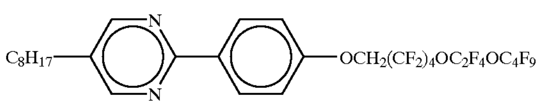
2-42
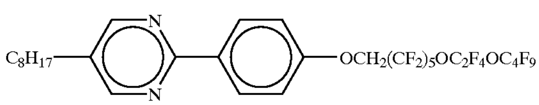
2-43
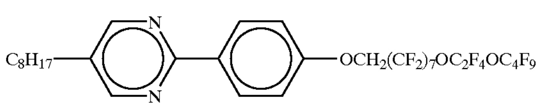
2-44
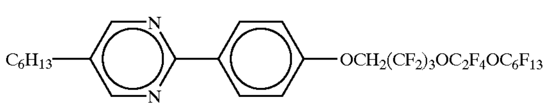
2-45
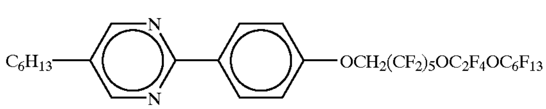
2-46
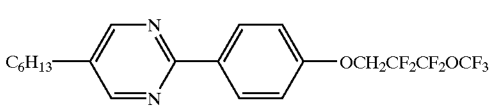

-continued
2-47
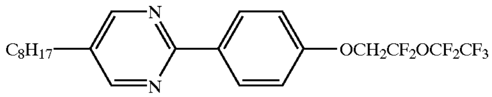
2-48
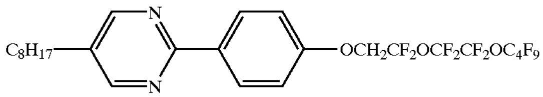
2-49
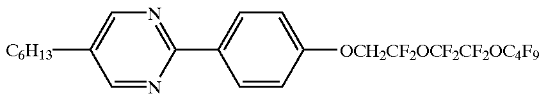
2-50
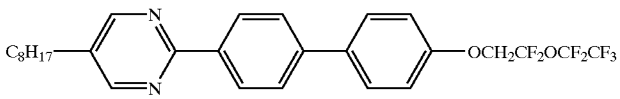
2-51
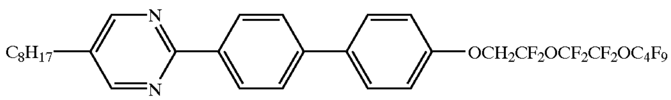
2-52
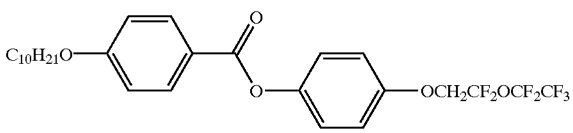
2-53
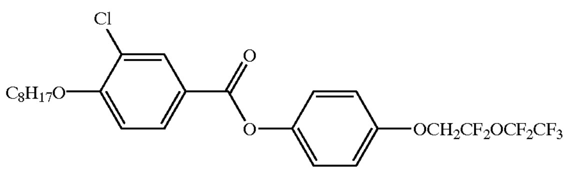
2-54
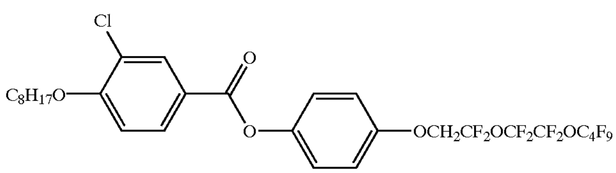
2-55
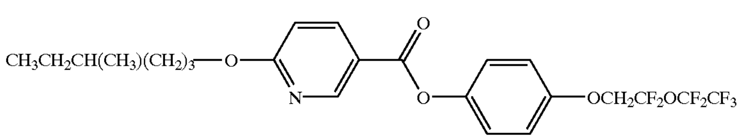
2-56
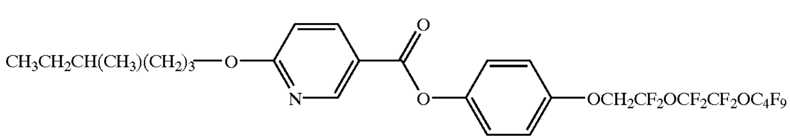
2-57
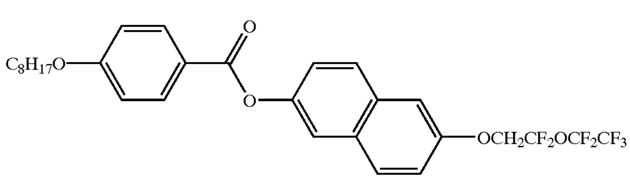

-continued
2-58
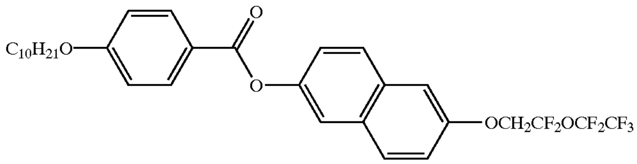
2-59
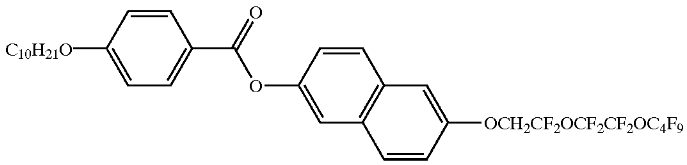
2-60
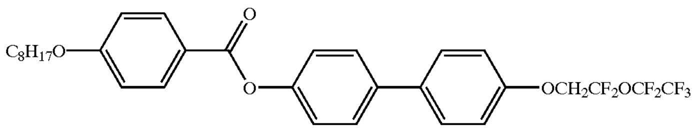
2-61
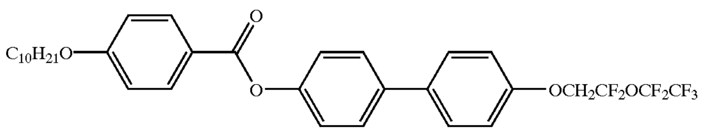
2-62
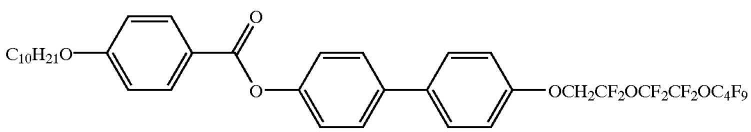
2-63
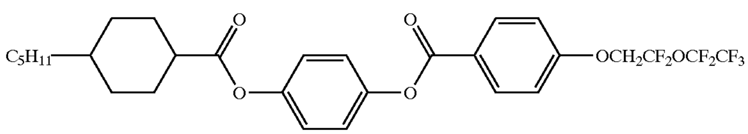
2-64
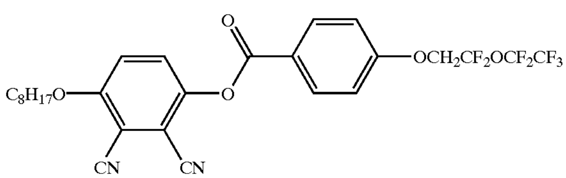
2-65
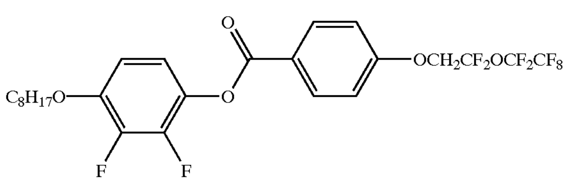
2-66
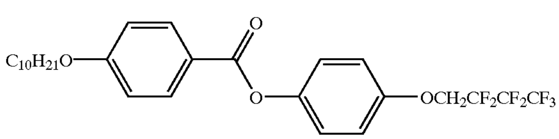
2-67
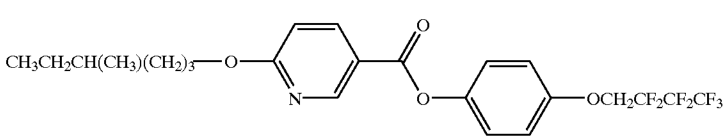

-continued
2-68
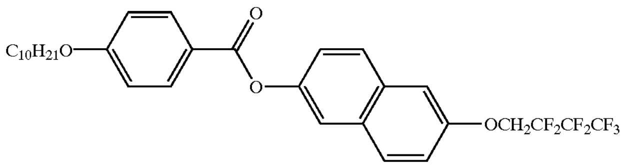
2-69
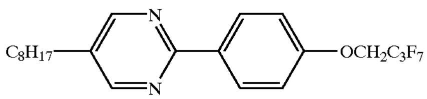
2-70
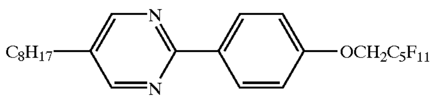
2-71
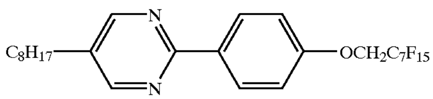
2-72
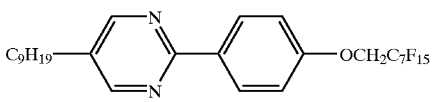
2-73
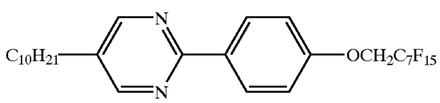
3-1
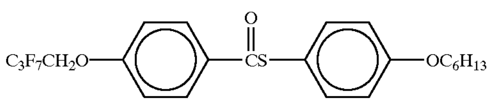
3-2
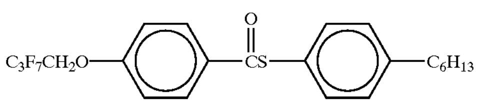
3-3
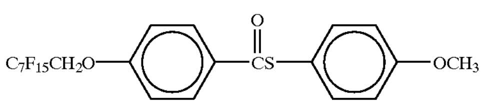
3-4
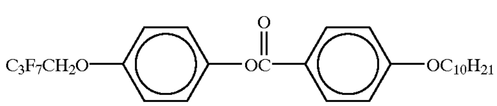
3-5
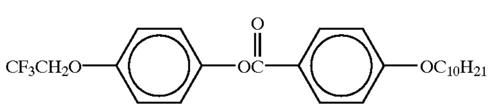
3-6
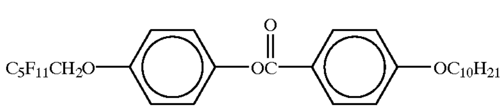
3-7
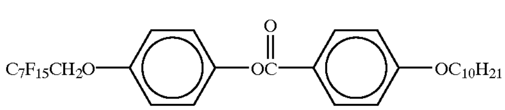
3-8
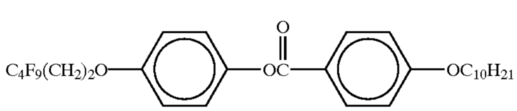

-continued
3-9
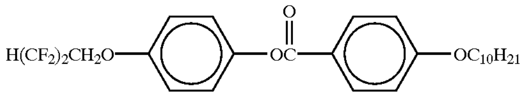
3-10
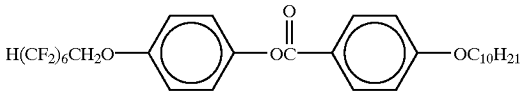
3-11
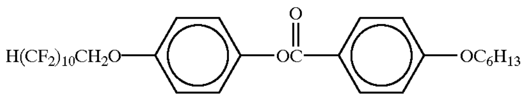
3-12
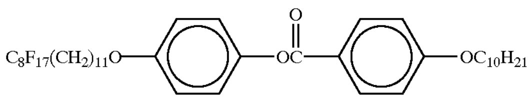
3-13
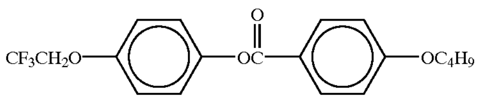
3-14
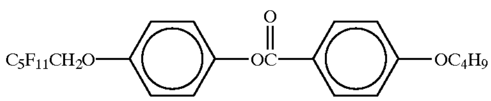
3-15
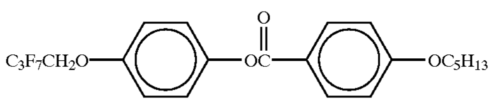
3-16
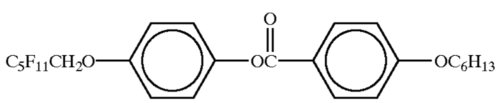
3-17
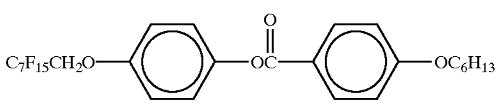
3-18
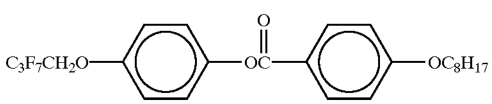
3-19
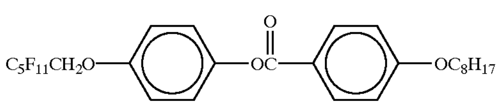
3-20
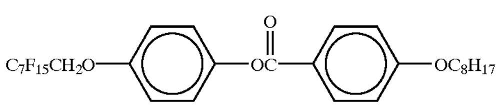
3-21
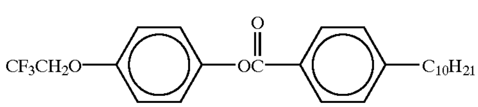
3-22
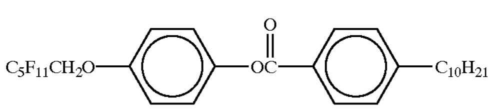

-continued
3-23
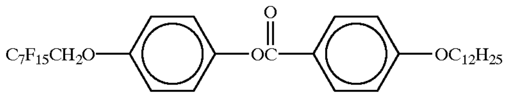
3-24
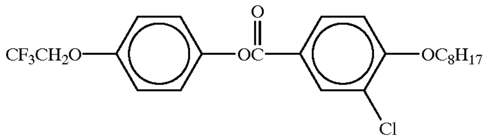
3-25
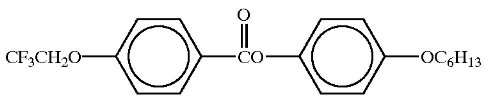
3-26
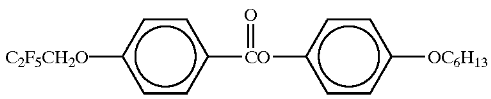
3-27
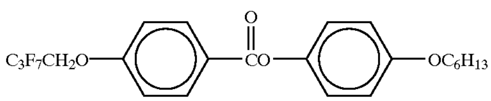
3-28
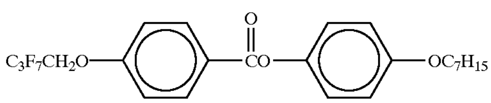
3-29
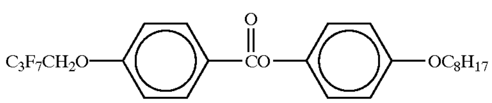
3-30
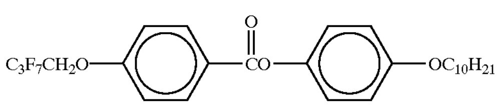
3-31
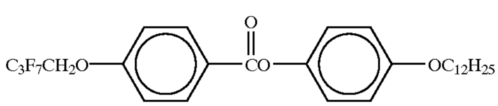
3-32
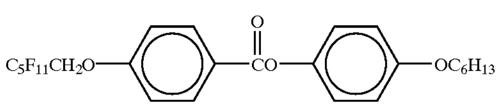
3-33
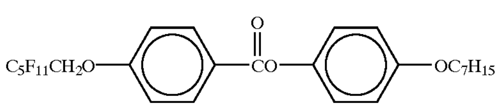
3-34
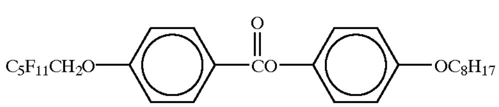
3-35
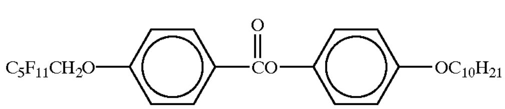
3-36
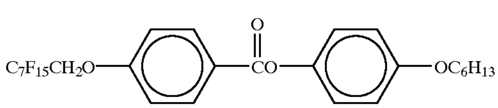

-continued
3-37
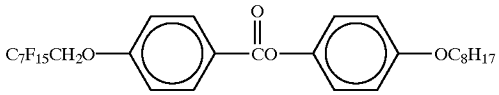
3-38
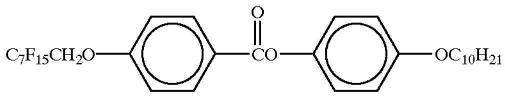
3-39
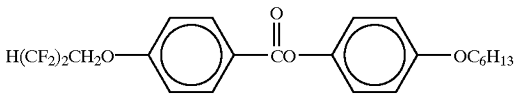
3-40
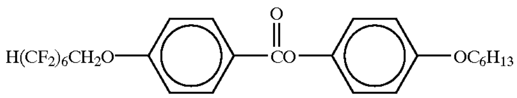
3-41
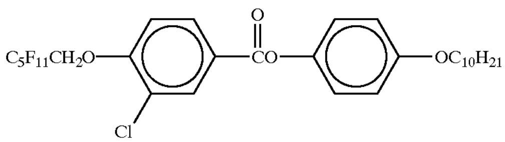
3-42
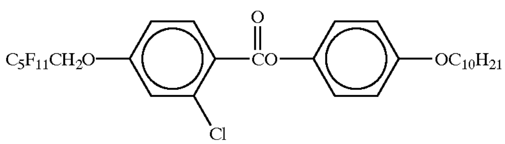
3-43
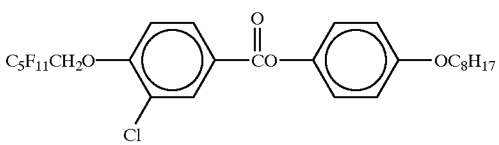
3-44
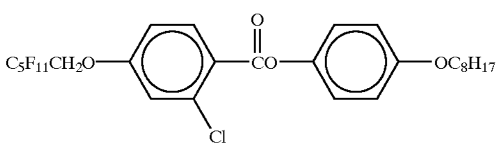
3-45
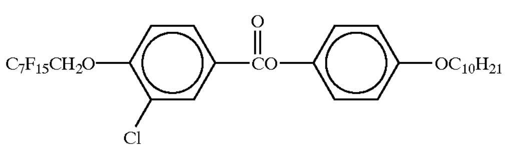
3-46
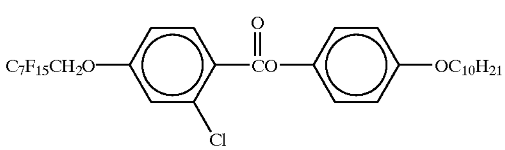
3-47
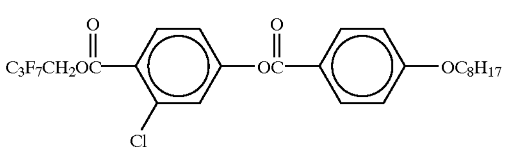
3-48
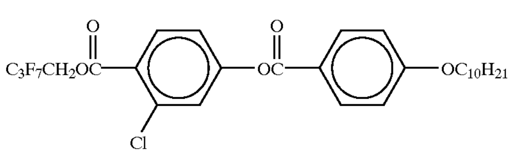

-continued
3-49
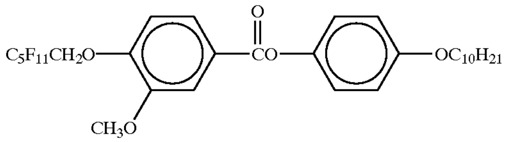
3-50
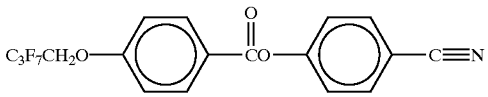
3-51
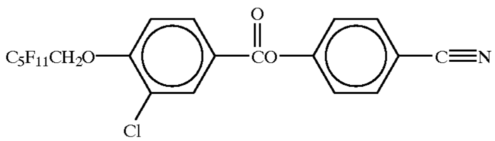
3-52
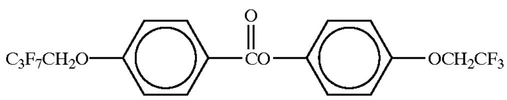
3-53
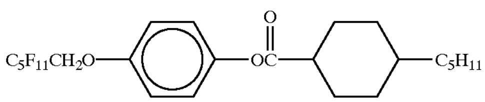
3-54
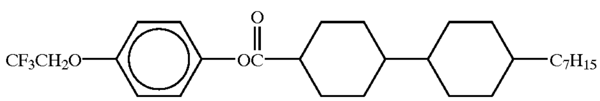
3-55
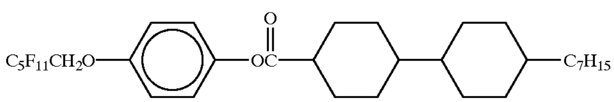
3-56
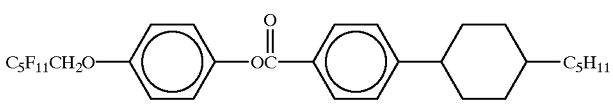
3-57
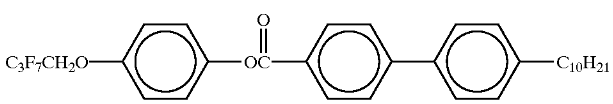
3-58
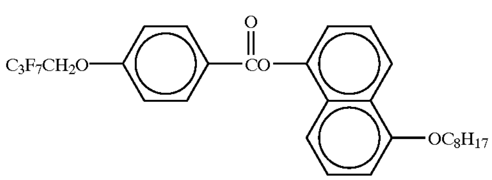
3-59
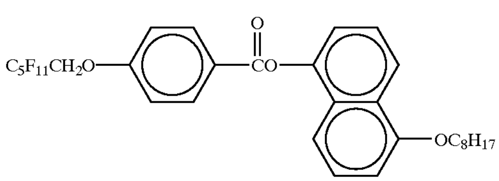
3-60
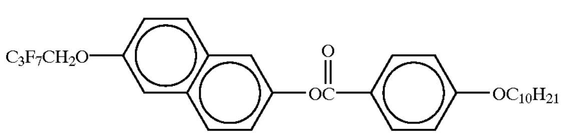

-continued
3-61
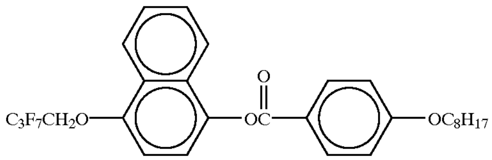
3-62
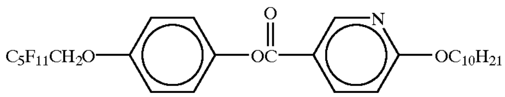
3-63
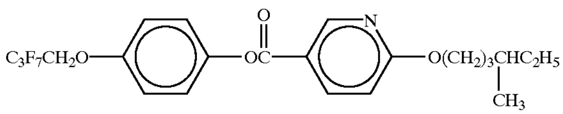
3-64
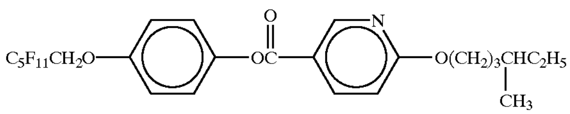
3-65
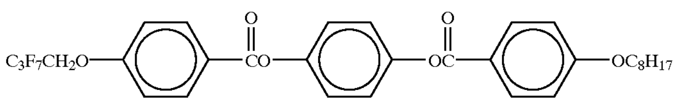
3-66
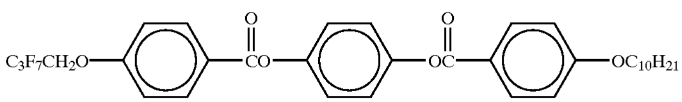
3-67
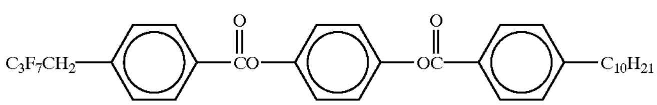
3-68
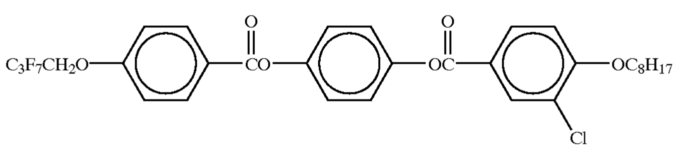
3-69
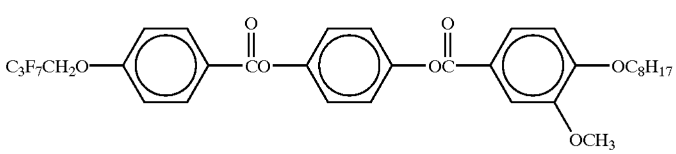
3-70
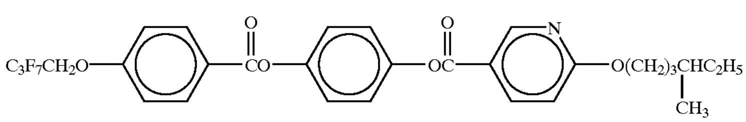
3-71
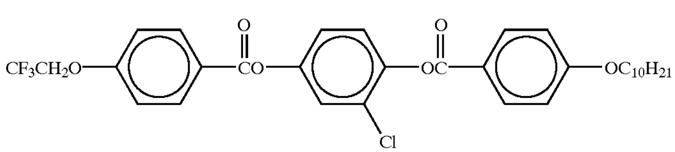
3-72
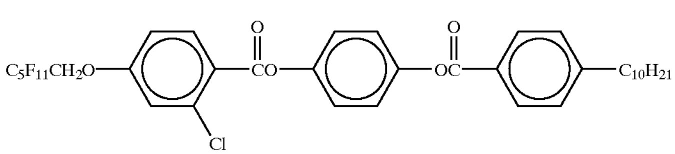

-continued
3-73
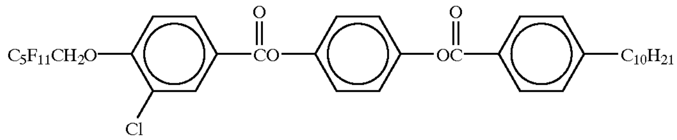
3-74
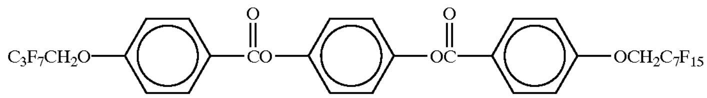
3-75
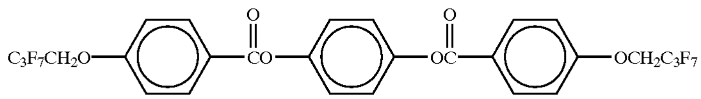
3-76
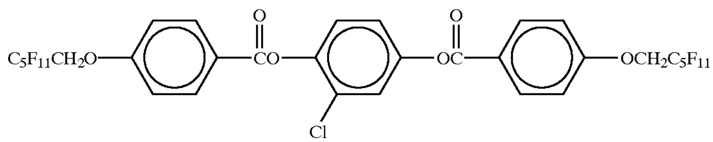
3-77
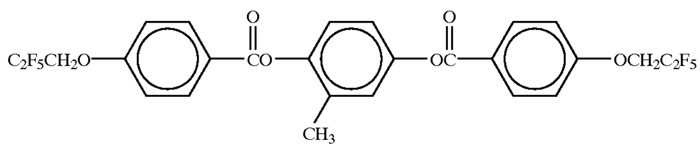
3-78
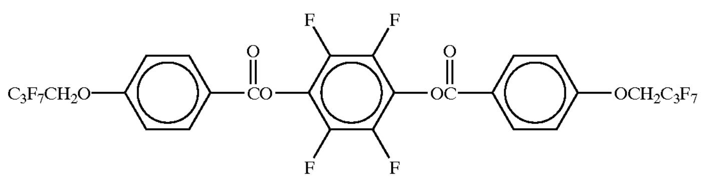
3-79
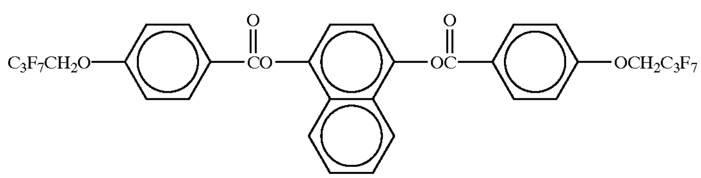
3-80
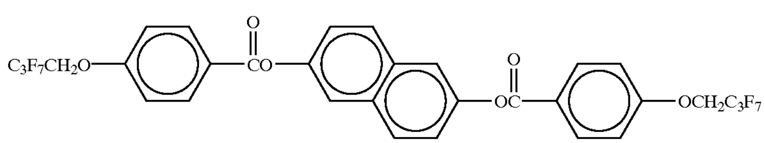
3-81
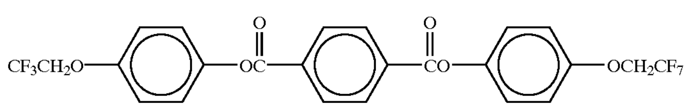
3-82
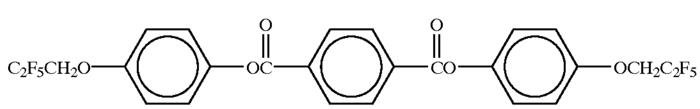
3-83
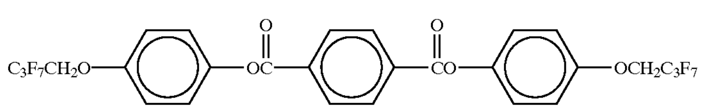
3-84
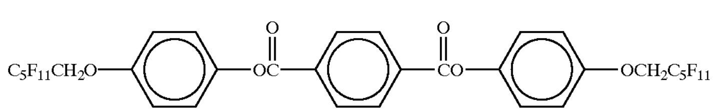

The first composition is characterized by comprising at least 10 wt. % in total of a fluorine-containing mesomorphic compound having a structure including a fluorochemical terminal portion free from a catenary ether oxygen atom. Examples of the fluorine-containing mesomorphic compound of this type may include those represented by the above formula (3).

In the active matrix-type liquid crystal device as in this embodiment, particularly in view of a residual DC voltage component and a voltage-holding rate, a driving method wherein voltage signals of different polarities are alternately applied (so-called AC symmetrical driving scheme) may preferably be adopted. In the active matrix-type liquid crystal device, the frequency of the driving signal is identical to an ordinary frame frequency of 60 Hz or two or three times the frame frequency. In the case of a liquid crystal device using a chiral smectic liquid crystal having bistability, different from a TN (twisted nematic)-type liquid crystal device, a driving method wherein writing is performed by using only a voltage signal of one polarity and resetting is performed by using a voltage signal of the other (opposite) polarity. In this embodiment, such a driving method that the writing signal of one polarity and the reset signal of the other polarity are applied in an alternating manner may advantageously be employed.

When a liquid crystal device using a chiral smectic liquid crystal composition comprising fluorine-containing mesomorphic compounds is driven by the above driving method, chiral smectic liquid crystal molecules are ordinarily liable to cause an inversion alignment defect in a direction of their layer direction in the case of displaying black state. The inversion alignment defect adversely affects a contrast ratio of the resultant liquid crystal device.

We have found that in the first composition used in the liquid crystal device of the present invention the fluorine-containing mesomorphic compound having a fluorochemical terminal portion free from a catenary ether oxygen atom (as specifically shown by the structural formulas (3-1)–(3-84)) contained in the first composition in an amount of at least 10 wt. % in total is effective in substantially preventing an occurrence of the inversion alignment defect, thus improving the contrast ratio. This effect has not been found in the case of a liquid crystal device driven in a so-called simple matrix driving scheme. The effect is achieved by using small amount of the catenary ether oxygen atom-free fluorine-containing mesomorphic compounds but may effectively be achieved by using at least 10 wt. %, particularly at least 20 wt. % in total of the fluorine-containing mesomorphic compounds based on the first composition.

On the other hand, a chiral smectic liquid crystal composition consisting only of fluorine-containing mesomorphic compounds each including a fluorochemical terminal portion having at least one catenary ether oxygen atom is liable to assume a so-called bookshelf structure or structure having small layer inclination angle less causing zig-zag alignment defects. However, as in the first composition used in this embodiment, it is possible to prepare a chiral smectic liquid crystal composition showing a smaller layer inclination angle by appropriately changing the content of the fluorine-containing mesomorphic compound having the catenary ether oxygen-free fluorochemical portion (as represented by the formula (3) described above).

In this embodiment, the first composition (comprising at least two fluorine-containing mesomorphic compounds each having the portions (a), (b1) and (c) and containing at least 10 wt. % in total of the fluorine-containing mesomorphic compound having the catenary ether oxygen-containing fluorochemical portion (b1)) may preferably be composed essentially of fluorine-containing mesomorphic compounds each having smectic phase or latent smectic phase and a structure including the portions (a), (b1) and (c) and containing at least 10 wt. % in total of at least one fluorine-containing mesomorphic compound having a catenary ether oxygen-free fluorine-containing mesomorphic compound. In this regard, such a first composition may further contain a very small amount of impurities within an extent not adversely effecting the above-mentioned advantageous effects of the first composition.

The fluorine-containing mesomorphic compounds represented by the above-mentioned formulas (1), (2) and (3) may preferably be used as components of the first composition since these compounds can readily be reduced in ion content by purification and provide the resultant first composition with a good uniform alignment characteristic.

Next, the second composition used in this embodiment will be described.

The second composition principally comprises at least two fluorine-containing mesomorphic compounds each having smectic (or latent smectic) phase and the portions (a), (b2) and (c) as described above. Examples of these fluorine-containing mesomorphic compounds may include those represented by the formula (1), (2) and (3) and may specifically be enumerated by structural formulas (1-1)–(1-36), (2-1)–(2-73) and (3-1)–(3-84) except for two structural formulas (1-18) and (1-19).

Japanese Patent Publication No. 2692815 proposes a chiral smectic liquid crystal composition comprising hydrocarbon-based mesomorphic compounds (different from the fluorine-containing mesomorphic compounds as in the second composition) providing spontaneous polarizations different in sign or direction in combination, thus enlarging a temperature range of SmC* (chiral smectic C phase) and improving temperature (-dependent) characteristics.

This type (hydrocarbon-type) of the chiral smectic liquid crystal composition, however, has been accompanied with a problem of a lower contrast ratio due to the formation of a so-called chevron (layer) structure having a larger layer inclination angle. Further, when the hydrocarbon-type liquid crystal composition is used in an active matrix-type device, a voltage-holding rate is further lowered compared with other liquid crystal materials generally used therefor to leave a serious problem in practical use.

In the present invention, the second composition is characterized by using at least 30 wt. % in total of a plurality of chiral fluorine-containing mesomorphic compounds providing different absolute configurations or spontaneous polarization (Ps) different in sign or direction (hereinbelow, referred to as "Ps-counter balanced chiral F-containing compounds") as mentioned above.

The second composition forms a bookshelf structure (or a structure having a small layer inclination angle) based on he use of the fluorine-containing mesomorphic compounds, thus realizing a higher contrast ratio.

When the second composition is used in an active matrix-type liquid crystal device, problems of a conventional active matrix-type liquid crystal device, such as a larger spontaneous polarization and a lower reliability are solved.

Specifically, we have found that the second composition including Ps-counterbalanced F-containing compounds not only does not largely affect characteristics thereof except for the result spontaneous polarization but also provides improved several characteristics such as, a wider SmC* temperature range, an equal or lower viscosity, an equivalent or better low-temperature storage characteristic and an equivalent voltage-holding rate when compared with those of a liquid crystal composition containing no Ps-counterbalanced F-containing compounds.

The second composition used in this embodiment may preferably comprise the Ps-counterbalanced F-containing compounds in a total amount of substantially 30 wt. % or above, particularly 50 wt. % or above, for achieving the above-mentioned advantages.

Further, by appropriately changing a relative proportion between the Ps-counterbalanced F-containing compounds used, it is possible to decrease the resultant spontaneous polarization without substantially adversely affecting other characteristics. As a result, depending on desired characteristics of a liquid crystal device to be prepared, it is possible to readily control the resultant spontaneous polarization of the second composition.

The Ps-counterbalanced F-containing compounds used in he second composition may preferably have a chiral portion having a fluorine atom directly connected to an asymmetric carbon atom, specifically a chiral cite represented by —R*—D—$(O)_x$—$CH_2$—D'—Rf (i.e., Rf' of the above-mentioned formula (1)) where R* is an acyclic chiral moiety having a fluorine atom or a racemic structure having a fluorine atom. More specifically, among the structural formulas (1-1) to (1-36), (2-1) to (2-73) and (3-1) to (3-84), the Ps-counterbalanced F-containing compounds may preferably have structural formulas (1-1), (1-2), (1-4), (1-5), (1-8) to (1-17), (1-26), (1-28), (1-30), (1-32) and (1-36).

In this embodiment, the second composition (comprising at least two fluorine-containing mesomorphic compounds each having the portions (a), (b2) and (c) and containing at least 30 wt. % in total of the Ps-counterbalanced F-containing compound) may preferably be composed essentially of fluorine-containing mesomorphic compounds each having smectic phase or latent smectic phase and a structure including the portions (a), (b2) and (c) and containing at least 30 wt. % in total of a plurality of chiral fluorine-containing mesomorphic compounds providing different absolute configurations (R and S) or spontaneous polarizations different in sign (+ and −) or direction (a direction and its opposite direction). In this regard, such a second composition may further contain a very small amount of impurities within an extent not adversely effecting the above-mentioned advantageous effects of the second composition.

The fluorine-containing mesomorphic compounds represented by the above-mentioned formulas (1), (2) and (3) may preferably be used as components of the second composition since these compounds can readily be reduced in ion content by purification and provide the resultant second composition with a good uniform alignment characteristic.

The liquid crystal layer 27 of the active matrix-type liquid crystal device as shown in FIGS. 1 and 2 in this embodiment may preferably by comprised of the above-mentioned first composition or second composition.

The first or second composition used in the active matrix-type liquid crystal device utilizes spontaneous polarization as a switching torque, thus realizing a high-speed liquid crystal device. For example, it is possible to provide a decreased switching time (high switching speed) of at most 1 msec, preferably at most 500 μsec, more preferably at most 100 μsec, by applying a driving voltage of ca. 5 V (volts). In order to realize bistability even in the above-mentioned first or second composition, an activation energy for transition between two stable states is required to be larger.

Such a larger activation energy may preferably be provided by using a chiral smectic liquid crystal composition providing a tilt angle of at least 15 degrees or a bistable liquid crystal composition exhibiting two uniform states without including twisted state. In this regard, in order to suppress an occurrence of the twisted state, the bistable liquid crystal composition may desirably contain less or no impurity ions. Further, it is also possible to preferably use a chiral smectic liquid crystal composition having a smaller spontaneous polarization (Ps), preferably of at most 10 $nC/cm^2$ The smaller spontaneous polarization is also advantageous to suppression of an occurrence of hysteresis phenomenon in response voltage-transmittance) characteristic.

The first or second composition assumes at least two (optically) stable states and can be placed in an intermediate state between the two stable states depending on a voltage applied to the composition. Such optically modulated states (the intermediate and two stable states) can be memorized as a co-present state of plural domains or a state of presence of only one of the domains.

Accordingly, the liquid crystal device using the first or second composition may be applied to various display modes including a partial re-writing mode for each pixel wherein a part of a display region is placed in a memory state and the remaining part is placed a driven state, a state picture display mode wherein the entire display region is utilized as a memory state, and a lower power consumption mode (power saving mode).

In the thus-constructed active matrix-type liquid crystal device using the first or second composition, charges are injected into pixels along a scanning signal line in a gate-on period. After lapse of a short period, the gates are placed in an "OFF" state and data are written in pixels along a subsequent scanning signal line. As described above, the first or second composition used in this embodiment has a spontaneous polarization (Ps), thus causing a voltage decrease in the gate-off period due to inversion of the spontaneous polarization except that switching (inversion) of liquid crystal molecules between two stage states is completed in the gate-on period. For this reason, it is preferable that the spontaneous polarization is not so large. Accordingly, as mentioned above, the spontaneous polarization of the first or second composition may preferably be 10 $nC/cm^2$ or below. This is also preferred from the viewpoint of suppression of an occurrence of alignment defects due to inclusion of, e.g., polar impurities.

In preferred driving method for the liquid crystal device using the first or second composition, each pixel may preferably be supplied with a voltage signal from the data signal line including an alternating polarity-inverted voltage waveform for writing and resetting (i.e., a polarity-inversion or AC symmetric driving scheme). In such cases, it is possible to apply another voltage signal in addition to the above voltage signal for the purpose, e.g., suppression of hysteresis phenomenon.

For a specific driving method, first, a voltage signal of one polarity for switching one of two stable state (initial state) to the other stable state is applied to the first or second composition (liquid crystal layer) to cause switching between the two stable states of the liquid crystal, thus being converted into an optically modulated signal which can be used for a gradation display. Then, when the first or second composition is supplied with the other polarity-voltage signal, the first or second composition causes switching into the initial state. In the case where such a driving method is used in the liquid crystal device of a normally black mode wherein the initial state is set as the darkest (black) state by aligning one of polarizing axes of a pair of polarizers with the optical axis of liquid crystal molecules in the initial state, the state switched into the initial state provides a black state or a state very closer thereto. When the liquid crystal device is used as a display device, the liquid crystal display device can effect a so-called non-hold type display. The liquid crystal device can also effect high-speed switching between one stable state (initial state) and the other stable state (constituting two stable states), thus providing excellent image qualities for motion picture display.

Each frame period may preferably include a period for switching liquid crystal molecules toward the initial state and another period for switching toward the other stable state in an appropriate time ratio. The time ratio between the period and another period may preferably be 1:1 and each of the voltage signals of different polarities has an absolute voltage value identical to an optically modulated signal applied immediately before or after the voltage signal, in order to minimize a localization of a DC component of the driving voltage thereby to suppress an occurrence of burning.

In this embodiment, it is possible to readily effect an analog-gradation display by applying the first or second composition with intermediate voltage signals corresponding to respective gradational (gray) levels.

In this regard, particularly in the liquid crystal device using the first composition, the first composition assumes first and second stable states and may preferably have a switching characteristic such that a threshold voltage for 50%-inversion from the first stable state to other second stable state and that from the second stable state to the first stable state provide a difference of at most 1 V as an absolute value, and the gradational display may preferably be effected so that DC voltage components applied to the first composition at respective gradation levels are equal to each other or a total of the DC voltage components may preferably be at most 100 mVs.

Alternatively, the first composition may preferably have a switching characteristic such that a threshold voltage for 50%-inversion from the first stable state to other second stable state and that from the second stable state to the first stable state provide a difference of at most 200 mV as an absolute value, and a total of the DC voltage components may preferably be at most 1 V as an average in each frame period. As a result, the burning (sticking) phenomenon due to the residual DC voltage components and/or localization of ions can effectively be suppressed. The above driving method for the device using the first composition is also effective in suppressing the occurrence of reverse alignment defects in a smectic layer extension direction which have been observed in the conventional liquid crystal device.

The liquid crystal device using the first or second composition used in this embodiment may suitably be used as a liquid crystal display device of a transmission-type generally used in combination with a light source or of a reflection-type ordinarily further including a reflection layer. The liquid crystal device may also be used as a display device of a projection-type or a direct view-type or as a light valve of a printer etc.

Hereinbelow, the present invention will be described more specifically based on Examples.

EXAMPLE 1

A liquid crystal composition LCC-1 was prepared by mixing the following fluorine-containing compounds in a mixing ratio of A/B/C/D=15/55/25/5 (wt. %).

| Comp. No. | Structural formula |
|---|---|
| A | 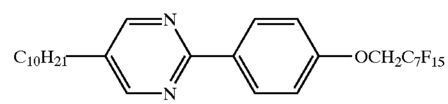 |
| B | 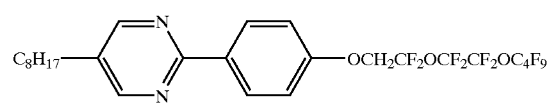 |
| C | 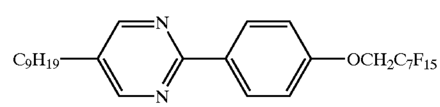 |
| D | 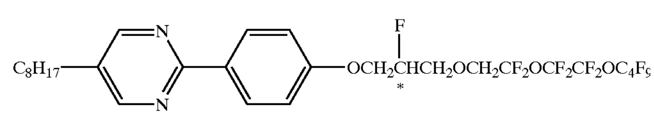 |

Phase Transition Temperature (°C.)

$$SmC^* \xleftarrow{52} SmA \xrightarrow{87} Iso.$$

Iso.: isotropic phase
SmA: smectic A phase
SmC*: chiral smectic C phase

Tilt angle θ (at 30° C.): 26 degrees

Spontaneous polarization Ps (at 30° C.): 6.0 $nC/cm^2$

Each of two 1.1 mm-thick glass substrates (first and second substrates) was coated with a ca. 70 nm-thick ITO (indium tin oxide) film as a transparent electrode.

On each of the glass substrates, a 0.7 wt. % of a polyamic acid as a precursor of a polyimide having a recurring unit of the formula shown below was applied two times by spin coating at 500 rpm for 5 sec. for the first coating and at 1500 rpm for 30 sec. for the second coating.

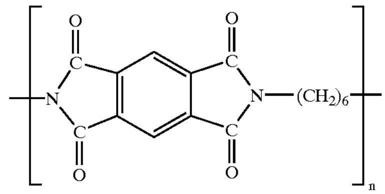

Then, the coating was pre-dried at 80° C. for 5 min. and baked (cured) under heating at 220° C. for 1 hour to form a 60 Å-thick polyimide alignment film, which was then subjected to a uniaxial aligning treatment by rubbing with a nylon cloth.

Thereafter, one of the glass substrates (first glass substrate) was coated with a solution in a mixture solvent (ethanol/methanol/isopropanol=44/43/13% by weight) of a mixture of ladder-type polysiloxane and ca. 100 Å-dia. antimony-doped SnOx ultrafine particles at a solid matter concentration of 10 wt. % by spin coating at 1500 rpm for 10 sec., followed by pre-drying at 80° C. for 5 min. and drying at 200° C. for 1 hour to form a ca. 800 Å-thick SnOx-dispersed polysiloxane alignment film.

Then, silica beads having an average diameter of 2.4 μm dispersed in isopropanol at a concentration of 0.01 wt. % were applied by spin coating at 1500 rpm for 10 sec. onto the first substrate at a dispersion density of a. 100 beads/mm$^2$.

At a periphery of the first substrate, a thermosetting-type (liquid) adhesive was applied by printing process. Then, the other glass substrate (second substrate) (having no SnOx-dispersed polysiloxane alignment film) was superposed on the first substrate, followed by heat-curing of the adhesive in an oven at 150° C. for 90 min. to prepare a blank cell having a cell gap of ca. 2.2 μm.

The liquid crystal composition LCC-1 prepared above was mixed with 1 wt. % of ca. 100 Å-dia. activated alumina fine particles and then injected into the above-prepared blank cell to form a liquid crystal device (cell) having an area of 0.9 cm$^2$.

The liquid crystal device was subjected to measurement of an optical response characteristic in the following manner to obtain a voltage-transmittance (V-T) curve.

The optical response characteristic of the liquid crystal device was measured by using a polarizing microscope equipped with a photomultiplier under a cross-nicol relationship such that the liquid crystal device was sandwiched between a pair of polarizers so that one of polarizing axes was aligned with one of molecular axes (corresponding to one of two stable states) while applying a triangular wave (5 Hz, ±7 V).

As a result, the liquid crystal device showed a hysteresis V-T curve and provided a difference in threshold voltage between two stable states in terms of 50%-inversion of 180 mV.

Figure 6:
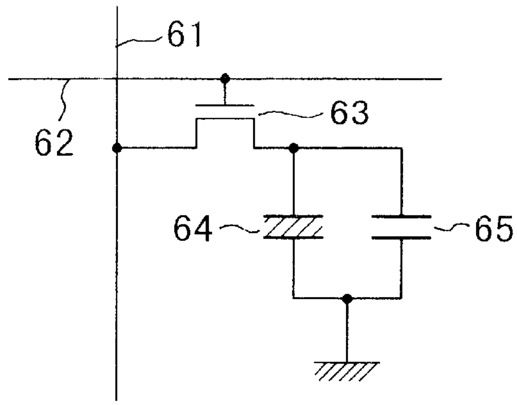
FIG. 6 is an equivalent circuit diagram of a liquid crystal device of an active matrix-type used in Examples.

Then, an active matrix-type liquid crystal device (single-pixel test cell) having an equivalent circuit as shown in FIG. 6 was prepared by connecting the above liquid crystal device (cell) with a TFT (single crystalline silicon transistor) (ON resistance: 50 ohm) and a ceramic capacitor (capacitance: 2 nF).

Referring FIG. 6, the active matrix-type liquid crystal device includes a data signal (source) line 61, a scanning signal (gate) line 62, the TFT 63, the liquid crystal cell 64 and the ceramic capacitor 65.

Figure 5:
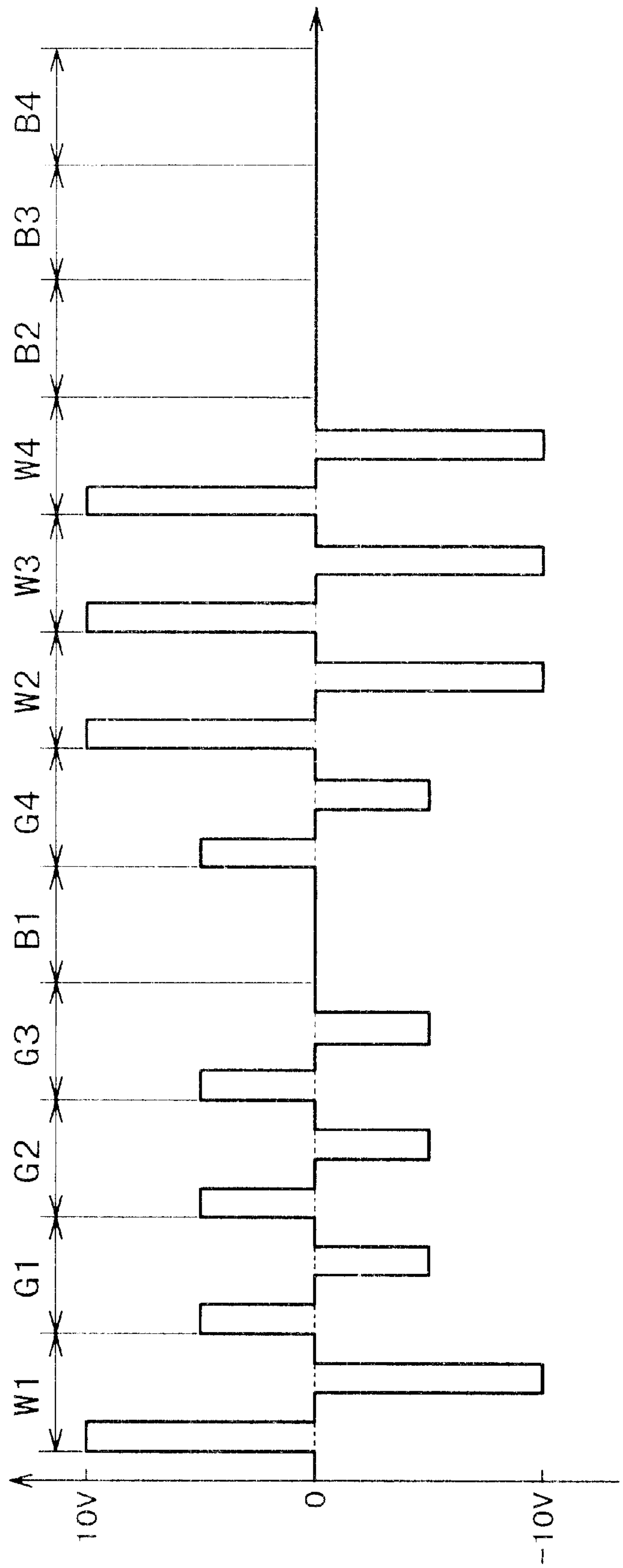
FIG. 5 is a pulse voltage waveform diagram used in Examples appearing hereinafter.

The thus-prepared active matrix-type liquid crystal device was driven by applying thereto gate signal (selection period: 30 μsec) via the scanning signal line 61 and a data signal (pulse signal) with a pulse width of 30 μsec as shown in FIG. 5.

In the data signal waveform as shown in FIG. 5, a positive-polarity pulse (pulse width: 30 μsec) corresponded to a writing pulse signal and a negative-polarity pulse (pulse width: 30 μsec) corresponded to a reset pulse signal. Further, one frame period (for displaying a prescribed state (e.g., W1)) was set to 16 msec and divided into a display period of 8 msec (between a time of the start of the positive-polarity pulse application and a time immediately before the start of a subsequent negative-polarity pulse application) and a subsequent non-display period of 8 msec (between the negative-polarity pulse application and a subsequent positive-polarity application in a subsequent frame period). In FIG. 5, respective symbols each indicated for one frame period represented the following display states (gradational display levels).

W1, W2, W3, W4: white display state,

G1, G2, G3, G4: gray (intermediate or halftone) display state, and

B1, B2, B3, B4: black display state.

Under the above driving conditions, a change in transmittance in the respective display states (W1 to B4) was observed through the polarizing microscope similarly as in the measurement of the above-mentioned optical response characteristic under a cross-nicol relationship providing the darkest (black) state under no electric field application.

As a result, when a transmittance for W1was taken as 100%, transmittances for respective frame periods were changed as follows.

| Display state | Transmittance (%) |
|---|---|
| W1 | 100 |
| W2 | 99 |
| W3 | 99 |
| W4 | 100 |
| G1 | 35 |
| G2 | 39 |
| G3 | 39 |
| G4 | 41 |
| B1 | <1 |
| B2 | <1 |
| B3 | <1 |
| B4 | <1 |

As shown in the above change in transmittance, the active matrix-type liquid crystal device could effect optical modulation (gradation display) with a good reproducibility irrespective of the previous display state and caused substantially no hysteresis phenomenon.

When the active matrix-type liquid crystal device was subjected to measurement of an optical response time (a time required to effect 90%-switching from the black state to the white state), the resultant response time was 290 μsec.

EXAMPLE 2

The active matrix-type liquid crystal device prepared in Example 1 was continuously supplied with a pulse waveform for displaying the white (display) state for 100 hours. Thereafter, when the liquid crystal device was subjected to measurement of transmittances in the respective display states (W1 to B4) in the same manner as in Example 1 by using the pulse signal waveform shown in FIG. 5, the liquid crystal device showed transmittances substantially identical to those of the liquid crystal device used in Example 1. Accordingly, the active matrix-type liquid crystal device of the present invention was found to be effective in suppressing an occurrence of burning (sticking) of the liquid crystal material used.

EXAMPLE 3

An active matrix-type liquid crystal device was prepared and evaluated in the same manner as in Example 1 except that the liquid crystal composition LCC-1 was changed to a liquid crystal composition LCC-2 prepared by using three fluorine-containing compounds A, B and D in a mixing ratio of A/B/D=37/55/8 (wt. %). The liquid crystal composition LCC-2 showed a spontaneous polarization (Ps) of 9.6 $nC/cm^2$ at 30° C.

As a result of the transmittance measurement, the active matrix-type liquid crystal device showed the following transmittances.

| Display state | Transmittance (%) |
|---|---|
| W1 | 100 |
| W2 | 98 |
| W3 | 100 |
| W4 | 100 |
| G1 | 45 |
| G2 | 50 |
| G3 | 49 |
| G4 | 51 |
| B1 | <1 |
| B2 | <1 |
| B3 | <1 |
| B4 | <1 |

The active matrix-type liquid crystal device could effect an optical modulation with a good reproducibility without substantially causing hysteresis phenomenon.

Further, when the active matrix-type liquid crystal device was evaluated in the same manner as in Example 2, the liquid crystal device showed the same transmittances as those measured above, thus providing a good burning-prevention performance.

EXAMPLE 4

The active matrix-type liquid crystal device prepared in Example 1 was partially supplied with a pulse signal as shown in FIG. 5 so that the pulse signal application was effected until a time immediately before the start of application of the reset pulse in a frame period for G3 (i.e., until half of the frame period of G3) and after 1 sec., the gate was opened thereby to place the liquid crystal molecules in a state of no electric field application. In this state, the liquid crystal device provided the intermediate (gray) display state based on a co-presence of two domains (domain gradation memory state).

When the active matrix-type liquid crystal device prepared in Example 3 was similarly evaluated, the liquid crystal device was found to maintain a domain gradation memory state (G3 display level) similar to that observed above.

Accordingly, the active matrix-type liquid crystal device of the present invention was found to be applicable to a partial motion picture display mode, a partial static picture display mode, an entire static picture display mode and a low power consumption mode.

EXAMPLE 5

A liquid crystal device (cell) was prepared and evaluated in the same manner as in Example 1 except that the thickness (60 Å) of the polyimide alignment films for both of the substrates was changed to 100 Å.

The crystal device showed a difference in 50%-inversion threshold voltage (between two stable states) of 200 mV.

By using the liquid crystal device, an active matrix-type liquid crystal device was prepared and evaluated in the same manner as in Example 1.

As a result, the active matrix-type liquid crystal device could effect an optical modulation with a good gradation reproducibility.

Further, when the active matrix-type liquid crystal device was subjected to observation of the memory characteristic similarly as in Example 4, the device showed a domain gradation memory state similar to that observed in Example 4.

COMPARATIVE EXAMPLE 1

A blank cell was prepared in the same manner as in Example 1.

A commercially available ferroelectric liquid crystal (“CS1014”, mfd. by Chisso K.K.) was injected into the blank cell and was supplied with a DC voltage of 10 V for 100 hours, thus being monostabilized.

The resultant liquid crystal device showed a difference in 50%-inversion threshold voltage of 700 mV.

However, when the liquid crystal device was evaluated as to the memory characteristic similarly as in Example 4, a domain gradation memory state was not confirmed.

EXAMPLE 6

After the liquid crystal composition LCC-1 used in the active matrix-type liquid crystal device prepared in Example 1 was placed in a stabler alignment state, the liquid crystal device was left standing for 200 hours in the stabler alignment state.

Thereafter, when the active matrix-type liquid crystal was subjected to the transmittance measurement in the same manner as in Example 1, the active matrix-type liquid crystal device showed the following transmittances.

| Display state | Transmittance (%) |
|---|---|
| W1 | 100 |
| W2 | 97 |
| W3 | 99 |
| W4 | 99 |
| G1 | 34 |
| G2 | 39 |
| G3 | 40 |
| G4 | 39 |
| B1 | <1 |
| B2 | <1 |
| B3 | <1 |
| B4 | <1 |

As a result, the active matrix-type liquid crystal device showed substantially similar transmittances to those obtained in Example 1.

EXAMPLE 7

An active matrix-type liquid crystal device was prepared and evaluated in the same manner as in Example 1 except that the liquid crystal composition LCC-1 was changed to a liquid crystal composition LCC-2 prepared by using three fluorine-containing compounds A, B and D in a mixing ratio of A/B/D=37/55/8 (wt. %). The liquid crystal composition LCC-2 showed a spontaneous polarization (Ps) of 9.6 $nC/cm^2$ at 30° C.

As a result of the transmittance measurement, the active matrix-type liquid crystal device showed the following transmittances.

| Display state | Transmittance (%) |
|---|---|
| W1 | 100 |
| W2 | 98 |
| W3 | 100 |
| W4 | 100 |
| G1 | 45 |
| G2 | 50 |
| G3 | 49 |
| G4 | 51 |
| B1 | <1 |
| B2 | <1 |
| B3 | <1 |
| B4 | <1 |

When the liquid crystal device was continuously supplied with only a pulse signal for a white display state for 200 hours and then subjected to the transmittance measurement using the pulse signal waveform as shown in FIG. 5, the measurement results were little changed from the above results.

Further, the liquid crystal device was reset into the black state and left standing in the black state for 300 hours. Then, the liquid crystal was subjected to measurement of transmittances using the pulse signal waveform as shown in FIG. 5, whereby the resultant transmittances were substantially not changed.

COMPARATIVE EXAMPLE 2

After the liquid crystal composition LCC-1 used in the active matrix-type liquid crystal device prepared in Example 1 was placed in an unstabler alignment state as an initial (black) state, the liquid crystal device was subjected to the transmittance measurement using the diving waveform shown in FIG. 5. As a result, the active matrix-type liquid crystal device showed the following transmittances.

| Display state | Transmittance (%) |
|---|---|
| W1 | 100 |
| W2 | 100 |
| W3 | 100 |
| W4 | 100 |
| G1 | 43 |
| G2 | 49 |
| G3 | 48 |
| G4 | 51 |
| B1 | 3 |
| B2 | 4 |
| B3 | 4 |
| B4 | 5 |

Then, the liquid crystal device was reset in the black state and left standing for 300 hours in the black state. When the liquid crystal device was subjected to the transmittance measurement in a similar manner, the liquid crystal device showed the following transmittances.

| Display state | Transmittance (%) |
|---|---|
| W1 | 100 |
| W2 | 95 |
| W3 | 93 |
| W4 | 90 |
| G1 | 36 |
| G2 | 36 |
| G3 | 39 |
| G4 | 42 |
| B1 | 2 |
| B2 | 2 |
| B3 | 3 |
| B4 | 2 |

As apparent from the above results, the liquid crystal device was found to be monostabilized in the reset black state to cause burning phenomenon.

EXAMPLE 8

A liquid crystal composition a was prepared by mixing the following fluorine-containing compounds in a mixing ratio of A/B/C/D=5/87/5/3 (wt. %).

| Comp. No. | Structural formula |
|---|---|
| A | 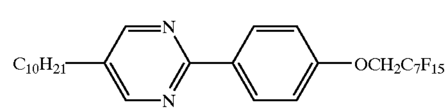 |
| B | 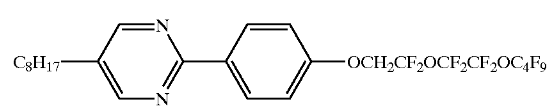 |
| C | 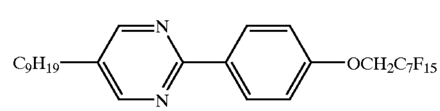 |

-continued

| Comp. No. | Structural formula |
|---|---|
| D | 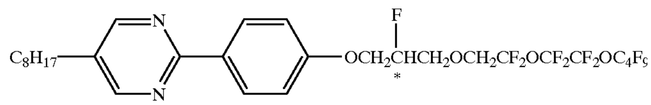 |

Phase Transition Temperature (°C.)

$$SmC^* \xleftarrow{50} SmA \xrightarrow{78} Iso.$$

Tilt angle θ (at 30° C.): 25 degrees

Spontaneous polarization Ps (at 30° C.): 3.8 nC/cm$^2$

Each of two 1.1 mm-thick glass substrates (first and second substrates) was coated with a ca. 70 nm-thick ITO (indium tin oxide) as a transparent electrode.

On one of the glass substrates, a 0.7 wt. % of a polyamic acid as a precursor of a polyimide having a recurring unit of the formula shown below was applied two times by spin coating at 500 rpm for 5 sec. for the first coating and at 1500 rpm for 30 sec. for the second coating.

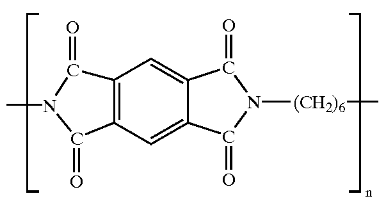

Then, the coating was pre-dried at 80° C. for 5 min. and baked (cured) under heating at 220° C. for 1 hour to form a 60 Å-thick polyimide alignment film, which was then subjected to a uniaxial aligning treatment by rubbing with a nylon cloth.

Thereafter, the other glass substrate was coated with a solution in ethanol of a mixture of ladder-type polysiloxane and ca. 100 Å-dia. antimony-doped SnOx ultrafine particles at a solid matter concentration of 5 wt. % by spin coating at 1500 rpm for 10 sec., followed by pre-drying at 80° C. for 5 min. and drying at 200° C. for 1 hour to form a ca. 500 Å-thick SnOx-dispersed polysiloxane alignment film. Then, silica beads having an average diameter of 2.4 μm dispersed in isopropanol at a concentration of 0.01 wt. % were applied by spin coating at 1500 rpm for 10 sec. onto the first substrate at a dispersion density of a. 100 beads/mm$^2$. At a periphery of the first substrate, a thermosetting-type (liquid) adhesive was applied by printing process.

Then, the two glass substrates were applied to each other, followed by heat-curing of the adhesive in an oven at 150° C. for 90 min. to prepare a blank cell having a cell gap of ca. 2.2 μm.

The liquid crystal composition a prepared above was mixed with 1 wt. % of ca. 100 Å-dia. activated alumina fine particles and then injected into the above-prepared blank cell to form a liquid crystal device (cell) having an area of 0.9 cm$^2$.

The liquid crystal device was subjected to measurement of an optical response characteristic in the following manner to obtain a voltage-transmittance (V-T) curve.

The optical response characteristic of the liquid crystal device was measured by using a polarizing microscope equipped with a photomultiplier under a cross-nicol relationship such that the liquid crystal device was sandwiched between a pair of polarizers so that one of polarizing axes was aligned with one of molecular axes (corresponding to one of two stable states) while applying a triangular wave (5 Hz, ±7 V).

As a result, the liquid crystal device showed a hysteresis V-T curve and provided a difference in threshold voltage between two stable states in terms of 50%-inversion of 50 mV.

Then, an active matrix-type liquid crystal device (test cell) having an equivalent circuit as shown in FIG. 6 was prepared by connecting the above liquid crystal device (cell) with a TFT (single crystalline silicon transistor) (ON resistance: 50 ohm) and a ceramic capacitor (capacitance: 2 nF).

The thus-prepared active matrix-type liquid crystal device was driven by applying thereto gate signal (selection period: 30 μsec) via the scanning signal line 61 and a data signal (pulse signal) with a pulse width of 30 μsec as shown in FIG. 5.

In the data signal waveform as shown in FIG. 5, a positive-polarity pulse (pulse width: 30 μsec) corresponded to a writing pulse signal for switching into white or gray display states and a negative-polarity pulse (pulse width: 30 μsec) corresponded to a reset pulse signal for resetting into a black state. Further, one frame period (for displaying a prescribed state (e.g., W1)) was set to 16 msec and divided into a display period (t1) of 8 msec (between a time of the start of the positive-polarity pulse application and a time immediately before the start of a subsequent negative-polarity pulse application) and a subsequent non-display period (t2) of 8 msec (between the negative-polarity pulse application and a subsequent positive-polarity application in a subsequent frame period). In FIG. 5, respective symbols each indicated for one frame period represented the following display states (gradational display levels).

W1, W2, W3, W4: white display state,

G1, G2, G3, G4: gray (intermediate or halftone) display state, and

B1, B2, B3, B4: black display state.

Under the above driving conditions, a change in transmittance in the respective display states (W1 to B4) was observed through the polarizing microscope similarly as in the measurement of the above-mentioned optical response characteristic under a cross-nicol relationship providing the darkest (black) state under no electric field application.

As a result, when a transmittance for W1 was taken as 100%, transmittances for respective frame periods were changed as follows.

| Display state | Transmittance (%) |
|---|---|
| W1 | 100 |
| W2 | 100 |

-continued

| Display state | Transmittance (%) |
|---|---|
| W3 | 100 |
| W4 | 100 |
| G1 | 37 |
| G2 | 40 |
| G3 | 39 |
| G4 | 39 |
| B1 | <1 |
| B2 | <1 |
| B3 | <1 |
| B4 | <1 |

As shown in the above change in transmittance, the active matrix-type liquid crystal device could effect optical modulation (gradation display) with a good reproducibility irrespective of the previous display state and caused substantially no hysteresis phenomenon.

When the active matrix-type liquid crystal device was subjected to measurement of an optical response time (a time required to effect 90%-switching from the black state to the white state), the resultant response time was 290 $\mu$sec.

Further in the black display states, a reverse alignment defect in the layer extension direction was little observed. A contrast ratio (W1/B4) between the white state (W1) and the black state (B4) was 103.

EXAMPLE 9

Liquid crystal compositions b, c and d were prepared in the same manner as in Example 8 except for changing the mixing ratio of A/B/C/D (5/87/5/3 (wt. %)) to those shown below.

<Composition b>

Mixing ratio: A/B/C/D=5/82/10/3 (wt. %)

Phase Transition Temperature (°C.)

$$SmC^* \xleftarrow{50} SmA \xrightarrow{79} Iso.$$

θ (30° C.): 25 degrees

Ps (30° C.): 4.0 nC/cm$^2$

<Composition c>

Mixing ratio: A/B/C/D=5/72/20/3 (wt. %)

Phase Transition Temperature (°C.)

$$SmC^* \xleftarrow{53} SmA \xrightarrow{80} Iso.$$

θ (30° C.): 26 degrees

Ps (30° C.): 4.1 nC/cm$^2$

<Composition d>

Mixing ratio: A/B/C/D=15/62/20/3 (wt. %)

Phase Transition Temperature (°C.)

$$SmC^* \xleftarrow{52} SmA \xrightarrow{86} Iso.$$

θ (30° C.): 26 degrees

Ps (30° C.): 3.9 nC/cm$^2$

By using the above-prepared liquid crystal compositions b, c and d, active matrix-type liquid crystal devices were prepared, respectively, in the same manner as in Example 8 and then subjected to evaluation with respect to the reverse alignment defect in the black state and the contrast ratio.

As a result, all the liquid crystal devices using the liquid crystal compositions b, c and d caused substantially no reverse alignment defect similarly as in Example 8.

The contrast ratio were 124 (for the device using the composition b), 150 (for the device using the composition c) and 209 (for the device using the composition d), respectively.

EXAMPLE 10

The active matrix-type liquid crystal device prepared in Example 8 was evaluated in the same manner as in Example 8 except that a DC bias voltage of 0.5 0.5 V was applied to the device in the resetting direction.

As a result, similarly as in Example 8, the reverse alignment defect in the black state was little observed.

EXAMPLE 11

A liquid crystal device (cell) was prepared and evaluated in the same manner as in Example 8 except that the thickness (60 Å) of the polyimide alignment film was changed to 120 Å.

The crystal device showed a difference in 50%-inversion threshold voltage (between two stable states) of 100 mV.

By using the liquid crystal device, an active matrix-type liquid crystal device was prepared and evaluated in the same manner as in Example 8.

As a result, the active matrix-type liquid crystal device could effect an optical modulation with a god gradation reproducibility.

Further, the reverse alignment defect in the layer extension direction at the black state was not substantially observed.

COMPARATIVE EXAMPLE 3

Liquid crystal composition e was prepared in the same manner as in Example 8 except for changing the mixing ratio of A/B/C/D (5/87/5/3 (wt. %)) as follows.

<Composition c>

Mixing ratio: A/B/C/D=0/97/0/3 (wt. %)

Phase Transition Temperature (°C.)

$$SmC^* \xleftarrow{48} SmA \xrightarrow{71} Iso.$$

θ (30° C.): 25 degrees

Ps (30° C.): 3.7 nC/cm$^2$

By using the above-prepared liquid crystal composition e, an active matrix-type liquid crystal device was prepared in the same manner as in Example 8 and then subjected to evaluation with respect to the reverse alignment defect in the black state and the contrast ratio.

As a result, the liquid crystal device using the liquid crystal composition e caused remarkable alignment defects in the layer extension direction at the back state.

The contrast ratio was 23.

COMPARATIVE EXAMPLE 4

Active matrix-type liquid crystal devices were prepared in the same manner as in Example 8 by using the liquid crystal compositions b and d prepared in Example 9.

Figure 7A:
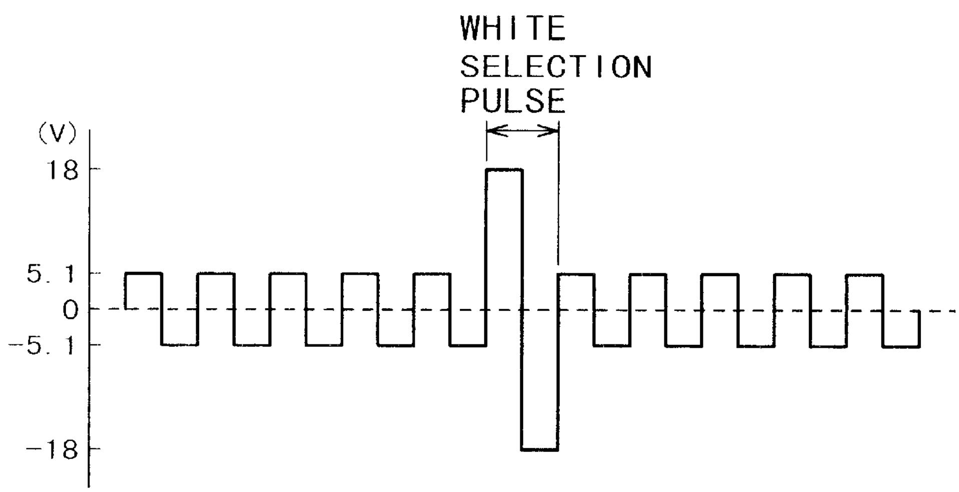
FIGS. 7A and 7B are driving waveforms for driving a liquid crystal device prepared in Comparative Example 4 in a simple matrix driving scheme.
Figure 7B:
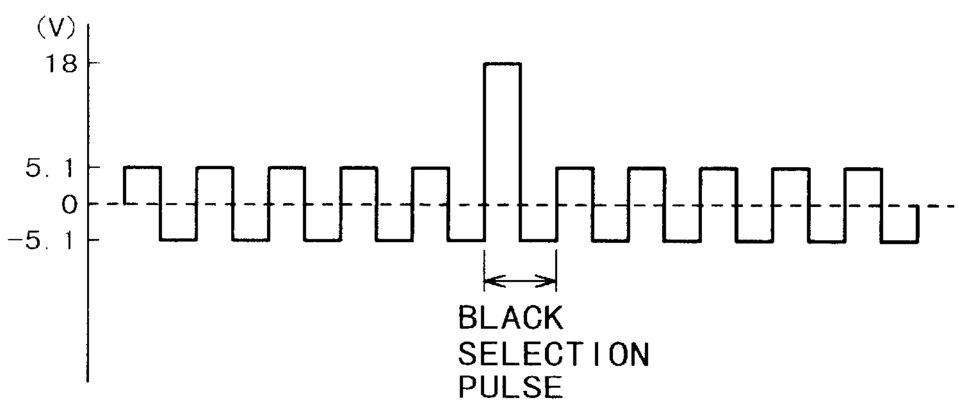

The liquid crystal devices were driven in a simple matrix driving scheme using a driving waveform a shown in FIGS. 7A and 7B and were subjected to measurement of a contrast ratio of the white display state to the black display state.

As a result, when compared with the contrast ratios in the case of the active matrix driving scheme in Example 9, the device using the composition b showed a contrast ratio of 130 which was comparable to that of the corresponding device prepared in Example 9 but the device using the composition d caused a large fluctuation of liquid crystal molecules due to the data signal application, thus remarkably lowering a contrast ratio to 8.

Further, these results of the contrast ratios were opposite to those in Example 9 with respect to the effect of the contents of the fluorine-containing compounds A and C having no catenary ether oxygen atom.

EXAMPLE 12

A liquid crystal composition f was prepared by mixing the following fluorine-containing compounds in a mixing ratio of E/F/G/H/I=10/25/25/15/25 (wt. %).

| Comp. No. | Structural formula |
|---|---|
| E | 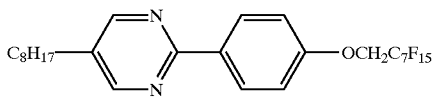 |
| F | 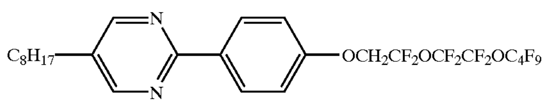 |
| G | 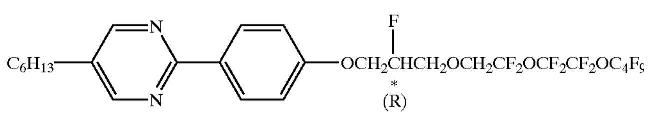 |
| H | 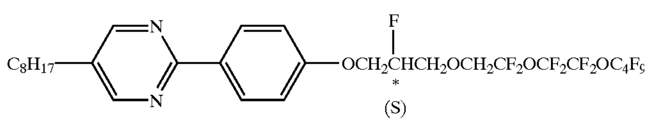 |
| I | 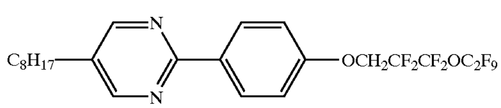 |

In the above compounds, the compounds G and H had absolute configurations R and S, respectively, and showed spontaneous polarizations different in sign.

Phase Transition Temperature (°C.)

$$\text{Cry/SmX} \xleftarrow{-19} \text{SmC}^* \xleftarrow{53} \text{SmA} \xrightarrow{85} \text{Iso.}$$

Iso.: isotropic phase
SmA: smectic A phase
SmC*: chiral smectic C phase

Tilt angle θ (at 30° C.): 26 degrees

Spontaneous polarization Ps (at 30° C.): 9.7 $nC/cm^2$

By using the above-prepared liquid crystal composition of, liquid crystal device was prepared and subjected to measurement of optical response characteristic using the triangular waveform in the same manner as in Example 8.

As a result, the resultant liquid crystal device showed a hysteresis V-T curve as generally observed in an ordinary device using a ferroelectric liquid crystal.

The liquid crystal device was then left standing at a low temperature of −18° C. for 20 hours. After the standing, the alignment state was not changed from that before the standing. Further, the V-T curve using the triangular waveform was not changed before and after the standing.

Further, when an active matrix-type liquid crystal device was prepared by using he above liquid crystal device in the same manner as in Example 8 and then was subjected to measurement of a change in transmittance by using the driving waveform as shown in FIG. 5 in the same manner as in Example 8, the resultant transmittance values were as follows.

| Display state | Transmittance (%) |
|---|---|
| W1 | 100 |
| W2 | 100 |
| W3 | 99 |
| W4 | 100 |
| G1 | 52 |
| G2 | 55 |
| G3 | 55 |
| G4 | 55 |
| B1 | <1 |
| B2 | <1 |
| B3 | <1 |
| B4 | <1 |

As shown in the above change in transmittance, the active matrix-type liquid crystal device could effect optical modulation (gradation display) with a good reproducibility irrespective of the previous display state and caused substantially no hysteresis phenomenon.

When the active matrix-type liquid crystal device was subjected to measurement of an optical response time (a time required to effect 90%-switching from the black state to the white state), the resultant response time was 180 μsec.

Further in the black display states, a reverse alignment defect in the layer extension direction was little observed. A contrast ratio (W1/B4) between the white state (W1) and the black state (B4) was 101.

EXAMPLE 13

A Liquid crystal composition g was prepared in the same manner as in Example 12 except for changing the mixing ratio of E/F/G/H/I (10/25/25/15/25 (wt. %)) to those shown below.

<Composition g>

Mixing ratio: E/F/G/H/I=10/15/30/25/20 (wt. %)

Phase Transition Temperature (°C.)

$$\text{Cry/SmX} \xleftarrow{-17} \text{SmC}^* \xleftarrow{55} \text{SmA} \xrightarrow{88} \text{Iso.}$$

θ (30° C.): 27 degrees

Ps (30° C.): 5.8 nC/cm$^2$

A liquid crystal device was prepared and evaluated in the same manner as in Example 12 except for using the above-prepared liquid crystal composition f and changing the storage (standing) temperature to −16° C. As a result, the alignment state and the V-T curve using the triangular waveform were not changed before and after the low-temperature storage.

An active matrix-type liquid crystal device was prepared by using the above liquid crystal device and evaluated in the same manner as in Example 12.

As a result, the active matrix-type liquid crystal device could effect optical modulation (gradation display) with a good reproducibility irrespective of the previous display state and caused substantially no hysteresis phenomenon.

When the active matrix-type liquid crystal device was subjected to measurement of an optical response time, the resultant response time was 210 μsec.

Further in the black display states, a reverse alignment defect in the layer extension direction was little observed. A contrast ratio was 105.

EXAMPLE 14

A Liquid crystal composition h was prepared in the same manner as in Example 12 except for changing the mixing ratio of E/F/G/H/I (10/25/25/15/25 (wt. %)) to those shown below.

<Composition g>

Mixing ratio: E/F/G/H/I=10/25/20/15/30 (wt. %)

Phase Transition Temperature (°C.)

$$\text{Cry/SmX} \xleftarrow{-23} \text{SmC}^* \xleftarrow{51} \text{SmA} \xrightarrow{84} \text{Iso.}$$

θ (30° C.): 26 degrees

Ps (30° C.): 5.6 nC/cm$^2$

A liquid crystal device was prepared and evaluated in the same manner as in Example 12 except for using the above-prepared liquid crystal composition h and changing the storage temperature to −22° C.

As a result, the alignment state and the V-T curve using the triangular waveform were not changed before and after the low-temperature storage.

EXAMPLE 15

A Liquid crystal compositions i and j were prepared in the same manner as in Example 12 except for changing the mixing ratio of E/F/G/H/I (10/25/25/15/25 (wt. %)) to those shown below.

<Composition i>

Mixing ratio: E/F/G/H/I=10/25/22/18/25 (wt. %)

Phase Transition Temperature (°C.)

$$\text{Cry/SmX} \xleftarrow{-19} \text{SmC}^* \xleftarrow{53} \text{SmA} \xrightarrow{85} \text{Iso.}$$

θ (30° C.): 26 degrees

Ps (30° C.): 4.5 nC/cm$^2$

<Composition j>

Mixing ratio: E/F/G/H/I=10/25/21/19/25 (wt. %)

Phase Transition Temperature (°C.)

$$\text{Cry/SmX} \xleftarrow{-19} \text{SmC}^* \xleftarrow{53} \text{SmA} \xrightarrow{85} \text{Iso.}$$

θ (30° C.): 26 degrees

Ps (30° C.): 2.3 nC/cm$^2$

By using the liquid crystal compositions i and j, liquid crystal devices were prepared and evaluated in the same manner as in Example 12.

As a result, both of the devices showed hysteresis V-T curves based on the triangular wave similar to that obtained in Example 12.

Further, the V-T curves were not changed after the devices were left standing at −15° C. for 3 hours.

COMPARATIVE EXAMPLE 5

A liquid crystal composition k was prepared in the same manner as in Example 12 except that the fluorine-containing compound H was not used and the mixing ratio was changed as follows.

| |
|---|
| Mixing ratio: E/F/G/I = 15/37.5/10/37.5 (wt. %) |
| θ (30° C.): 25 degrees |
| Ps (30° C.): 10.0 nC/cm$^2$ |

The thus-prepared liquid crystal composition k and the liquid crystal composition f prepared in Example 12 were subjected to measurement of a voltage-holding rate (%) defined below by using a voltage-holding rate measuring apparatus (“VHR-1A”, mfd. by Toyo Tekunika K.K.).

Voltage holding rate (%)=(voltage after 1/60 sec)×100/(applied voltage)

As a result, both of the liquid crystal compositions k and f showed a voltage-holding rate of 89.5%.

Accordingly, the liquid crystal composition f according to the present invention as found not to lower the voltage-holding rate by the use of the combination of the fluorine-containing compounds G and H showing different absolute configurations or Ps signs.

COMPARATIVE EXAMPLE 6

A Liquid crystal composition 1 was prepared in the same manner as in Example 12 except for changing the compound H to a fluorine-containing compound H' having an identical structure to that of the compound H except for having an absolute configuration R (opposite to that (S) of the compound H).

<Composition 1>

Mixing ratio: E/F/G/H'/I=10/25/25/15/25 (wt. %)

Phase Transition Temperature (°C.)

$$\text{Cry/SmX} \xleftarrow{-17} \text{SmC}^* \xleftarrow{52} \text{SmA} \xrightarrow{85} \text{Iso.}$$

θ (30° C.): 26 degrees

Ps (30° C.): 50.1 nC/cm$^2$

The thus-prepared liquid crystal composition 1 was subjected to measurement of optical response (switching) time in the same manner as in Example 12.

As a result, the liquid crystal composition 1 showed a larger response time of 430 μsec. Further, the liquid crystal composition 1 showed a viscosity 2.4 times larger than the liquid crystal composition f prepared in Example 12.

In a similar manner, a liquid crystal composition m was prepared except for chaining the mixing ratio as follows.

<Composition m>

Mixing ratio: E/F/G/H'/I=15/37.5/6.25/3.75/37.5 (wt. %)

Phase Transition Temperature (°C.)

$$\text{Cry/SmX} \xleftarrow{-5} \text{SmC}^* \xleftarrow{49} \text{SmA} \xrightarrow{82} \text{Iso.}$$

θ (30° C.): 26 degrees

Ps (30° C.): 9.5 nC/cm$^2$

The liquid crystal composition m showed a SmC* temperature range (−5° C. to 49° C.) which was narrower than a SmC* temperature range (−19° C. to 53° C.) of the liquid crystal composition f prepared in Example 12.

A liquid crystal device was prepared and evaluated in the same manner as in Example 12 except for changing the storage temperature to −4° C.

After the low-temperature storage (−4° C., 20 hours), the liquid crystal device showed many zig-zag alignment defects to largely change the layer structure of the composition m and also provided a larger response time (slower response speed) of 380 μsec compared with that of the composition f used in the device prepared in Example 12.

COMPARATIVE EXAMPLE 7

Two liquid crystal compositions n and o using hydrocarbon-based compounds were prepared by mixing the following compounds J, K and L in the indicated proportions, respectively.

| Compound No. | Structural formula |
|---|---|
| J | 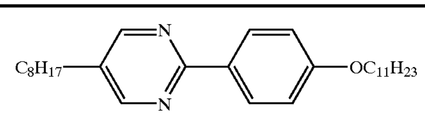 |
| K | 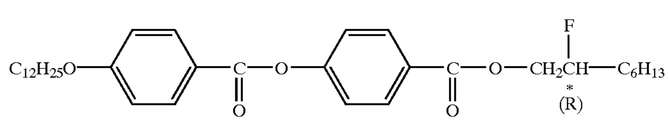 |
| L | 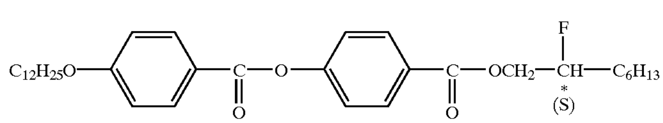 |

<Composition n>

Mixing ratio: J/K=90/10 (wt. %)

<Composition o>

Mixing ratio: J/K/L=70/20/10 (wt. %)

When the thus-prepared liquid crystal compositions n and o were subjected to measurement of voltage-holding rate in the same manner as in Comparative Example 5, the liquid crystal compositions n and o showed low voltage-holding rates of 55.2% and 36.3%, respectively. Of these, the liquid crystal composition o using the chiral compounds K and L having different absolute configuration (Ps signs) leading to a smaller Ps value remarkably lowered the voltage-holding rate compared with the liquid crystal composition f prepared in Example 12 (using the fluorine-containing compounds). This may be attributable to an increase in ionic component due to an increase in polar molecular structure portion providing Ps within the liquid crystal composition o in the case of the mixture consisting only of the hydrocarbon-based compounds.

As described hereinabove, according to the present invention, in an active matrix-type liquid crystal device using a chiral smectic liquid crystal (composition), it is possible to suppress, e.g., occurrences of a hysteresis phenomenon leading to after-images, a deterioration in alignment state with time, and a burning (sticking) phenomenon, thus improving a reliability. Further, it is possible to realize a liquid crystal device with an excellent memory characteristic, high-speed responsiveness and high quality image displaying performance.

What is claimed is:

1. A method of driving a liquid crystal device, comprising the steps of:

selecting a liquid crystal device comprising a pair of substrates each provided with an electrode, the substrates being oriented opposite from each other with a liquid crystal disposed therebetween so as to form a plurality of pixels, and having a plurality of active elements respectively provided to the pixels for driving the liquid crystal device in a matrix driving scheme, said liquid crystal being a chiral smectic liquid crystal composition comprising two compounds including at least one species of fluorine-containing mesomorphic compound which has smectic phase or latent smectic phase and a structure including: (a) a chiral or achiral fluorochemical terminal portion capable of containing at least one catenary ether oxygen atom, (b1) a chiral or achiral hydrocarbon terminal portion, and (c) a central core connecting the fluorochemical terminal portion and the hydrocarbon terminal portion; the liquid crystal composition comprising at least 10 wt. % in a total of at least one species of fluorine-containing mesomorphic compound having a fluorochemical terminal portion free from a catenary ether oxygen atom; and alternately applying a reset signal of a polarity and a writing signal of a polarity opposite to the polarity of the reset signal to effect a gradational display depending on the writing signal, wherein the chiral smectic liquid crystal composition assumes first and second stable states and has a switching characteristic such that a threshold voltage for 50%-inversion from the first stable state to the second stable state, and that from the second stable state to the first stable state provide a difference of at most 1 V as an absolute value, and the gradational display is effected so that DC voltage components applied to the liquid crystal composition at respective gradation levels are equal to each other or a total of the DC voltage components is at most 100 mV.

2. A method according to claim 1, wherein the chiral smectic liquid crystal composition assumes first and second stable states and has a switching characteristic such that a threshold voltage for 50%-inversion from the first stable state to other second stable state and that from the second stable state to the first stable state provide a difference of at most 200 mV as an absolute value, and a total of the DC voltage components is at most 1 V.

3. A method according to claim 1 or 2, wherein the chiral smectic liquid crystal composition is placed in a memory state at least a part of each pixel.

* * * * *

UNITED STATES PATENT AND TRADEMARK OFFICE

CERTIFICATE OF CORRECTION

PATENT NO. : 6,417,828 B1
DATED : July 9, 2002
INVENTOR(S) : Koichi Sato et al.

It is certified that error appears in the above-identified patent and that said Letters Patent is hereby corrected as shown below:

Title page,
Item [56], OTHER PUBLICATIONS, "193" should read -- 1983 --.

Column 2,
Line 21, "has" should read -- have --; and
Line 67, "substrate" should read -- substrates --.

Column 3,
Line 40, "substrate" should read -- substrates --.

Column 4,
Line 30, "line 15" should read -- lines 15 --; and
Line 40, "21," should read -- substrate 21, --.

Column 5,
Line 4, "polyparaxyrene," should read -- polyparaxylene, --; and
Line 10, "an nitride" should read -- a nitride --.

Column 6,
Line 9, "has" should read -- have --; and
"stapontaneous" should read -- spontaneous --.

Column 7,
Line 2, "in placed" should read -- is placed --.

Column 8,
Line 60, "$—O—C_{qa}H_{21qa}—R^3$," should read -- $—O—C_{qa}H_{2qa}—R^3$, --.

Column 9,
Line 45, "Y2" should read -- $Y^2$ --;
Line 46, "X2, Y2 and Z2" should read -- $X^2$, $Y^2$ and $Z^2$ --; and
Line 58, "$O)_{wa}C_{qd}H_{2qd+1}$," should read --$O)_{wa}—C_{qd}H_{2qd+1}$, --.

UNITED STATES PATENT AND TRADEMARK OFFICE

CERTIFICATE OF CORRECTION

PATENT NO. : 6,417,828 B1
DATED : July 9, 2002
INVENTOR(S) : Koichi Sato et al.

It is certified that error appears in the above-identified patent and that said Letters Patent is hereby corrected as shown below:

Column 12,
Line 1, "$—(=O)—O—C_qH_{2q+1-v}—(R')_v$," should read
-- $—C(=O)—O—C_qH_{2q+1-v}—(R')_v$, --;
Line 11, "—CN" should read -- —CN, --;
Line 24, "is is" should read -- is --;
Comp. Ex. I-1, "$C_8F_7CH_2O—$" should read -- $C_3F_7CH_2O—$ --; and
Comp. Ex. I-2, "$C_8F_7CH_2O—$" should read -- $C_3F_7CH_2O—$ --.

Column 13,
Comp. Ex. I-33, "$C_6F_{11}CH_2O—$" should read -- $C_5F_{11}CH_2O—$ --.

Column 14,
Comp. Ex. I-40, "$H(CF_2)_5CH_2O—$" should read -- $H(CF_2)_6CH_2O—$ --.

Column 15,
Comp. Ex. I-43, "$C_6F_{11}CH_2O—$" should read -- $C_5F_{11}CH_2O—$ --.

Column 16,
Comp. Ex. I-44, "$C_6F_{11}CH_2O—$" should read -- $C_5F_{11}CH_2O—$ --; and
Comp. Ex. I-56, "$C_6F_{11}CH_2O—$" should read -- $C_5F_{11}CH_2O—$ --.

Column 17,
Comp. Ex. I-72, "$C_6F_{11}CH_2O—$" should read -- $C_5F_{11}CH_2O—$ --.

Column 19,
Comp. Ex. I-73, "$C_6F_{11}CH_2O—$" should read -- $C_5F_{11}CH_2O—$ --.

Column 33,
Line 1, “line is 17” should read -- lines 17 --;
Line 31, “states” should read -- states of --;
Line 40, “memory” should read -- retain --; and
Line 44, “includes” should read -- include --.

UNITED STATES PATENT AND TRADEMARK OFFICE

CERTIFICATE OF CORRECTION

PATENT NO. : 6,417,828 B1
DATED : July 9, 2002
INVENTOR(S) : Koichi Sato et al.

It is certified that error appears in the above-identified patent and that said Letters Patent is hereby corrected as shown below:

Column 34,
Line 12, "closer" should read -- close --.

Column 35,
Line 22, "a" should read -- as --.

Column 38,
Line 27, "—CN" should read -- —CN, --; and
Line 42, "is is" should read -- is --.

Column 40,
Line 7, "—CN" should read -- —CN, --.

Column 55,
#2-65, "$—OCH_2CF_2OCF_2CF_8$" should read -- $—OCH_2CH_2OCF_2CF_3$ --.

Column 72,
Line 55, "he" should read -- the --.

Column 73,
Line 18, "he" should read -- the --; and
Line 20, "cite" should read -- site --.

Column 74,
Line 11, "voltage-transmittance)" should read -- (voltage-transmittance) --; and
Line 55, "stable state" should read -- stable states --.

Column 75,
Line 2, "closer" should read -- close --.

Column 86,
Line 9, "of 0.5" should read -- of --.

UNITED STATES PATENT AND TRADEMARK OFFICE

CERTIFICATE OF CORRECTION

PATENT NO. : 6,417,828 B1
DATED : July 9, 2002
INVENTOR(S) : Koichi Sato et al.

It is certified that error appears in the above-identified patent and that said Letters Patent is hereby corrected as shown below:

Column 88,
Line 9, "he" should read -- the --.

Column 90,
Line 56, "as" should read -- was --.

Column 94,
Line 9, "other" should read -- the --.

Signed and Sealed this

Fourteenth Day of January, 2003

JAMES E. ROGAN
*Director of the United States Patent and Trademark Office*